(12) United States Patent  
Sasaki et al.

(10) Patent No.: US 8,107,192 B2
(45) Date of Patent: Jan. 31, 2012

(54) HEAT-ASSISTED MAGNETIC RECORDING HEAD WITH LASER DIODE FIXED TO SLIDER

(75) Inventors: Yoshitaka Sasaki, Milpitas, CA (US); Hiroyuki Ito, Milpitas, CA (US); Shigeki Tanemura, Milpitas, CA (US); Hironori Araki, Milpitas, CA (US); Atsushi Iijima, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 273 days.

(21) Appl. No.: 12/588,686

(22) Filed: Oct. 23, 2009

(65) Prior Publication Data

US 2011/0096435 A1  Apr. 28, 2011

(51) Int. Cl.
    *G11B 5/127* (2006.01)
(52) U.S. Cl. .................................. 360/125.07
(58) Field of Classification Search .............. 360/125.07, 360/125.06, 125.08, 125.13, 125.03, 125.2, 360/125.31; 29/603.07, 603.15
See application file for complete search history.

(56) References Cited

U.S. PATENT DOCUMENTS

| 2006/0233062 | A1 | 10/2006 | Bedillion et al. |
| 2007/0165494 | A1 | 7/2007 | Cho et al. |
| 2008/0002298 | A1 | 1/2008 | Sluzewski |
| 2008/0055762 | A1 | 3/2008 | Shimazawa et al. |
| 2011/0013497 | A1* | 1/2011 | Sasaki et al. ............... 369/13.24 |
| 2011/0058273 | A1* | 3/2011 | Sasaki et al. ............... 360/59 |
| 2011/0149426 | A1* | 6/2011 | Araki et al. ............... 360/59 |
| 2011/0188354 | A1* | 8/2011 | Sasaki et al. ............... 369/13.32 |

FOREIGN PATENT DOCUMENTS

JP   A-2008-016096   1/2008

OTHER PUBLICATIONS

U.S. Appl. No. 12/458,546, filed Jul. 15, 2009 in the name of Yoshitaka Sasaki et al.
U.S. Appl. No. 12/585,150, filed Sep. 4, 2009 in the name of Yoshitaka Sasaki et al.

* cited by examiner

*Primary Examiner* — Allen Cao
(74) *Attorney, Agent, or Firm* — Oliff & Berridge, PLC

(57) ABSTRACT

A heat-assisted magnetic recording head includes a slider, an edge-emitting laser diode fixed to the slider, and an external mirror fixed to the laser diode. The laser diode has: an emitting end face that includes an emission part for emitting laser light; a mounting surface that lies at an end in a direction perpendicular to the plane of an active layer and faces the slider; and a rear surface opposite to the mounting surface. The external mirror includes: a first to-be-fixed part disposed along the emitting end face; a second to-be-fixed part disposed along the rear surface; and a coupling part that couples the first and second to-be-fixed parts to each other. The first to-be-fixed part has a reflecting surface that reflects the laser light emitted from the emission part toward the waveguide.

21 Claims, 34 Drawing Sheets

HEAT-ASSISTED MAGNETIC RECORDING HEAD WITH LASER DIODE FIXED TO SLIDER

BACKGROUND OF THE INVENTION

1. Field of the Invention

The present invention relates to a heat-assisted magnetic recording head for use in heat-assisted magnetic recording where a recording medium is irradiated with near-field light to lower the coercivity of the recording medium for data recording.

2. Description of the Related Art

Recently, magnetic recording devices such as a magnetic disk drive have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a reproducing head including a magnetoresistive element (hereinafter, also referred to as MR element) for reading and a recording head including an induction-type electromagnetic transducer for writing are stacked on a substrate. In a magnetic disk drive, the thin-film magnetic head is mounted on a slider which flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data recording with existing magnetic heads.

To solve the foregoing problems, there has been proposed a technique so-called heat-assisted magnetic recording. This technique uses a recording medium having high coercivity. When recording data, a magnetic field and heat are simultaneously applied to the area of the recording medium where to record data, so that the area rises in temperature and drops in coercivity for data recording. The area where data is recorded subsequently falls in temperature and rises in coercivity to increase the thermal stability of magnetization.

In heat-assisted magnetic recording, near-field light is typically used as a means for applying heat to the recording medium. A known method for generating near-field light is to irradiate a plasmon antenna, which is a small piece of metal, with laser light. The plasmon antenna has a near-field light generating part which is a sharp-pointed part for generating near-field light. The laser light applied to the plasmon antenna excites surface plasmons on the plasmon antenna. The surface plasmons propagate to the near-field light generating part of the plasmon antenna, and the near-field light generating part generates near-field light based on the surface plasmons. The near-field light generated by the plasmon antenna exists only within an area smaller than the diffraction limit of light. Irradiating the recording medium with the near-field light makes it possible to heat only a small area of the recording medium.

In general, the laser light to be used for generating the near-field light is guided through a waveguide that is provided in the slider to the plasmon antenna that is located near the medium facing surface of the slider. Possible techniques of placement of a light source that emits the laser light are broadly classified into the following two. A first technique is to place the light source away from the slider. A second technique is to fix the light source to the slider.

The first technique is described in U.S. Patent Application Publication No. 2006/0233062 A1, for example. The second technique is described in U.S. Patent Application Publication No. 2008/0055762 A1, U.S. Patent Application Publication No. 2008/0002298 A1, and JP 2008-16096 A, for example.

The first technique requires an optical path of extended length including such optical elements as a mirror, lens, and optical fiber in order to guide the light from the light source to the waveguide. This causes the problem of increasing energy loss of the light in the path. The second technique is free from the foregoing problem since the optical path for guiding the light from the light source to the waveguide is short.

The second technique, however, has the following problem. Hereinafter, the problem that can occur with the second technique will be described in detail. The second technique typically uses a laser diode as the light source. The laser diodes available include edge-emitting laser diodes and surface-emitting laser diodes. In an edge-emitting laser diode, the emission part for emitting the laser light is located in an end face that lies at an end of the laser diode in a direction parallel to the plane of an active layer. The emission part emits the laser light in the direction parallel to the plane of the active layer. In a surface-emitting laser diode, the emission part for emitting the laser light is located in a surface that lies at an end of the laser diode in a direction perpendicular to the plane of the active layer. The emission part emits the laser light in the direction perpendicular to the plane of the active layer.

The laser light emitted from a laser diode can be made incident on the waveguide by a technique described in U.S. Patent Application Publication No. 2008/0055762 A1, for example. This publication describes arranging an edge-emitting laser diode with its emission part opposed to the incident end of the waveguide so that the laser light emitted from the emission part is incident on the incident end of the waveguide without the intervention of any optical element. According to this technique, the laser diode is arranged so that the longitudinal direction of the laser diode, i.e., the direction of the optical axis of the laser light to be emitted from the emission part, is perpendicular to the end face of the slider where the incident end of the waveguide is located. In such a case, the laser diode needs to be positioned with high precision so that the optical axis of the laser light emitted from the emission part will not tilt with respect to the optical axis of the waveguide. If the optical axis of the laser light emitted from the emission part tilts with respect to the optical axis of the waveguide, the laser light may fail to be delivered to the plasmon antenna with sufficient intensity. When the laser diode is to be arranged so that the longitudinal direction of the laser diode is perpendicular to the end face of the slider where the incident end of the waveguide is located, however, there is a problem that the longitudinal direction of the laser diode can easily tilt with respect to the direction perpendicular to the end face of the slider where the incident end of the waveguide is located, and it is thus difficult to align the laser light with the waveguide.

JP 2008-16096 A describes a head that has a unit substrate with an edge-emitting laser diode attached thereto and a propagation layer for guiding laser light emitted from the laser diode to the incident end of the waveguide, the unit substrate and the propagation layer being arranged on a rear surface of the slider opposite to the medium facing surface. In this head, the laser diode emits laser light in a direction parallel to the rear surface. The propagation layer has a total reflection surface for changing the direction of travel of the laser light emitted from the laser diode. In the head, the distance from the laser-light emission part of the laser diode to the total reflection surface and the distance from the total reflection surface to the incident end of the waveguide are both relatively long. In consequence, the laser light can be too large in diameter at the position of the incident end of the waveguide, so that part of the laser light may fail to enter the waveguide and the amount of the laser light to propagate through the waveguide may thus decrease.

The laser light emitted from a laser diode may be made incident on the waveguide by other techniques. For example, U.S. Patent Application Publication No. 2008/0002298 A1 describes a technique in which a surface-emitting laser diode is arranged with its emission part opposed to the surface of the slider on the trailing side so that the laser light emitted from the emission part is incident on the waveguide from above. This technique facilitates aligning the laser light with the waveguide. Surface-emitting laser diodes, however, typically have a lower optical output as compared with edge-emitting laser diodes. The technique therefore has the problem that it is difficult to provide laser light of sufficiently high intensity for use in generating the near-field light.

OBJECT AND SUMMARY OF THE INVENTION

It is an object of the present invention to provide a heat-assisted magnetic recording head that makes it possible that, while using an edge-emitting laser diode as the light source for emitting light to be used for generating near-field light, alignment of the laser light with the waveguide is easy and the path of the laser light from the laser-light emission part of the laser diode to the waveguide is shortened, and to provide a laser assembly for use in the heat-assisted magnetic recording head, a method of manufacturing the same, and a method of manufacturing an external mirror for use in the laser assembly.

A heat-assisted magnetic recording head according to the present invention includes a slider, an edge-emitting laser diode fixed to the slider, and an external mirror provided outside the slider and fixed to the laser diode.

The slider includes: a medium facing surface that faces a recording medium; a magnetic pole that has an end face located in the medium facing surface and produces a recording magnetic field for recording data on the recording medium; a waveguide that allows light to propagate therethrough; a near-field light generating element having a near-field light generating part located in the medium facing surface, a surface plasmon being excited based on the light propagating through the waveguide, the surface plasmon propagating to the near-field light generating part, the near-field light generating part generating near-field light based on the surface plasmon; and a substrate on which the magnetic pole, the near-field light generating element and the waveguide are stacked.

The laser diode includes: an active layer; an emitting end face that lies at an end in a direction parallel to a plane of the active layer and includes an emission part for emitting laser light; a mounting surface that lies at an end in a direction perpendicular to the plane of the active layer and faces the slider; and a rear surface that is opposite to the mounting surface.

The external mirror includes: a first to-be-fixed part disposed along the emitting end face; a second to-be-fixed part disposed along the rear surface; and a coupling part that couples the first to-be-fixed part and the second to-be-fixed part to each other. The first to-be-fixed part has a first surface that faces the emitting end face, a second surface opposite to the first surface, and an end face that lies at an end opposite to the coupling part and connects the first surface and the second surface to each other. The end face includes a reflecting surface that reflects the laser light emitted from the emission part toward the waveguide. The reflecting surface is oblique with respect to the first surface and continuous with the first surface.

In the heat-assisted magnetic recording head according to the present invention, the reflecting surface may form an angle of 45° with respect to the first surface.

In the heat-assisted magnetic recording head according to the present invention, the slider may have a rear surface that is opposite to the medium facing surface. The waveguide may have an incident end face for the laser light reflected by the external mirror to be incident on, the incident end face being located in the rear surface of the slider. The laser diode may be arranged so that the mounting surface faces the rear surface of the slider.

In the heat-assisted magnetic recording head according to the present invention, the substrate may have a top surface that faces toward the magnetic pole, the near-field light generating element and the waveguide. The slider may have a top surface that lies at an end above the top surface of the substrate. The laser diode may be arranged so that the mounting surface faces the top surface of the slider. In such a case, the slider may further include an internal mirror that reflects the laser light reflected by the external mirror so as to let the laser light travel through the waveguide toward the medium facing surface. The laser diode, the external mirror, the internal mirror, and the waveguide may be arranged so that the direction of travel of the laser light emitted from the emission part and the direction of travel of the laser light reflected by the internal mirror are orthogonal to each other as viewed from above the top surface of the slider. Alternatively, the laser diode, the external mirror, the internal mirror, and the waveguide may be arranged so that the direction of travel of the laser light emitted from the emission part and the direction of travel of the laser light reflected by the internal mirror are parallel to each other. The waveguide may have an incident end face for the laser light reflected by the external mirror to be incident on, the incident end face being located in the top surface of the slider.

In the heat-assisted magnetic recording head according to the present invention, the distance between the emission part and the mounting surface may be smaller than the distance between the emission part and the rear surface of the laser diode.

In the heat-assisted magnetic recording head according to the present invention, the near-field light generating element may have an outer surface that includes: a first end face that is located in the medium facing surface; a second end face that is farther from the medium facing surface; and a coupling portion that couples the first end face and the second end face to each other. The first end face may include the near-field light generating part. In this case, a length of the near-field light generating element in a direction perpendicular to the medium facing surface may be greater than a length of the first end face in a direction perpendicular to the top surface of the substrate, and the waveguide may have an outer surface including an opposed portion that is opposed to a part of the coupling portion. In this case, the slider may further include an interposition layer that has a refractive index lower than that of the waveguide and is interposed between the opposed portion and the near-field light generating element.

In the heat-assisted magnetic recording head according to the present invention, the external mirror may include a main body, and a metal film that adheres to the main body to form the reflecting surface.

A laser assembly according to the present invention is usable in combination with the foregoing slider to constitute a heat-assisted magnetic recording head. The laser assembly according to the present invention includes an edge-emitting laser diode to be fixed to the slider, and an external mirror to be provided outside the slider and fixed to the laser diode. The laser diode includes: an active layer; an emitting end face that lies at an end in a direction parallel to a plane of the active layer and includes an emission part for emitting laser light; a mounting surface that lies at an end in a direction perpendicular to the plane of the active layer and is to face the slider; and a rear surface that is opposite to the mounting surface. The external mirror includes: a first to-be-fixed part disposed along the emitting end face; a second to-be-fixed part disposed along the rear surface; and a coupling part that couples the first to-be-fixed part and the second to-be-fixed part to each other. The first to-be-fixed part has a first surface that faces the emitting end face, a second surface opposite to the first surface, and an end face that lies at an end opposite to the coupling part and connects the first surface and the second surface to each other. The end face includes a reflecting surface that reflects the laser light emitted from the emission part toward the waveguide. The reflecting surface is oblique with respect to the first surface and continuous with the first surface.

In the laser assembly according to the present invention, the reflecting surface may form an angle of 45° with respect to the first surface.

In the laser assembly according to the present invention, the distance between the emission part and the mounting surface may be smaller than the distance between the emission part and the rear surface.

In the laser assembly according to the present invention, the external mirror may include a main body, and a metal film that adheres to the main body to form the reflecting surface.

A manufacturing method for the laser assembly according to the present invention includes the steps of: fabricating the external mirror; and fixing the external mirror to the laser diode. The step of fabricating the external mirror includes the steps of: forming the main body to have a polished surface to underlie the metal film, by polishing an end portion of a main body material shaped like a bent plate to form the polished surface; and depositing the metal film onto the polished surface of the main body.

In the manufacturing method for the laser assembly according to the present invention, the reflecting surface may form an angle of 45° with respect to the first surface.

In the manufacturing method for the laser assembly according to the present invention, the distance between the emission part and the mounting surface may be smaller than the distance between the emission part and the rear surface.

A manufacturing method for the external mirror according to the present invention includes the steps of: forming the main body to have a polished surface to underlie the metal film, by polishing an end portion of a main body material shaped like a bent plate to form the polished surface; and depositing the metal film onto the polished surface of the main body.

In the manufacturing method for the external mirror according to the present invention, the reflecting surface may form an angle of 45° with respect to the first surface.

As employed herein, the direction of travel of the laser light refers to the direction of travel at the center of the laser beam.

Where the components of the heat-assisted magnetic recording head excluding the substrate are concerned in the present application, a surface closer to the top surface of the substrate will be defined as "bottom surface," and a surface farther from the top surface of the substrate will be defined as "top surface."

In the present invention, the edge-emitting laser diode is fixed to the slider such that the mounting surface lying at an end in the direction perpendicular to the plane of the active layer faces the slider. According to the present invention, it is thus possible to align the laser diode with respect to the slider so that the optical axis of the laser light emitted from the emission part of the laser diode will not tilt with respect to a desired direction. In the present invention, the laser light emitted from the emission part is reflected toward the waveguide by the external mirror. The external mirror has the first to-be-fixed part, the second to-be-fixed part, and the coupling part. The first to-be-fixed part has the first surface that faces the emitting end face, the second surface opposite to the first surface, and the end face that lies at the end opposite to the coupling part and connects the first surface and the second surface to each other. The end face includes the reflecting surface. The reflecting surface is oblique with respect to the first surface and continuous with the first surface. The external mirror having such a configuration is alignable with respect to the laser diode so that the optical axis of the laser light reflected by the reflecting surface will not tilt with respect to a desired direction. Furthermore, according to the present invention, it is possible to reduce both the distance from the emission part to the reflecting surface and the distance from the reflecting surface to the slider. In consequence, the present invention allows easy alignment of the laser light with the waveguide and allows shortening of the path of the laser light from the emission part to the waveguide, while using an edge-emitting laser diode as the light source for emitting light to be used for generating near-field light.

According to the manufacturing method for the laser assembly or the manufacturing method for the external mirror of the present invention, it is possible to prevent the reflecting surface from being rounded at a portion thereof near the border with the first surface of the first to-be-fixed part. Consequently, according to the present invention, it is possible to make the laser light emitted from the emission part to be reflected at a point in the reflecting surface closer to the border with the first surface. This allows shortening of the path of the laser light from the emission part to the reflecting surface.

Other and further objects, features and advantages of the present invention will appear more fully from the following description.

DETAILED DESCRIPTION OF THE PREFERRED EMBODIMENTS

First Embodiment

Figure 1:
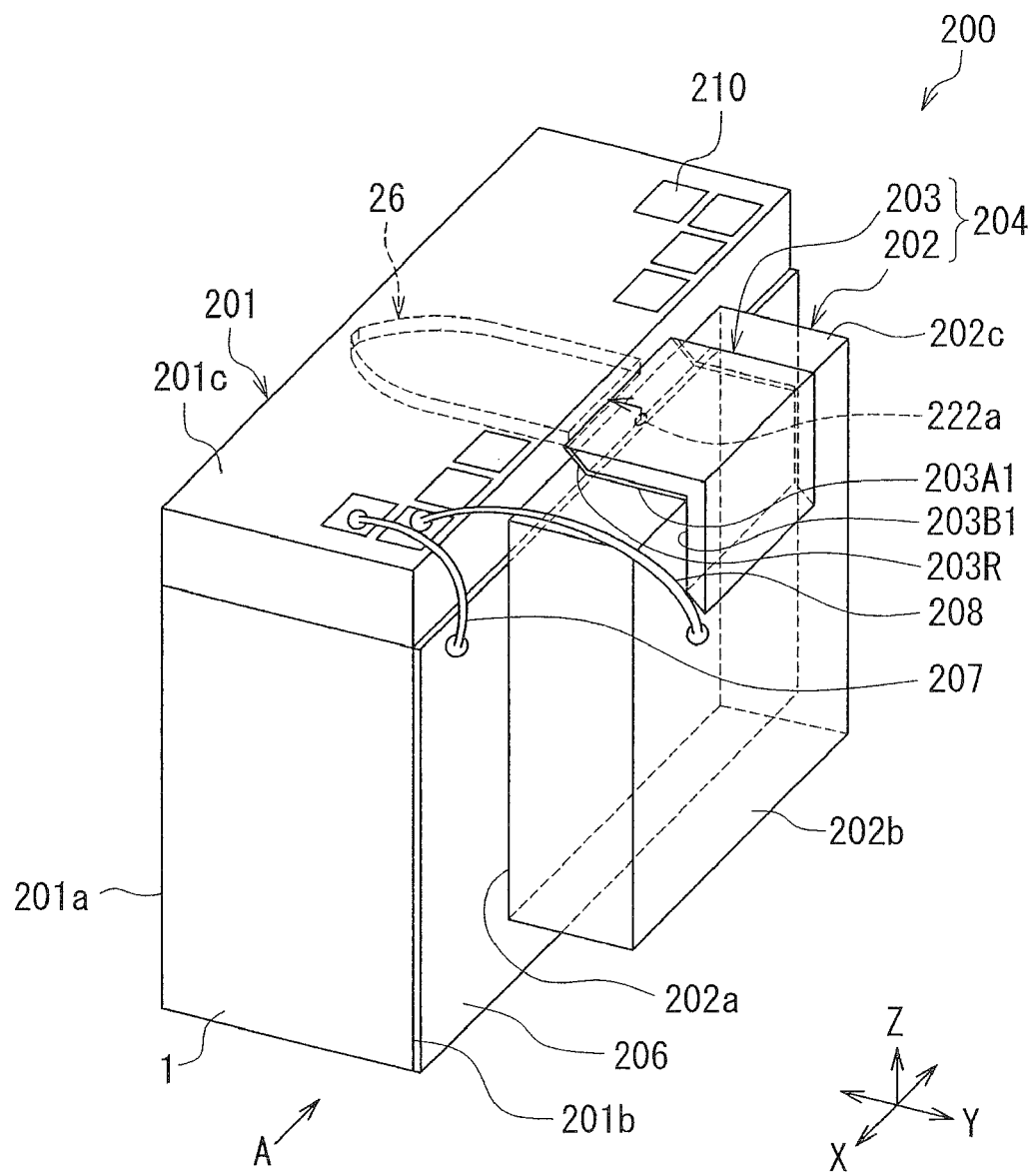
FIG. 1 is a perspective view of a heat-assisted magnetic recording head according to a first embodiment of the invention.
Figure 2:
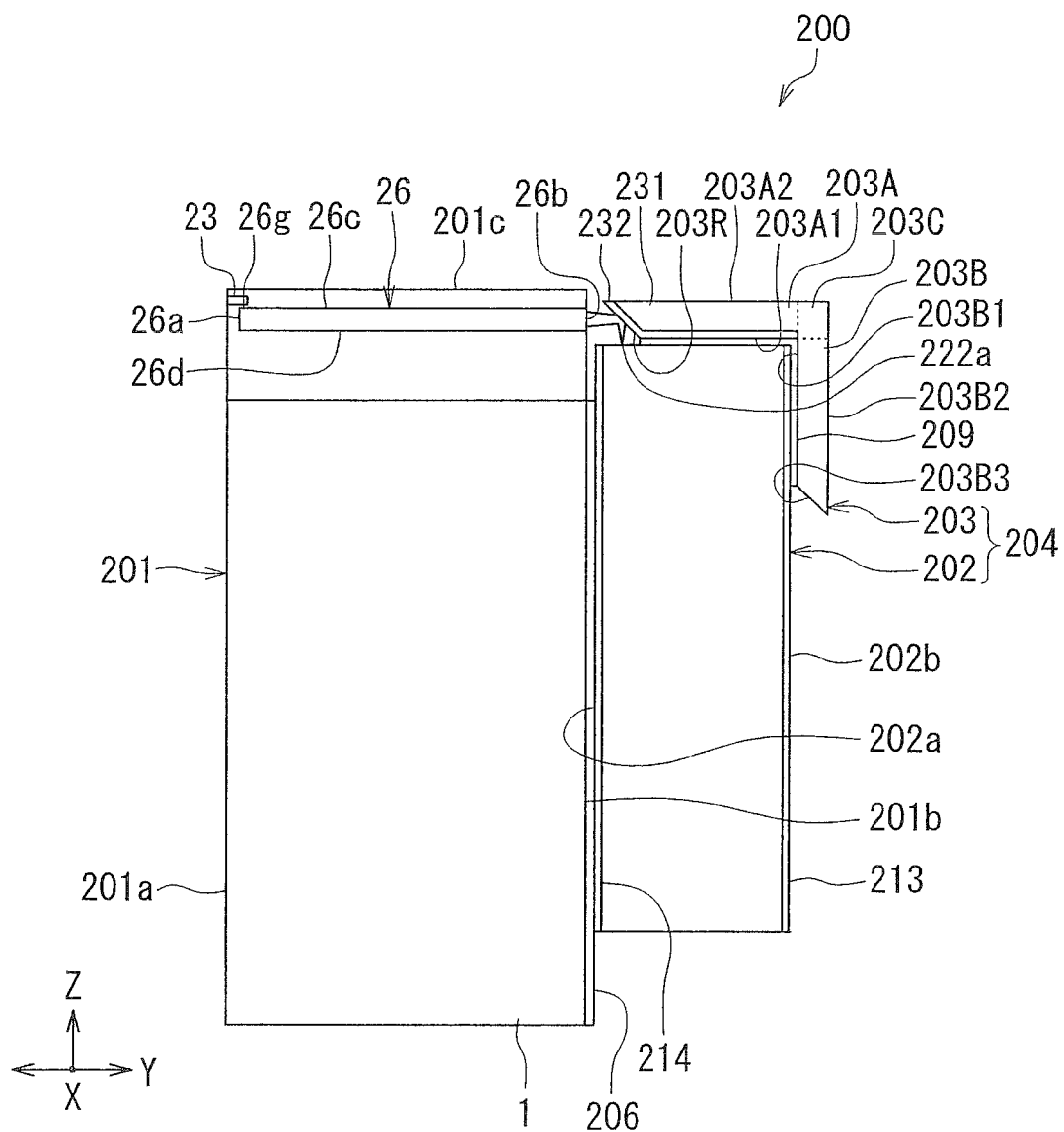
FIG. 2 is a side view of the heat-assisted magnetic recording head as viewed from the direction A of FIG. 1.

Preferred embodiments of the present invention will now be described in detail with reference to the drawings. Reference is first made to FIG. 1 and FIG. 2 to describe a heat-assisted magnetic recording head and a magnetic disk drive according to a first embodiment of the invention. FIG. 1 is a perspective view of the heat-assisted magnetic recording head according to the present embodiment. FIG. 2 is a side view of the heat-assisted magnetic recording head as viewed from the direction A of FIG. 1.

The magnetic disk drive of the present embodiment incorporates the heat-assisted magnetic recording head 200 according to the present embodiment. The heat-assisted magnetic recording head 200 is supported by a not-shown suspension and is disposed to face a disk-shaped recording medium (a magnetic disk) that is driven to rotate. In FIG. 1 and FIG. 2, the X direction is a direction across the tracks of the recording medium, the Y direction is a direction perpendicular to the surface of the recording medium, and the Z direction is the direction of travel of the recording medium as viewed from the heat-assisted magnetic recording head 200. The X direction, the Y direction and the Z direction are orthogonal to one another.

The heat-assisted magnetic recording head 200 includes a slider 201, an edge-emitting laser diode 202 fixed to the slider 201, and an external mirror 203 provided outside the slider 201 and fixed to the laser diode 202. The slider 201 is nearly hexahedron-shaped, and has a medium facing surface 201a that faces the recording medium, a rear surface 201b that is opposite to the medium facing surface 201a, and four surfaces that connect the medium facing surface 201a to the rear surface 201b. The laser diode 202 is fixed to the rear surface 201b. One of the four surfaces that connect the medium facing surface 201a to the rear surface 201b is the top surface 201c. The slider 201 has a plurality of terminals 210 provided on the top surface 201c.

When the recording medium rotates and travels in the Z direction, an airflow passing between the recording medium and the slider 201 generates a lift in the Y direction of FIG. 1, and the lift is exerted on the slider 201. The lift causes the slider 201 to slightly fly over the surface of the recording medium.

Figure 5:
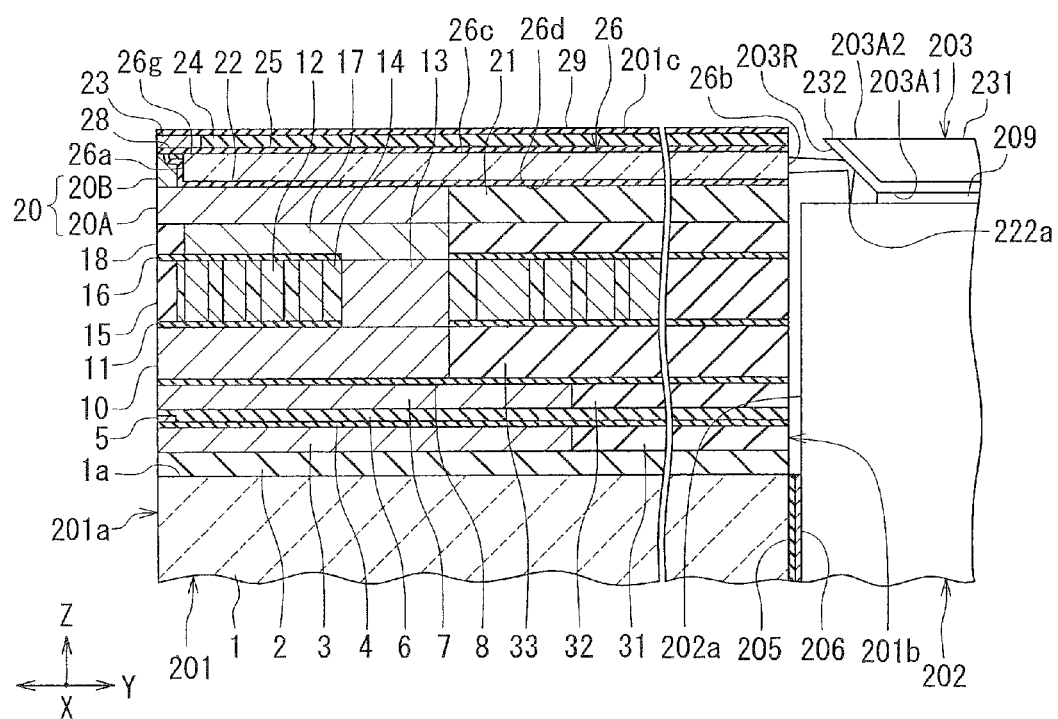
FIG. 5 is a cross-sectional view showing the configuration of a slider of the first embodiment of the invention.
Figure 6:
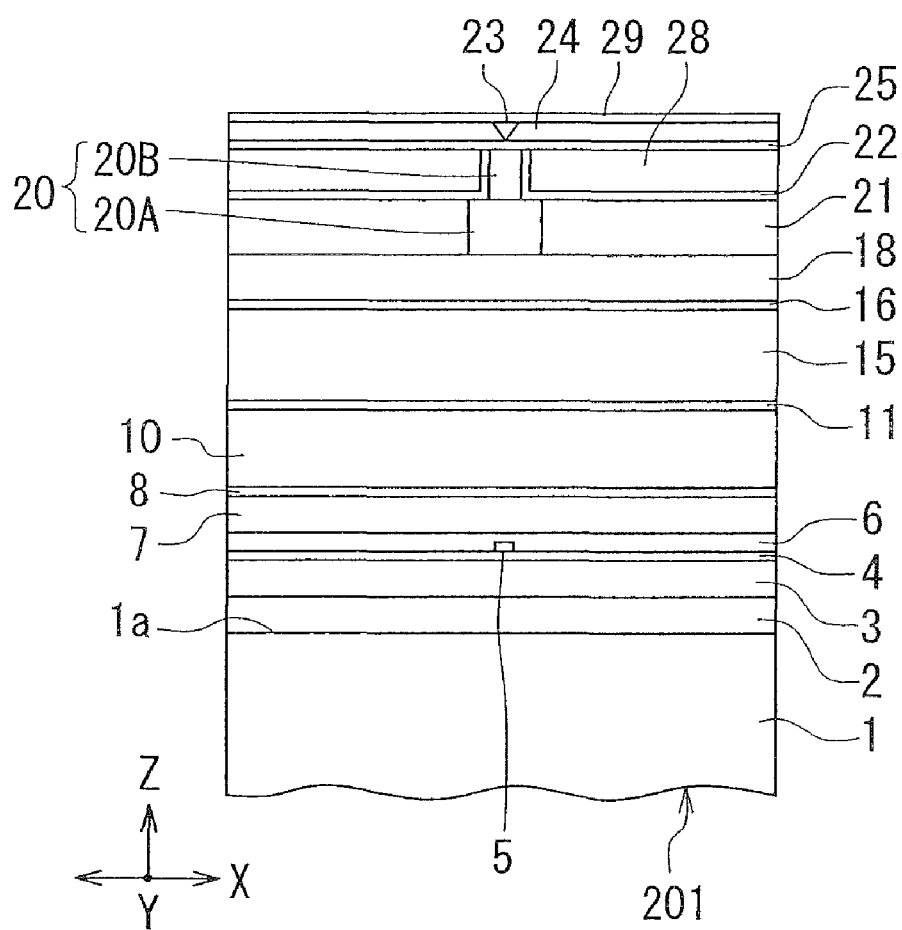
FIG. 6 is a front view showing the medium facing surface of the slider of the first embodiment of the invention.
Figure 7:
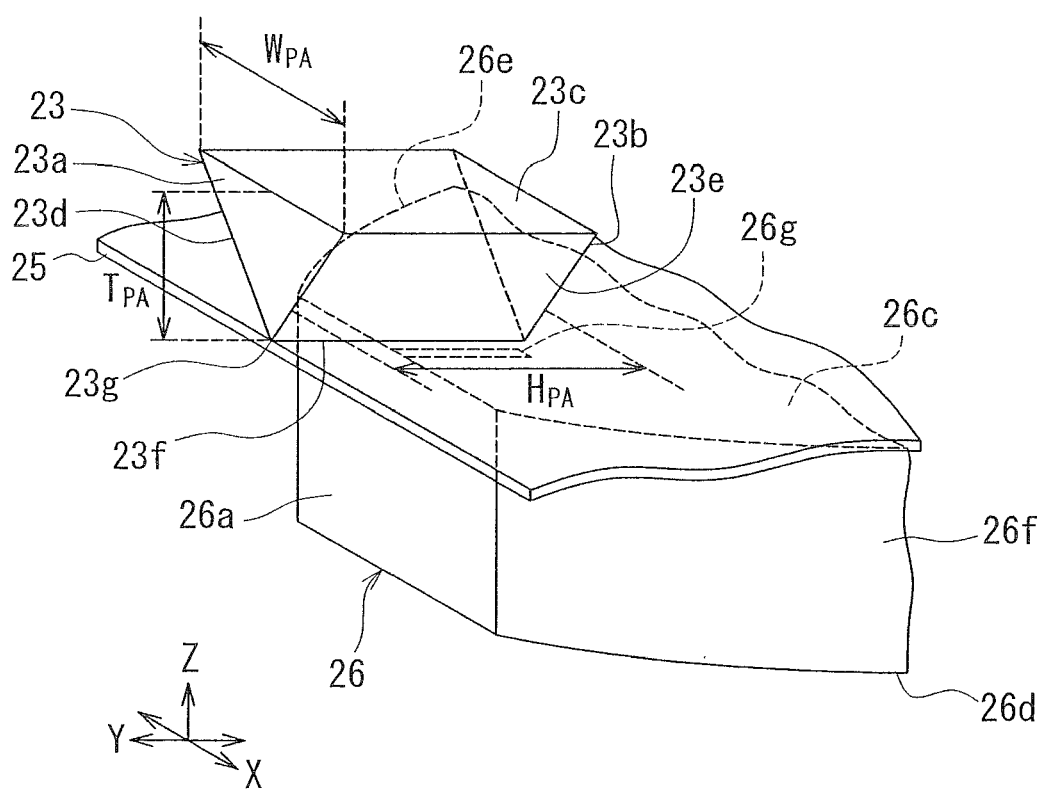
FIG. 7 is a perspective view showing a near-field light generating element and its vicinity in the heat-assisted magnetic recording head according to the first embodiment of the invention.

The configuration of the slider 201 will now be described in detail with reference to FIG. 5 to FIG. 7. FIG. 5 is a cross-sectional view showing the configuration of the slider 201. FIG. 6 is a front view showing the medium facing surface 201a of the slider 201. FIG. 7 is a perspective view showing a near-field light generating element and its vicinity in the heat-assisted magnetic recording head 200. The X, Y and Z directions shown in FIG. 1 are also shown in FIG. 5 to FIG. 7. In FIG. 5 the X direction is orthogonal to the Y and Z directions. In FIG. 6 the Y direction is orthogonal to the X and Z directions.

As shown in FIG. 5 and FIG. 6, the slider 201 includes: a substrate 1 made of a ceramic material such as aluminum oxide-titanium carbide ($Al_2O_3$—TiC) and having a top surface 1a; an insulating layer 2 made of an insulating material and disposed on the top surface 1a of the substrate 1; a bottom shield layer 3 made of a magnetic material and disposed on the insulating layer 2; and an insulating layer 31 made of an insulating material and disposed around the bottom shield layer 3 on the insulating layer 2. The insulating layers 2 and 31 are made of alumina ($Al_2O_3$), for example. The bottom shield layer 3 and the insulating layer 31 are flattened at the top.

The slider 201 further includes: a bottom shield gap film 4 which is an insulating film disposed over the top surfaces of the bottom shield layer 3 and the insulating layer 31; a magnetoresistive (MR) element 5 as a read element disposed on the bottom shield gap film 4; a top shield gap film 6 which is an insulating film disposed on the MR element 5; a top shield layer 7 made of a magnetic material and disposed on the top shield gap film 6; and an insulating layer 32 made of an insulating material and disposed around the top shield layer 7 on the top shield gap film 6. The insulating layer 32 is made of alumina, for example. The top shield layer 7 and the insulating layer 32 are flattened at the top.

An end of the MR element 5 is located in the medium facing surface 201a. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction nearly parallel to the plane of layers constituting the GMR element or the current-perpendicular-to-plane (CPP) type in which the current used for detecting magnetic signals is fed in a direction nearly perpendicular to the plane of layers constituting the GMR element. The parts from the bottom shield layer 3 to the top shield layer 7 constitute a reproducing head.

The slider 201 further includes: a nonmagnetic layer 8 made of a nonmagnetic material and disposed over the top surfaces of the top shield layer 7 and the insulating layer 32; a return magnetic pole layer 10 made of a magnetic material and disposed on the nonmagnetic layer 8; and an insulating layer 33 made of an insulating material and disposed around the return magnetic pole layer 10 on the nonmagnetic layer 8. The nonmagnetic layer 8 and the insulating layer 33 are made of alumina, for example. The return magnetic pole layer 10 and the insulating layer 33 are flattened at the top.

The slider 201 further includes: an insulating layer 11 disposed on part of the top surfaces of the return magnetic pole layer 10 and the insulating layer 33; a coil 12 disposed on the insulating layer 11; and a coupling layer 13 disposed on the return magnetic pole layer 10. The return magnetic pole layer 10 and the coupling layer 13 are each made of a magnetic material. The material of the return magnetic pole layer 10 and the coupling layer 13 may be CoFeN, CoNiFe, NiFe or CoFe, for example. The insulating layer 11 is made of alumina, for example. The coil 12 produces a magnetic field corresponding to data to be recorded on the recording medium. The coil 12 is planar spiral-shaped and wound around the coupling layer 13. The coil 12 is made of a conductive material such as copper.

The slider 201 further includes: an insulating layer 14 made of an insulating material and disposed around the coil 12 and in the space between every adjacent turns of the coil 12; an insulating layer 15 disposed around the insulating layer 14 and the coupling layer 13 on the insulating layer 11; and an insulating layer 16 disposed over the coil 12 and the insulating layers 14 and 15. The coil 12, the coupling layer 13 and the insulating layers 14 and 15 are flattened at the top. The insulating layer 14 is made of photoresist, for example. The insulating layers 15 and 16 are made of alumina, for example.

The slider 201 further includes: a bottom yoke layer 17 made of a magnetic material and disposed over the coupling layer 13 and the insulating layer 16; and a nonmagnetic layer 18 made of a nonmagnetic material and disposed around the bottom yoke layer 17 on the insulating layer 16. The material of the bottom yoke layer 17 may be CoFeN, CoNiFe, NiFe or CoFe, for example. The nonmagnetic layer 18 is made of alumina, for example. The bottom yoke layer 17 has an end face that is closer to the medium facing surface 201a and located at a distance from the medium facing surface 201a. The bottom yoke layer 17 and the nonmagnetic layer 18 are flattened at the top.

The slider 201 further includes a magnetic pole 20. The magnetic pole 20 includes a first layer 20A and a second layer 20B. The first layer 20A lies over the bottom yoke layer 17 and the nonmagnetic layer 18. The first layer 20A has an end face located in the medium facing surface 201a. The end face is rectangular in shape, for example.

The second layer 20B lies on the first layer 20A in the vicinity of the medium facing surface 201a. The second layer 20B has a front end face located in the medium facing surface 201a, and a rear end face opposite to the front end face. The front end face of the second layer 20B is rectangular in shape, for example.

The magnetic pole 20 allows a magnetic flux corresponding to the magnetic field produced by the coil 12 to pass, and produces a recording magnetic field for recording data on the recording medium by means of a perpendicular magnetic recording system. The position of the end of a bit pattern to be recorded on the recording medium depends on the position of the top edge, i.e., the edge farther from the top surface 1a of the substrate 1, of the front end face of the second layer 20B. The width of the front end face of the second layer 20B taken at the top edge defines the track width.

The end face of the first layer 20A located in the medium facing surface 201a may have a width equal to or greater than the width of the front end face of the second layer 20B.

As shown in FIG. 5, the second layer 20B includes a first portion having the front end face, and a second portion that is located farther from the medium facing surface 201a than is the first portion and has a thickness smaller than that of the first portion. The first portion has a thickness that does not change with the distance from the medium facing surface 201a. The top surface of the first portion is located farther from the top surface 1a of the substrate 1 than is the top surface of the second portion. The top surface of the second layer 20B is thus bent.

The first layer 20A and the second layer 20B are each made of a magnetic metal material. The material of the first layer 20A and the second layer 20B may be NiFe, CoNiFe or CoFe, for example.

The slider 201 further includes a nonmagnetic layer 21 made of a nonmagnetic material and disposed around the first layer 20A on the nonmagnetic layer 18. The nonmagnetic layer 21 is made of alumina, for example. The first layer 20A and the nonmagnetic layer 21 are flattened at the top.

The slider 201 further includes a clad layer 22 disposed over the top surfaces of the first layer 20A and the nonmagnetic layer 21, and a waveguide 26 and a clad layer 28 that are disposed on the clad layer 22. The clad layer 22 is arranged to cover the top surfaces of the first layer 20A and the nonmagnetic layer 21 around the second layer 20B, and the rear end face and part of the top surface (the top surface of the second portion) of the second layer 20B. The clad layer 28 lies around the waveguide 26. The waveguide 26 is made of a dielectric material that transmits laser light to be described later. The clad layers 22 and 28 are each made of a dielectric material that has a refractive index lower than that of the wave guide 26. For example, the waveguide 26 is made of $Ta_2O_5$ which has a refractive index of approximately 2.1, and the clad layers 22 and 28 are made of alumina which has a refractive index of approximately 1.8. The first portion of the second layer 20B, the waveguide 26, and the clad layers 22 and 28 are flattened at the top. The shape of the waveguide 26 will be described in detail later.

The slider 201 further includes an interposition layer 25 disposed over the top surfaces of the first portion of the second layer 20B, the waveguide 26 and the clad layers 22 and 28. The interposition layer 25 is made of a dielectric material that has a refractive index lower than that of the waveguide 26 and transmits the laser light. For example, the interposition layer 25 is made of alumina which has a refractive index of approximately 1.8. The interposition layer 25 has a thickness within the range of 30 to 70 nm, for example.

The slider 201 further includes: a near-field light generating element 23 disposed on the interposition layer 25; an insulating layer 24 made of an insulating material and disposed around the near-field light generating element 23 on the interposition layer 25; and an insulating layer 29 made of an insulating material and disposed over the near-field light generating element 23 and the insulating layer 24. The near-field light generating element 23 and the insulating layer 24 are flattened at the top. The near-field light generating element 23 is made of a metal. Specifically, the near-field light generating element 23 is made of one of Au, Ag, Al, Cu, Pd, Pt, Rh and Ir, or an alloy composed of two or more of these elements. The insulating layers 24 and 29 are made of alumina, for example. The top surface of the insulating layer 29 constitutes the top surface 201c of the slider 201. In the slider 201, the substrate 1 has the top surface 1a facing toward the magnetic pole 20, the near-field light generating element 23 and the waveguide 26, and the top surface 201c of the slider 201 lies at an end above the top surface 1a of the substrate 1.

As shown in FIG. 7, the near-field light generating element 23 has a near-field light generating part 23g located in the medium facing surface 201a. The near-field light generating element 23 is in the shape of a triangular prism, having an outer surface described below. The outer surface of the near-field light generating element 23 includes: a first end face 23a that is located in the medium facing surface 201a; a second end face 23b that is farther from the medium facing surface 201a; and a coupling portion that couples the first end face 23a and the second end face 23b to each other. The coupling portion includes: a top surface 23c that is farther from the top surface 1a of the substrate 1; two side surfaces 23d and 23e that decrease in distance from each other with decreasing distance to the top surface 1a of the substrate 1; and an edge part 23f that connects the two side surfaces 23d and 23e to each other. The first end face 23a is shaped like an isosceles triangle with the vertex downward. The first end face 23a includes the near-field light generating part 23g. Specifically, the near-field light generating part 23g refers to the end of the edge part 23f and its vicinity in the end face 23a.

As shown in FIG. 7, the length of the near-field light generating element 23 in the direction perpendicular to the medium facing surface 201a will be denoted by the symbol $H_{PA}$; the width of the first end face 23a at its top edge will be denoted by the symbol $W_{PA}$; and the length of the first end face 23a in the direction perpendicular to the top surface 1a of the substrate 1 will be denoted by the symbol $T_{PA}$. The length $H_{PA}$ of the near-field light generating element 23 in the direction perpendicular to the medium facing surface 201a is greater than the length $T_{PA}$ of the first end face 23a in the direction perpendicular to the top surface 1a of the substrate 1. Both of $W_{PA}$ and $T_{PA}$ are smaller than or equal to the wavelength of light that propagates through the waveguide 26. $W_{PA}$ falls within the range of 50 to 150 nm, for example. $T_{PA}$ falls within the range of 50 to 150 nm, for example. $H_{PA}$ falls within the range of 0.25 to 2.5 μm, for example.

Figure 4:
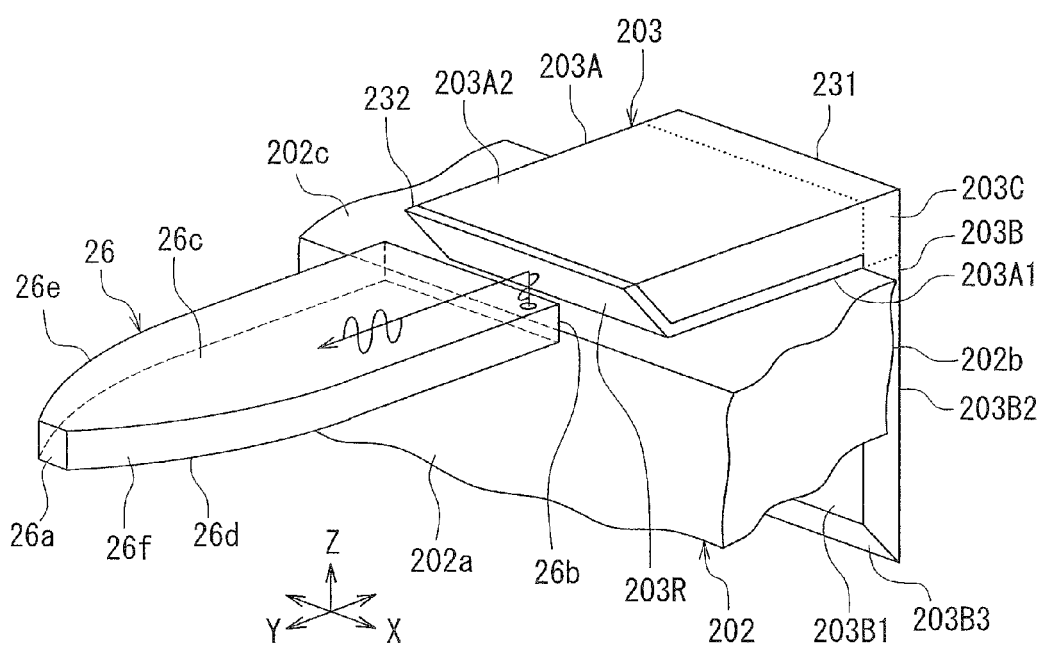
FIG. 4 is a perspective view showing the main part of the heat-assisted magnetic recording head according to the first embodiment of the invention.

A detailed description will now be given of the shape of the waveguide 26 with reference to FIG. 1 and FIG. 4. FIG. 4 is a perspective view showing the main part of the heat-assisted magnetic recording head 200. As shown in FIG. 1 and FIG. 4, the waveguide 26 extends in the direction perpendicular to the medium facing surface 201a (the Y direction). The waveguide 26 has an outer surface. The outer surface includes: a front end face 26a that is closer to the medium facing surface 201a; an incident end face 26b that is located in the rear surface 201b; a top surface 26c that is farther from the top surface 1a of the substrate 1; a bottom surface 26d that is closer to the top surface 1a of the substrate 1; and two side surfaces 26e and 26f that are opposite to each other in the track width direction. The front end face 26a is opposed to the rear end face of the second layer 20B with the clad layer 22 interposed therebetween.

As shown in FIG. 7, the outer surface of the waveguide 26 includes an opposed portion 26g that is opposed to a part of the coupling portion of the outer surface of the near-field light generating element 23. In the present embodiment, in particular, the opposed portion 26g is a part of the top surface 26c of the waveguide 26 that is opposed to a part of the edge part 23f of the near-field light generating element 23 and its vicinity with the interposition layer 25 interposed therebetween. The previously-mentioned configuration that the length $H_{PA}$ of the near-field light generating element 23 in the direction perpendicular to the medium facing surface 201a is greater than the length $T_{PA}$ of the first end face 23a in the direction perpendicular to the top surface 1a of the substrate 1 is necessary in order that the opposed portion 26g, which is a part of the top surface 26c of the waveguide 26, is opposed to a part of the edge part 23f of the near-field light generating element 23 and its vicinity with the interposition layer 25 interposed therebetween.

Figure 3:
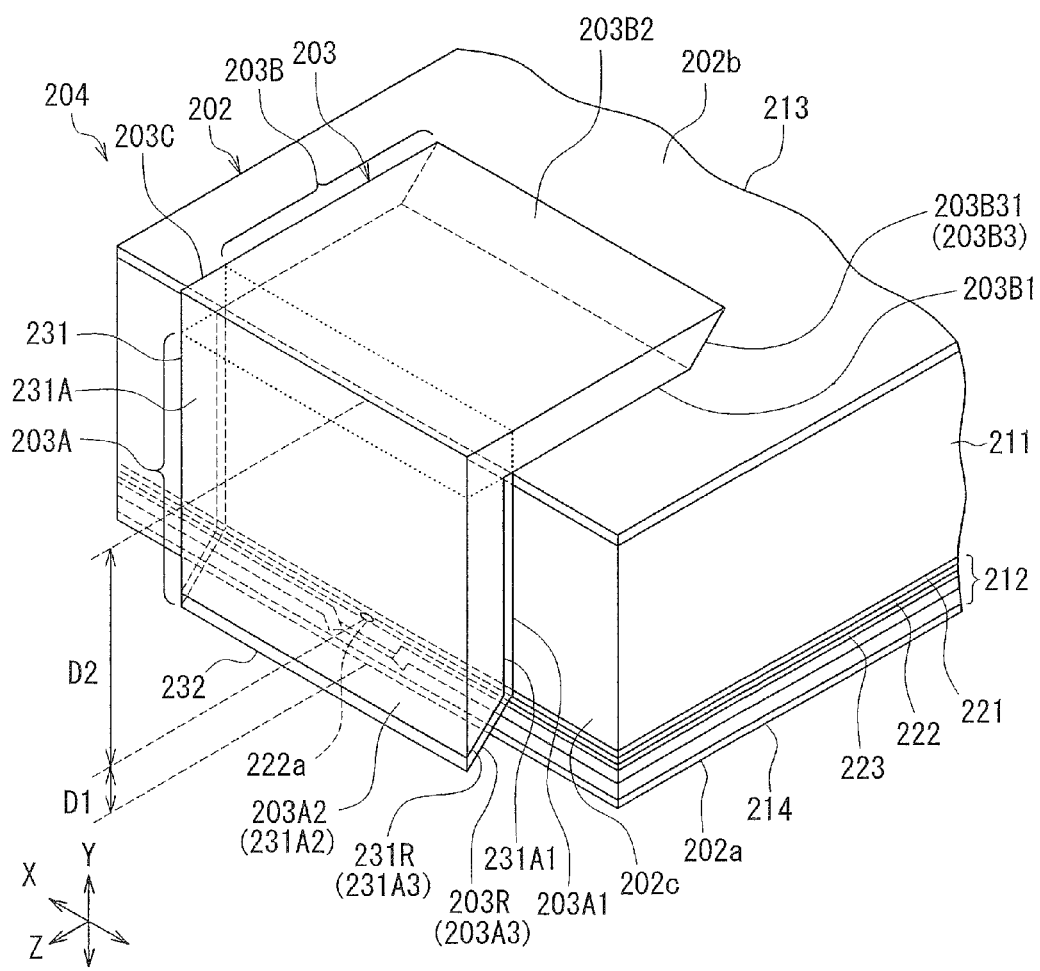
FIG. 3 is a perspective view showing the laser diode and the external mirror of FIG. 1.

Reference is now made to FIG. 3 to describe the laser diode 202 and the external mirror 203. FIG. 3 is a perspective view showing the laser diode 202 and the external mirror 203. First, a detailed description will be given of the laser diode 202. As shown in FIG. 3, the laser diode 202 includes: an n-substrate 211 having two surfaces that face toward opposite directions; an n-electrode 213 bonded to one of the two surfaces of the n-substrate 211; a laser structure part 212 integrated on the other of the two surfaces of the n-substrate 211; and a p-electrode 214 bonded to the laser structure part 212 such that the laser structure part 212 is sandwiched between the n-substrate 211 and the p-electrode 214. The laser structure part 212 includes at least an n-clad layer 221, an active layer 222 and a p-clad layer 223. The n-clad layer 221 is disposed between the n-substrate 211 and the active layer 222. The p-clad layer 223 is disposed between the p-electrode 214 and the active layer 222. The active layer 222 has a surface that faces the n-clad layer 221, and a surface that faces the p-clad layer 223.

The laser diode 202 is in the shape of a rectangular solid, having a mounting surface 202a that lies at an end in a direction perpendicular to the plane of the active layer 222, a rear surface 202b opposite to the mounting surface 202a, and four surfaces that connect the mounting surface 202a and the rear surface 202b to each other. The mounting surface 202a and the rear surface 202b are parallel to the plane of the active layer 222. The mounting surface 202a is formed by the surface of the p-electrode 214. The rear surface 202b is formed by the surface of the n-electrode 213. One of the four surfaces that connect the mounting surface 202a and the rear surface 202b to each other is an emitting end face 202c. The emitting end face 202c lies at an end in a direction parallel to the plane of the active layer 222. The emitting end face 202c includes an emission part 222a for emitting laser light. The emission part 222a lies at an end of the active layer 222. The mounting surface 202a and the rear surface 202b each have an area greater than that of the emitting end face 202c.

In the present embodiment, as shown in FIG. 3, the distance D1 between the emission part 222a and the mounting surface 202a of the laser diode 202 is smaller than the distance D2 between the emission part 222a and the rear surface 202b of the laser diode 202. D1 is 6 to 8 µm or so. D2 is around 50 µm. The surface of the n-substrate 211 to which the n-electrode 213 is to be bonded is typically polished, and the n-substrate 211 thus varies in thickness. This results in variations in D2. D1 varies smaller than D2 does.

As shown in FIG. 5, the heat-assisted magnetic recording head 200 further includes an insulating layer 205, and a conductor layer 206 disposed on the insulating layer 205. The insulating layer 205 covers the area of the rear surface 201b of the slider 201 that is formed by the surface of the substrate 1. The insulating layer 205 is made of alumina, for example. The conductor layer 206 is made of a metal such as Cu or Au. Note that the insulating layer 205 is omitted in FIG. 1 and FIG. 2. The insulating layer 205 need not be provided if the substrate 1 has sufficient insulation performance.

As shown in FIG. 1 and FIG. 2, the laser diode 202 is fixed to the slider 201 by bonding the p-electrode 214 (see FIG. 3) to the conductor layer 206 such that the mounting surface 202a faces the rear surface 201b of the slider 201 and the emitting end face 202c faces toward the Z direction.

As shown in FIG. 1, the heat-assisted magnetic recording head 200 further includes a bonding wire 207 that electrically connects the conductor layer 206 to one of the terminals 210, and a bonding wire 208 that electrically connects the n-electrode 213 to another one of the terminals 210. The p-electrode 214 is electrically connected to the one of the terminals 210 via the conductor layer 206 and the bonding wire 207.

Next, the external mirror 203 will be described in detail. As shown in FIG. 3, the external mirror 203 includes: a first to-be-fixed part 203A disposed along the emitting end face 202c of the laser diode 202; a second to-be-fixed part 203B disposed along the rear surface 202b of the laser diode 202; and a coupling part 203C that couples the first to-be-fixed part 203A and the second to-be-fixed part 203B to each other. The first to-be-fixed part 203A and the second to-be-fixed part 203B are both shaped like a plate.

The first to-be-fixed part 203A has: a first surface 203A1 that faces the emitting end face 202c; a second surface 203A2 opposite to the first surface 203A1; and an end face 203A3 that lies at an end opposite to the coupling part 203C and connects the first surface 203A1 and the second surface 203A2 to each other. The second surface 203A2 is parallel to the first surface 203A1. The end face 203A3 includes a reflecting surface 203R that reflects the laser light emitted from the emission part 222a toward the waveguide 26. The reflecting surface 203R is oblique with respect to the first surface 203A1 and continuous with the first surface 203A1. The reflecting surface 203R forms an angle of 45° with respect to the first surface 203A1. In the example shown in FIG. 3, the entire end face 203A3 forms the reflecting surface 203R.

The second to-be-fixed part 203B has: a first surface 203B1 that faces the rear surface 202b; a second surface 203B2 opposite to the first surface 203B1; and an end face 203B3 that lies at an end opposite to the coupling part 203C and connects the first surface 203B1 and the second surface 203B2 to each other. The second surface 203B2 is parallel to the first surface 203B1. The first surface 203B1 of the second to-be-fixed part 203B is orthogonal to the first surface 203A1 of the first to-be-fixed part 203A. The end face 203B3 includes an oblique surface 203B31 that is oblique with respect to the first surface 203B1 and continuous with the first surface 203B1. The oblique surface 203B31 forms an angle of 45° with respect to the first surface 203B1, and is parallel to the reflecting surface 203R. In the example shown in FIG. 3, the entire end face 203B3 forms the oblique surface 203B31.

The external mirror 203 includes a main body 231, and a metal film 232 that adheres to the main body 231 to form the reflecting surface 203R. The overall shape of the main body 231 is almost the same as that of the external mirror 203. The main body 231 includes a plate-like part 231A, the second to-be-fixed part 203B, and the coupling part 203C. The plate-like part 231A constitutes the first to-be-fixed part 203A in conjunction with the metal film 232.

The plate-like part 231A has a surface 231A1 corresponding to the first surface 203A1 of the first to-be-fixed part 203A, a surface 231A2 corresponding to the second surface 203A2 of the first to-be-fixed part 203A, and an end face 231A3 corresponding to the end face 203A3 of the first to-be-fixed part 203A. The surface 231A2 is a part of the second surface 203A2 other than the part formed by the metal film 232. The end face 231A3 connects the surface 231A1 and the surface 231A2 to each other. The end face 231A3 includes an oblique surface 231R that is oblique with respect to the surface 231A1 and continuous with the surface 231A1. The oblique surface 231R forms an angle of 45° with respect to the surface 231A1. In the example shown in FIG. 3, the entire end face 231A3 forms the oblique surface 231R.

The metal film 232 adheres to the main body 231 and covers the surface 231A1 and the end face 231A3. The first surface 203A1 of the first to-be-fixed part 203A is formed by the surface of the portion of the metal film 232 that covers the surface 231A1. The end face 203A3 of the first to-be-fixed part 203A is formed by the surface of the portion of the metal film 232 that covers the end face 231A3. The reflecting surface 203R is formed by the surface of the portion of the metal film 232 that covers the oblique surface 231R, in particular. The surface 231A2 and the end face of the metal film 232 continuous with the surface 231A2 constitute the second surface 203A2. Note that the metal film 232 need only cover the end face 231A3, and need not necessarily cover the surface 231A1.

The main body 231 may be made of an insulating material such as glass or resin, a semiconductor material such as silicon, or a metal material. The metal film 232 is made of a metal such as Au, Cu, Cr, Ag, or Al. The metal film 232 has a thickness of 50 to 200 nm or so.

As shown in FIG. 2, the external mirror 203 is fixed to the laser diode 202 by bonding the first surface 203A1 of the first to-be-fixed part 203A to the emitting end face 202c of the laser diode 202 and bonding the first surface 203B1 of the second to-be-fixed part 203B to the rear surface 202b of the laser diode 202, using an insulating adhesive. The reference numeral 209 in FIG. 2 indicates an adhesive layer formed by the adhesive. Note that the adhesive layer 209 is omitted in FIG. 1, FIG. 3 and FIG. 4. The external mirror 203 is insulated from the laser diode 202 by the adhesive layer 209. The reflecting surface 203R is located in front of the emission part 222a.

The laser diode 202 and the external mirror 203 constitute a laser assembly 204 according to the present embodiment. The laser assembly 204, in combination with the slider 201, constitutes the heat-assisted magnetic recording head 200. The laser assembly 204 and the parts of the slider 201 from the return magnetic pole layer 10 to the insulating layer 29 constitute a recording head.

Reference is now made to FIG. 1 to FIG. 5 to describe the path of the laser light emitted from the emission part 222a of the laser diode 202. The laser light emitted from the emission part 222a of the laser diode 202 is reflected by the reflecting surface 203R of the external mirror 203, enters the waveguide 26 from the incident end face 26b, and travels through the waveguide 26 toward the medium facing surface 201a (the front end face 26a).

FIG. 1 and FIG. 4 show an example of the shape of the waveguide 26. In this example, the two side surfaces 26e and 26f of the waveguide 26 are formed as a reflecting surface of parabolic shape in the vicinity of the front end face 26a as viewed from above. This reflecting surface has the function of collecting the light propagating through the waveguide 26 to the vicinity of the front end face 26a.

With reference to FIG. 4, a description will be given of the direction of polarization of the laser light of the present embodiment. In the present embodiment, the laser diode 202 emits linearly polarized light whose electric field oscillates in a direction perpendicular to the plane of the active layer 222, i.e., laser light of TM mode, from the emission part 222a. The direction of oscillation of the electric field of the laser light emitted from the emission part 222a is parallel to the YZ plane. The laser light emitted from the emission part 222a is reflected by the reflecting surface 203R of the external mirror 203 and enters the waveguide 26 from the incident end face 26b. Here, the direction of oscillation of the electric field of the laser light is parallel to the YZ plane. This laser light propagates through the waveguide 26 to reach the opposed portion 26g, which is a part of the top surface 26c. The direction of oscillation of the electric field of this laser light is perpendicular to the top surface 26c (the opposed portion 26g). This makes it possible to produce surface plasmons of high intensity on the near-field light generating element 23.

As has been described, the heat-assisted magnetic recording head 200 according to the present embodiment includes the slider 201, the edge-emitting laser diode 202 fixed to the slider 201, and the external mirror 203 provided outside the slider 201 and fixed to the laser diode 202. The slider 201 includes: the medium facing surface 201a that faces the recording medium; the reproducing head; and a portion of the recording head other than the laser diode 202 and the external mirror 203 (hereinafter, referred to as an in-slider portion of the recording head). The reproducing head and the in-slider portion of the recording head are stacked on the substrate 1. The in-slider portion of the recording head is located on the front side (trailing side) relative to the reproducing head in the direction of travel of the recording medium (the Z direction).

The reproducing head includes: the MR element 5 as the read element; the bottom shield layer 3 and the top shield layer 7 for shielding the MR element 5, the respective portions of the bottom shield layer 3 and the top shield layer 7 located near the medium facing surface 201a being opposed to each other with the MR element 5 therebetween; the bottom shield gap film 4 disposed between the MR element 5 and the bottom shield layer 3; and the top shield gap film 6 disposed between the MR element 5 and the top shield layer 7.

The in-slider portion of the recording head includes the return magnetic pole layer 10, the coil 12, the coupling layer 13, the bottom yoke layer 17, and the magnetic pole 20. The coil 12 produces a magnetic field corresponding to data to be recorded on the recording medium. The return magnetic pole layer 10, the coupling layer 13, the bottom yoke layer 17 and the magnetic pole 20 form a magnetic path for passing a magnetic flux corresponding to the magnetic field produced by the coil 12. The magnetic pole 20 includes the first layer 20A and the second layer 20B. The magnetic pole 20 allows the magnetic flux corresponding to the magnetic field produced by the coil 12 to pass, and produces a recording magnetic field for recording data on the recording medium by means of the perpendicular magnetic recording system. The position of the end of a bit pattern to be recorded on the recording medium depends on the position of the top edge, i.e., the edge farther from the top surface 1a of the substrate 1, of the front end face of the second layer 20B located in the medium facing surface 201a. The width of the front end face of the second layer 20B located in the medium facing surface 201a taken at the top edge defines the track width. The return magnetic pole layer 10, the coupling layer 13 and the bottom yoke layer 17 have the function of returning a magnetic flux to the magnetic pole 20, the magnetic flux having been generated from the magnetic pole 20 and having magnetized the recording medium.

The in-slider portion of the recording head further includes the near-field light generating element 23, the interposition layer 25, the waveguide 26, and the clad layers 22 and 28. The substrate 1 has the top surface 1a facing toward the magnetic pole 20, the near-field light generating element 23 and the waveguide 26. The waveguide 26 is located farther from the top surface 1a of the substrate 1 than is the first layer 20A. The front end face 26a of the waveguide 26 is opposed to the rear end face of the second layer 20B. The near-field light generating element 23 is located farther from the top surface 1a of the substrate 1 than is the second layer 20B.

The outer surface of the near-field light generating element 23 includes: the first end face 23a that is located in the medium facing surface 201a; the second end face 23b that is farther from the medium facing surface 201a; and the coupling portion that couples the first end face 23a and the second end face 23b to each other. The coupling portion includes: the top surface 23c that is farther from the top surface 1a of the substrate 1; the two side surfaces 23d and 23e that decrease in distance from each other with decreasing distance to the top surface 1a of the substrate 1; and the edge part 23f that connects the two side surfaces 23d and 23e to each other. The first end face 23a includes the near-field light generating part 23g. The length $H_{P4}$ of the near-field light generating element 23 in the direction perpendicular to the medium facing surface 201a (the Y direction) is greater than the length $T_{P4}$ of the first end face 23a in the direction perpendicular to the top surface 1a of the substrate 1. As will be detailed later, surface plasmons are excited on the near-field light generating element 23 based on the light propagating through the waveguide 26. The surface plasmons propagate to the near-field light generating part 23g, and the near-field light generating part 23g generates near-field light based on the surface plasmons.

The waveguide 26 is located closer to the top surface 1a of the substrate 1 than is the near-field light generating element 23. The outer surface of the waveguide 26 includes the opposed portion 26g that is opposed to a part of the edge part 23f of the near-field light generating element 23 with the interposition layer 25 interposed therebetween.

The interposition layer 25 and the clad layers 22 and 28 are each made of a dielectric material that has a refractive index lower than that of the waveguide 26. Consequently, the outer surface of the waveguide 26 excluding the incident end face 26b is covered with the dielectric material that is lower in refractive index than the waveguide 26.

The recording head further includes the edge-emitting laser diode 202 fixed to the slider 201, and the external mirror 203 provided outside the slider 201 and fixed to the laser diode 202. The slider 201 has the medium facing surface 201a that faces the recording medium, and the rear surface 201b opposite thereto. The laser diode 202 has: the active layer 222; the emitting end face 202c that lies at an end in the direction parallel to the plane of the active layer 222 and includes the emission part 222a for emitting laser light; the mounting surface 202a that lies at an end in the direction perpendicular to the plane of the active layer 222; and the rear surface 202b that is opposite to the mounting surface 202a. The laser diode 202 is fixed to the slider 201 such that the mounting surface 202a faces the rear surface 201b of the slider 201 and the emitting end face 202c faces toward the Z direction. The reflecting surface 203R of the external mirror 203 reflects the laser light emitted from the emission part 222a toward the waveguide 26 in the slider 201. The laser light reflected by the external mirror 203 enters the waveguide 26 from the incident end face 26b, and travels through the waveguide 26 toward the medium facing surface 201a (the front end face 26a).

Now, the principle of generation of near-field light in the present embodiment and the principle of heat-assisted magnetic recording using the near-field light will be described in detail. As described above, the laser light emitted from the emission part 222a of the laser diode 202 is reflected by the external mirror 203, enters the waveguide 26 from the incident end face 26b, and travels through the waveguide 26 toward the medium facing surface 201a (the front end face 26a). The laser light propagates through the waveguide 26 to reach the vicinity of the opposed portion 26g. The laser light is then totally reflected at the interface between the opposed portion 26g and the interposition layer 25, and this generates evanescent light permeating into the interposition layer 25. As a result, the evanescent light and the collective oscillations of charges on a part of the coupling portion (a part of the edge part 23f and its vicinity) of the outer surface of the near-field light generating element 23, i.e., surface plasmons, are coupled with each other to excite a system of surface plasmon polaritons. In this way, surface plasmons are excited on the near-field light generating element 23.

The surface plasmons excited on the near-field light generating element 23 propagate along the edge part 23f of the near-field light generating element 23 toward the near-field light generating part 23g. Consequently, the surface plasmons concentrate at the near-field light generating part 23g, and the near-field light generating part 23g generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In heat-assisted magnetic recording, the part of the magnetic recording layer with the lowered coercivity is subjected to a recording magnetic field produced by the magnetic pole 20 for data recording.

Reference is now made to FIG. 8A to FIG. 16A and FIG. 8B to FIG. 16B to describe a manufacturing method for the heat-assisted magnetic recording head 200 according to the present embodiment. FIG. 8A to FIG. 16A each show a cross section of a stack of layers formed in the process of manufacturing the heat-assisted magnetic recording head 200, the cross section being perpendicular to the medium facing surface and the substrate. In FIG. 8A to FIG. 16A, the symbol "ABS" indicates the position where the medium facing surface 201a is to be formed. FIG. 8B to FIG. 16B show cross sections at the position ABS of FIG. 8A to FIG. 16A, respectively.

Figure 8A:
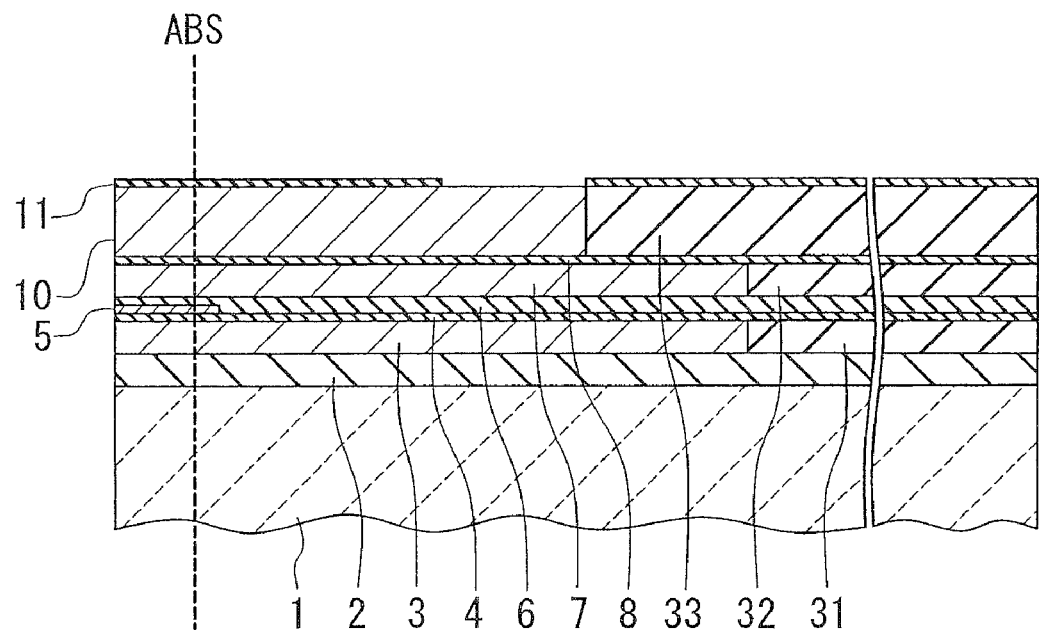
FIG. 8A and FIG. 8B are explanatory diagrams showing a step of a manufacturing method for the heat-assisted magnetic recording head according to the first embodiment of the invention.
Figure 8B:
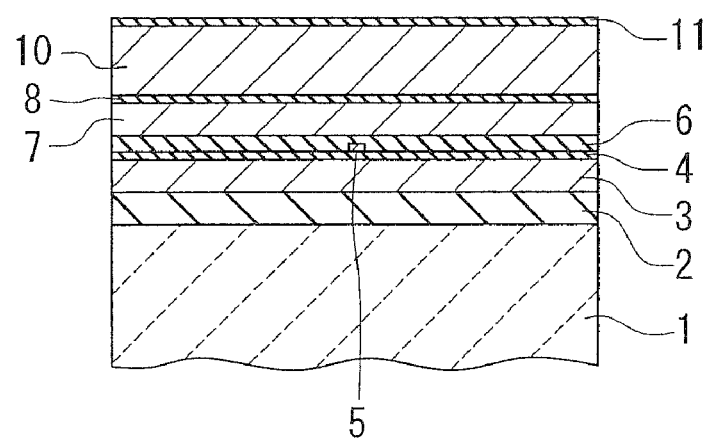

In the manufacturing method for the heat-assisted magnetic recording head 200 according to the present embodiment, first, the insulating layer 2 is formed on the substrate 1 as shown in FIG. 8A and FIG. 8B. Next, the bottom shield layer 3 is formed on the insulating layer 2. Next, the insulating layer 31 is formed to cover the bottom shield layer 3. The insulating layer 31 is then polished by, for example, chemical mechanical polishing (hereinafter referred to as CMP), until the bottom shield layer 3 is exposed. The bottom shield layer 3 and the insulating layer 31 are thereby flattened at the top. Next, the bottom shield gap film 4 is formed over the bottom shield layer 3 and the insulating layer 31. Next, the MR element 5 and not-shown leads connected to the MR element 5 are formed on the bottom shield gap film 4. Next, the top shield gap film 6 is formed to cover the MR element 5 and the leads. Next, the top shield layer 7 is formed on the top shield gap film 6. Next, the insulating layer 32 is formed to cover the top shield layer 7. The insulating layer 32 is then polished by, for example, CMP, until the top shield layer 7 is exposed. The top shield layer 7 and the insulating layer 32 are thereby flattened at the top. Next, the nonmagnetic layer 8 is formed over the top shield layer 7 and the insulating layer 32. Next, the return magnetic pole layer 10 is formed on the nonmagnetic layer 8. Next, the insulating layer 33 is formed to cover the return magnetic pole layer 10. The insulating layer 33 is then polished by, for example, CMP, until the return magnetic pole layer 10 is exposed. The return magnetic pole layer 10 and the insulating layer 33 are thereby flattened at the top. Next, the insulating layer 11 is formed on part of the top surfaces of the return magnetic pole layer 10 and the insulating layer 33.

Figure 9A:
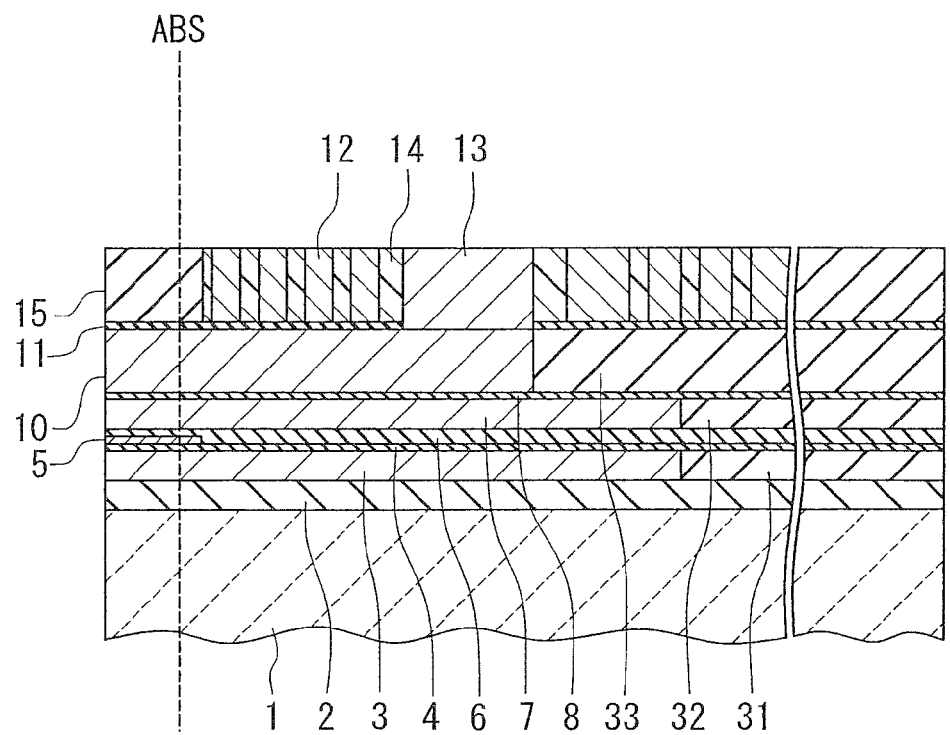
FIG. 9A and FIG. 9B are explanatory diagrams showing a step that follows the step of FIG. 8A and FIG. 8B.
Figure 9B:
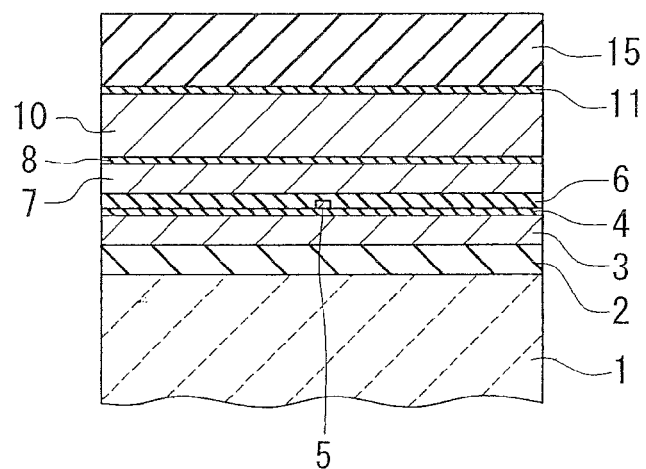

FIG. 9A and FIG. 9B show the next step. In this step, first, the coil 12 is formed on the insulating layer 11 by frame plating, for example. Next, the coupling layer 13 is formed on the return magnetic pole layer 10 by frame plating, for example. Alternatively, the coil 12 may be formed after forming the coupling layer 13. Next, the insulating layer 14 made of photoresist, for example, is selectively formed around the coil 12 and in the space between every adjacent turns of the coil 12. Next, the insulating layer 15 is formed over the entire top surface of the stack by sputtering, for example. The insulating layer 15 is then polished by, for example, CMP, until the coil 12 and the coupling layer 13 are exposed. The coil 12, the coupling layer 13 and the insulating layers 14 and 15 are thereby flattened at the top.

Figure 10A:
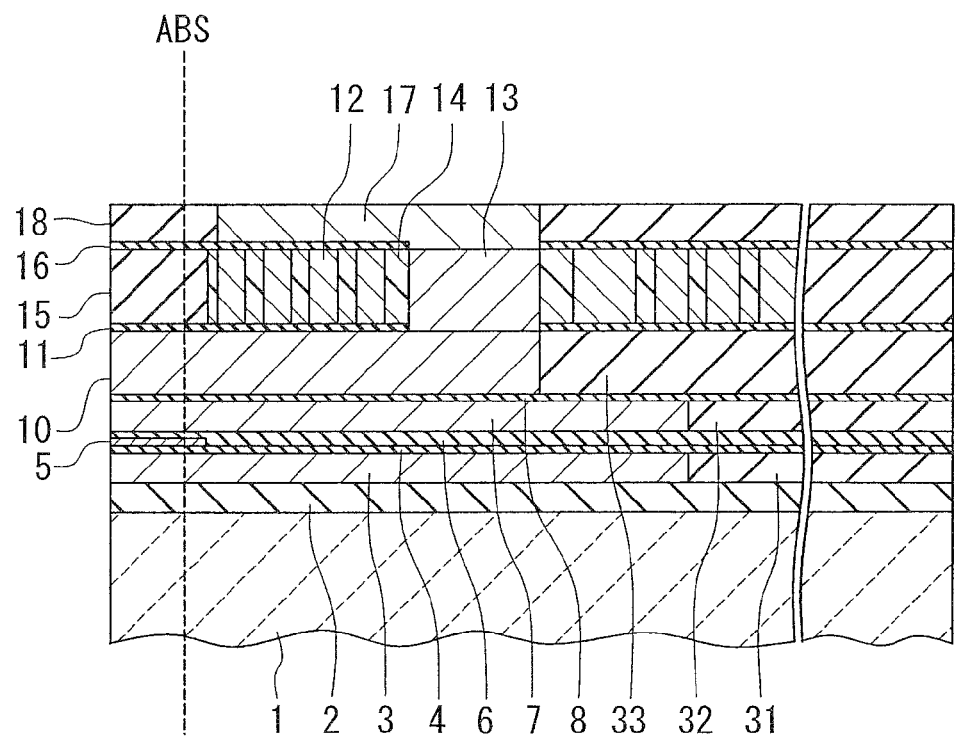
FIG. 10A and FIG. 10B are explanatory diagrams showing a step that follows the step of FIG. 9A and FIG. 9B.
Figure 10B:
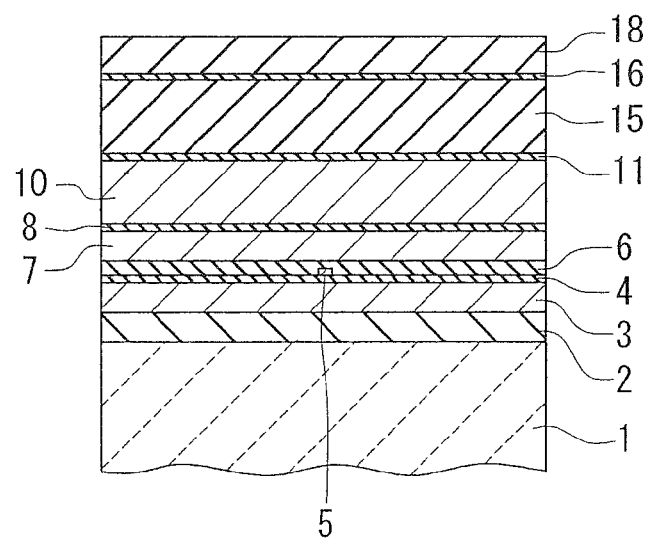

FIG. 10A and FIG. 10B show the next step. In this step, first, the bottom yoke layer 17 is formed over the coupling layer 13 and the insulating layer 16 by frame plating, for example. Next, the nonmagnetic layer 18 is formed over the entire top surface of the stack. The nonmagnetic layer 18 is then polished by, for example, CMP, until the bottom yoke layer 17 is exposed. The bottom yoke layer 17 and the nonmagnetic layer 18 are thereby flattened at the top.

Figure 11A:
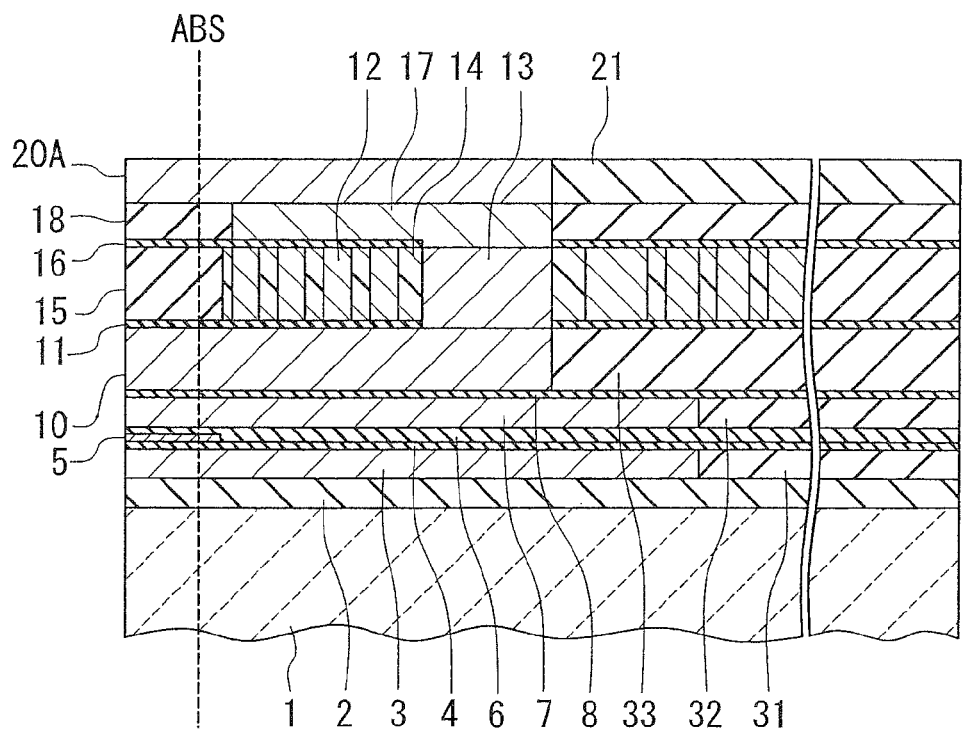
FIG. 11A and FIG. 11B are explanatory diagrams showing a step that follows the step of FIG. 10A and FIG. 10B.
Figure 11B:
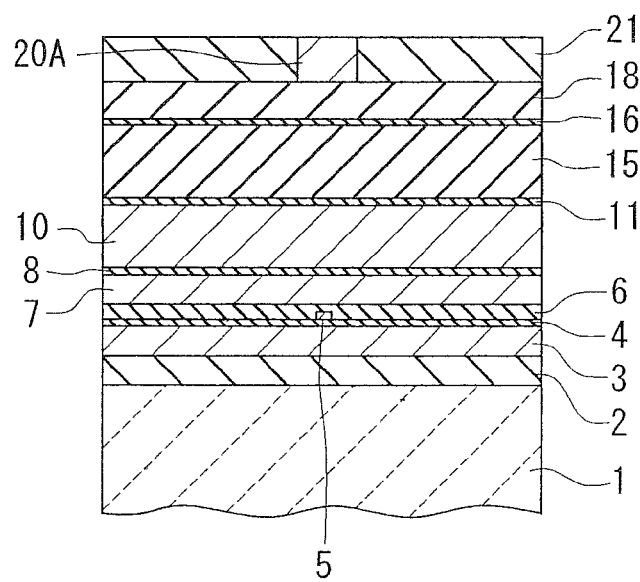

FIG. 11A and FIG. 11B show the next step. In this step, first, the first layer 20A is formed over the bottom yoke layer 17 and the nonmagnetic layer 18 by frame plating, for example. Next, the nonmagnetic layer 21 is formed over the entire top surface of the stack. The nonmagnetic layer 21 is then polished by, for example, CMP, until the first layer 20A is exposed. The first layer 20A and the nonmagnetic layer 21 are thereby flattened at the top.

Figure 12A:
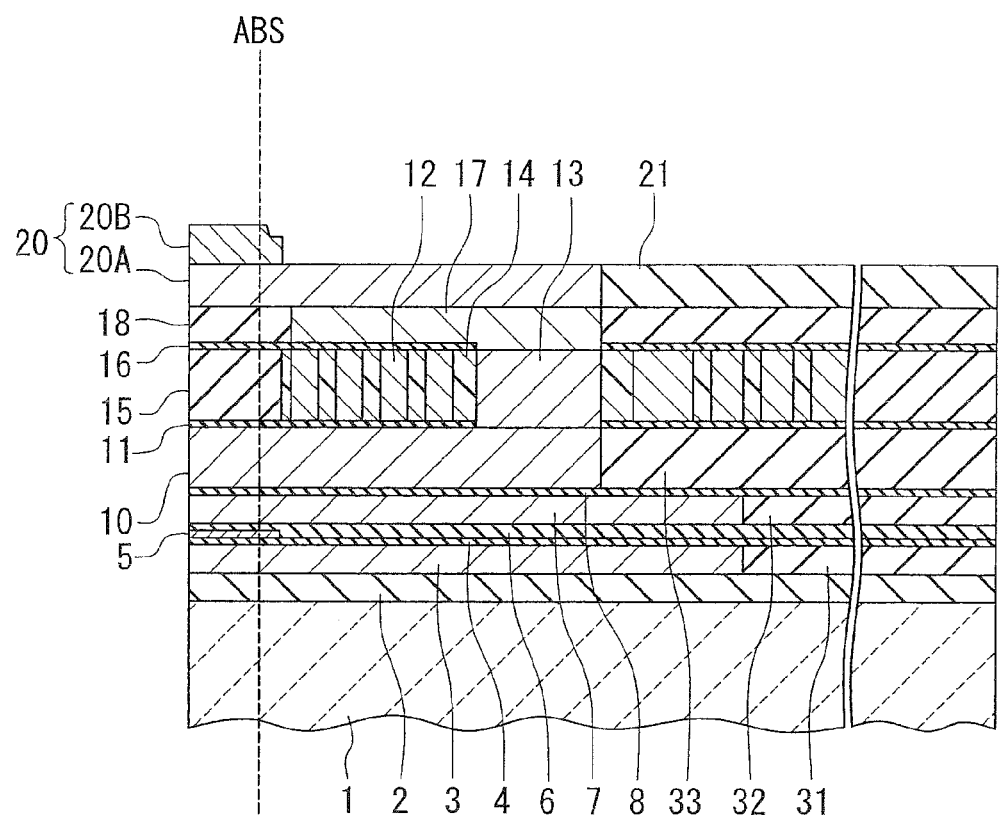
FIG. 12A and FIG. 12B are explanatory diagrams showing a step that follows the step of FIG. 11A and FIG. 11B.
Figure 12B:
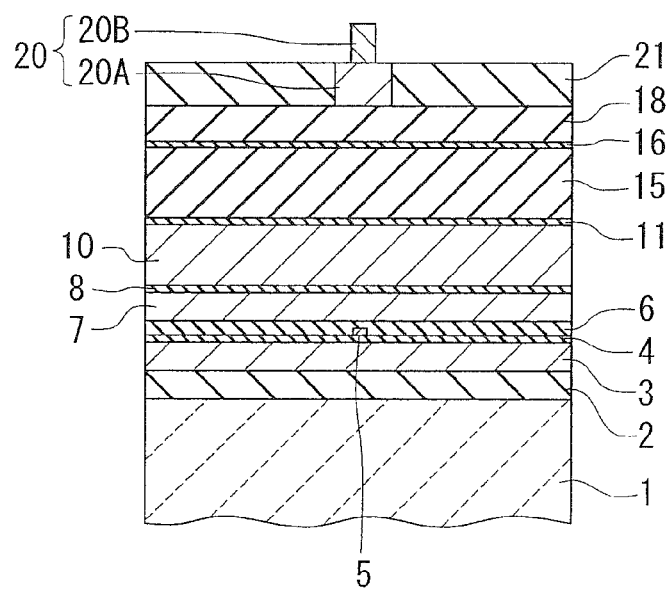

FIG. 12A and FIG. 12B show the next step. In this step, first, a magnetic layer is formed on the first layer 20A by frame plating, for example. The magnetic layer is to be made into the second layer 20B later. Next, a part of the magnetic layer is etched by, for example, ion beam etching, so that the first portion and the second portion are formed in the magnetic layer and the magnetic layer is thereby made into the second layer 20B.

Figure 13A:
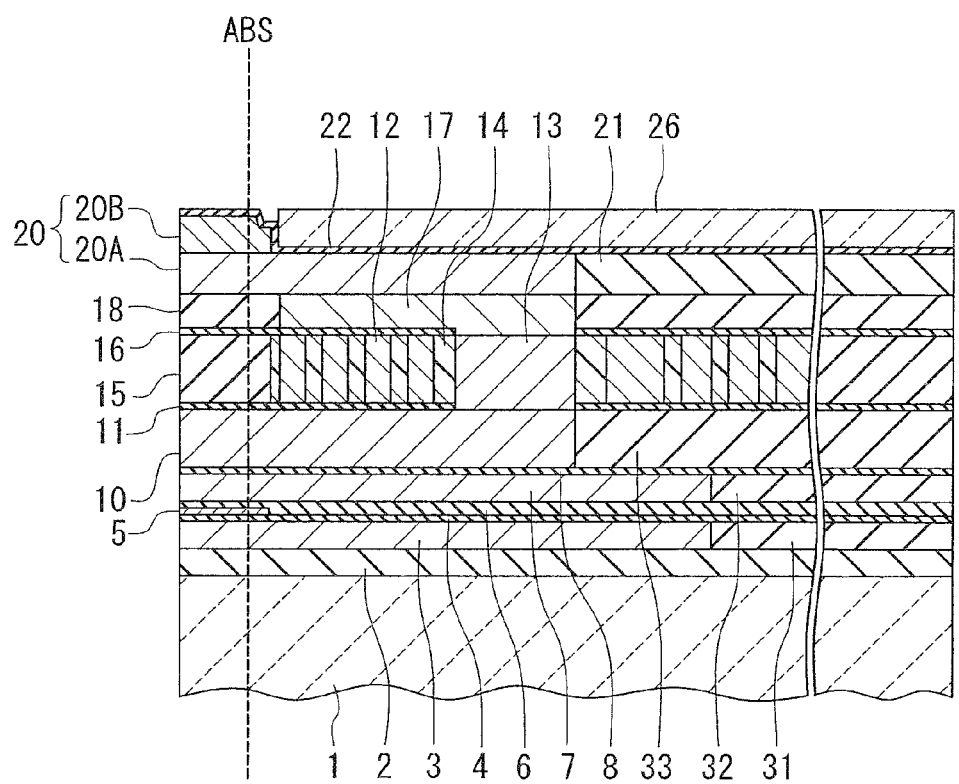
FIG. 13A and FIG. 13B are explanatory diagrams showing a step that follows the step of FIG. 12A and FIG. 12B.
Figure 13B:
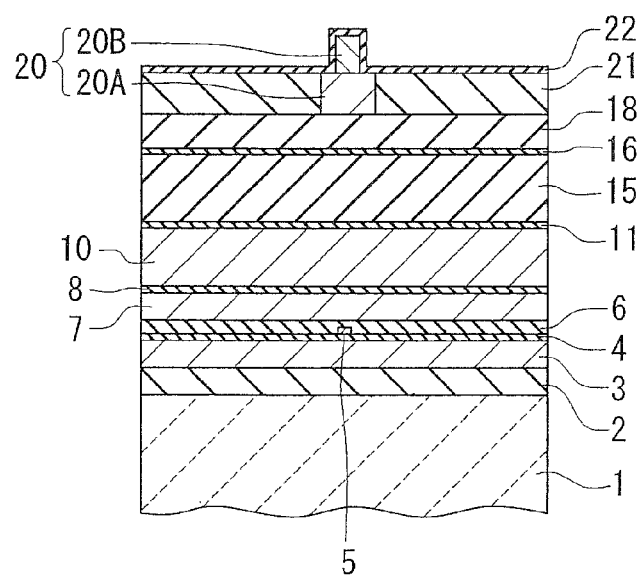

FIG. 13A and FIG. 13B show the next step. In this step, first, the clad layer 22 is formed over the entire top surface of the stack. Next, the waveguide 26 patterned is formed on the clad layer 22.

Figure 14A:
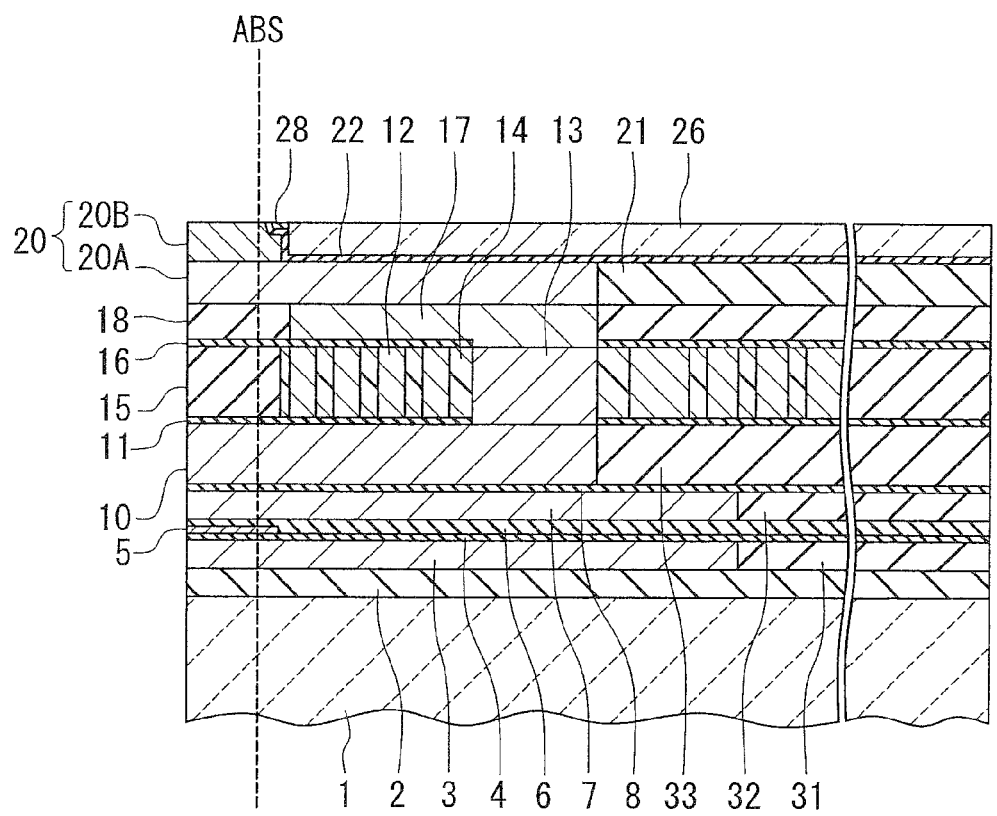
FIG. 14A and FIG. 14B are explanatory diagrams showing a step that follows the step of FIG. 13A and FIG. 13B.
Figure 14B:
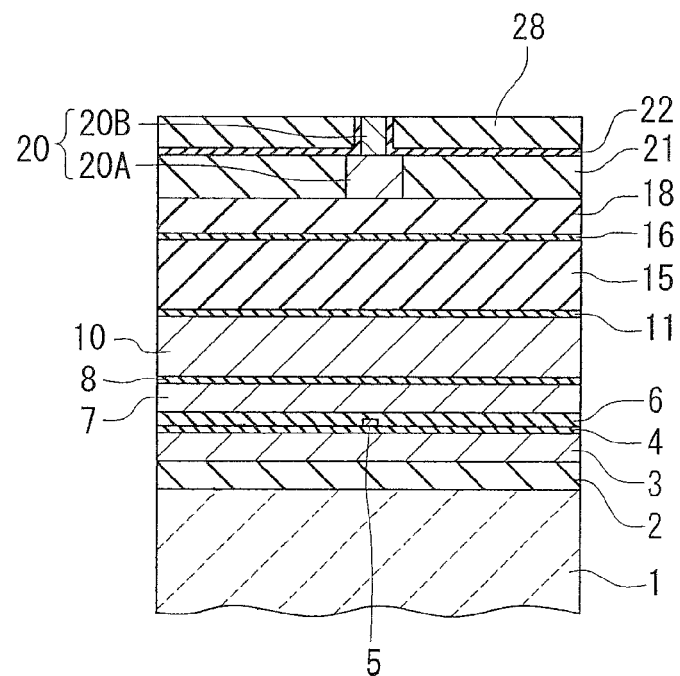

FIG. 14A and FIG. 14B show the next step. In this step, first, the clad layer 28 is formed over the entire top surface of the stack. Next, the waveguide 26 and the clad layers 22 and 28 are polished until the first portion of the second layer 20B is exposed. The first portion of the second layer 20B, the waveguide 26 and the clad layers 22 and 28 are thereby flattened at the top.

Figure 15A:
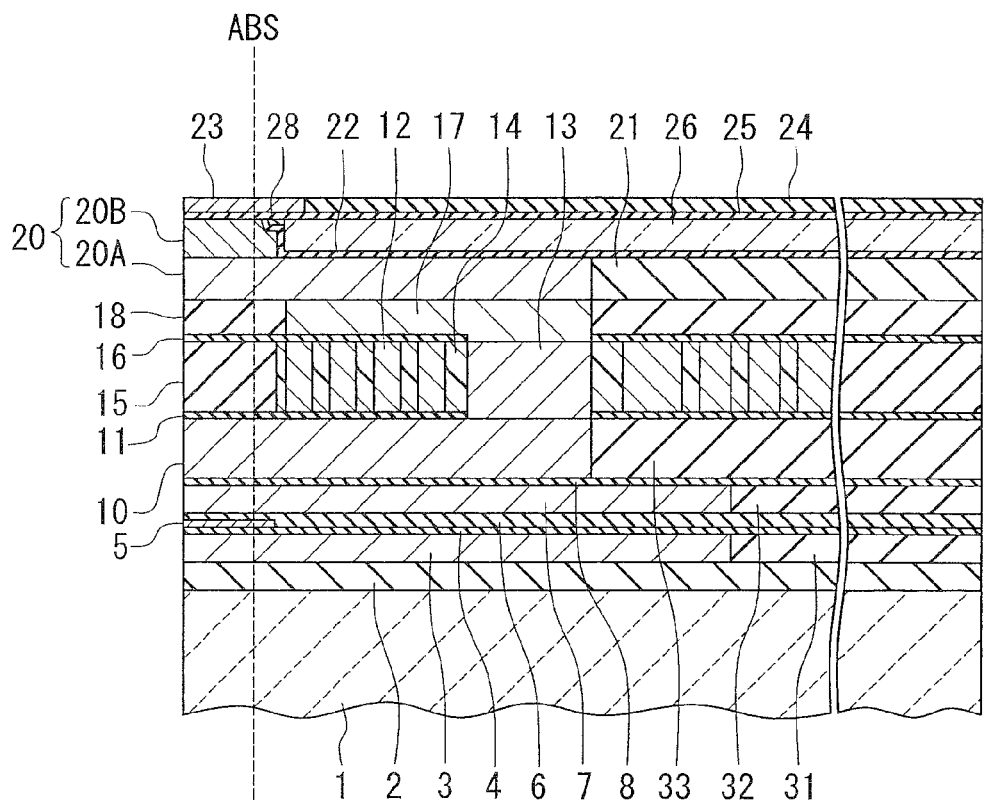
FIG. 15A and FIG. 15B are explanatory diagrams showing a step that follows the step of FIG. 14A and FIG. 14B.
Figure 15B:
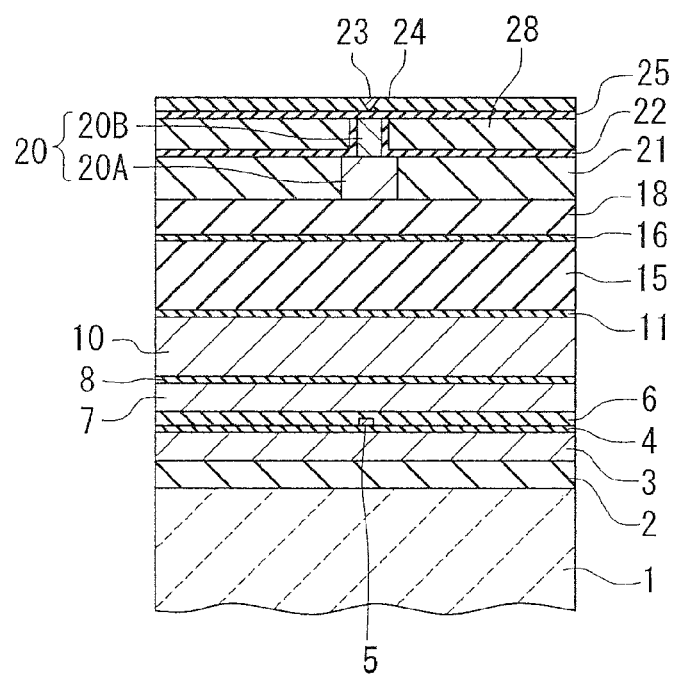

FIG. 15A and FIG. 15B show the next step. In this step, first, the interposition layer 25 is formed over the first portion of the second layer 20B, the waveguide 26 and the clad layers 22 and 28. Next, the insulating layer 24 is formed on the interposition layer 25. The insulating layer 24 is then selectively etched to form therein a groove for accommodating the near-field light generating element 23. The near-field light generating element 23 is then formed to be accommodated in the groove of the insulating layer 24.

Figure 16A:
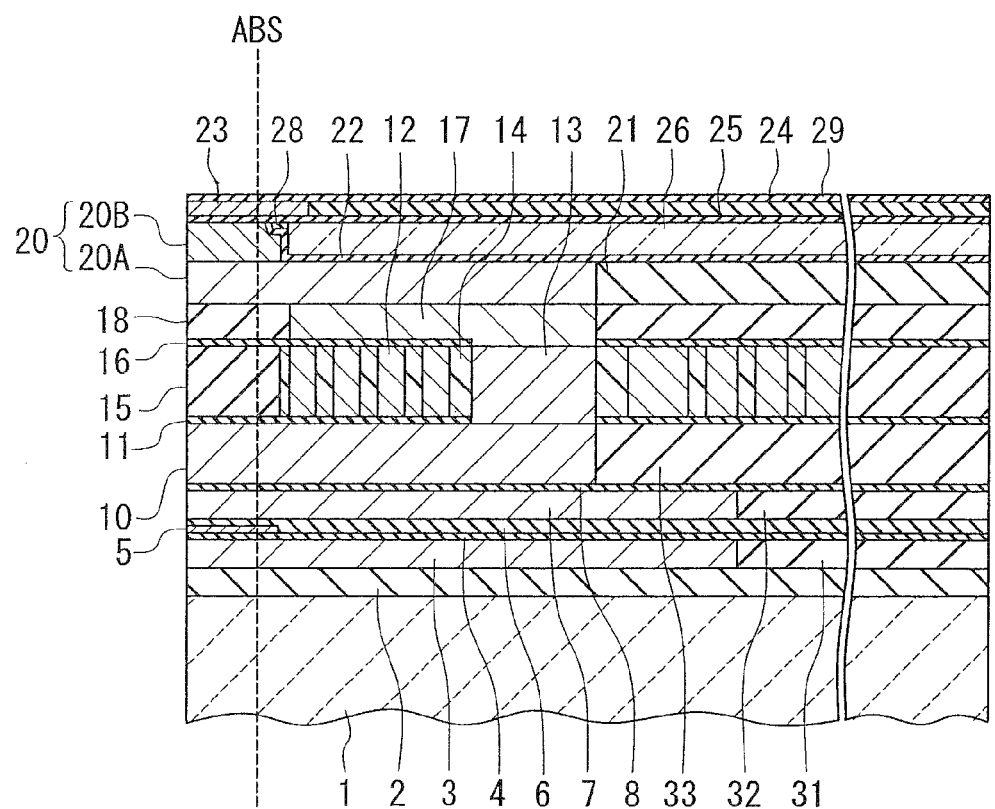
FIG. 16A and FIG. 16B are explanatory diagrams showing a step that follows the step of FIG. 15A and FIG. 15B.
Figure 16B:
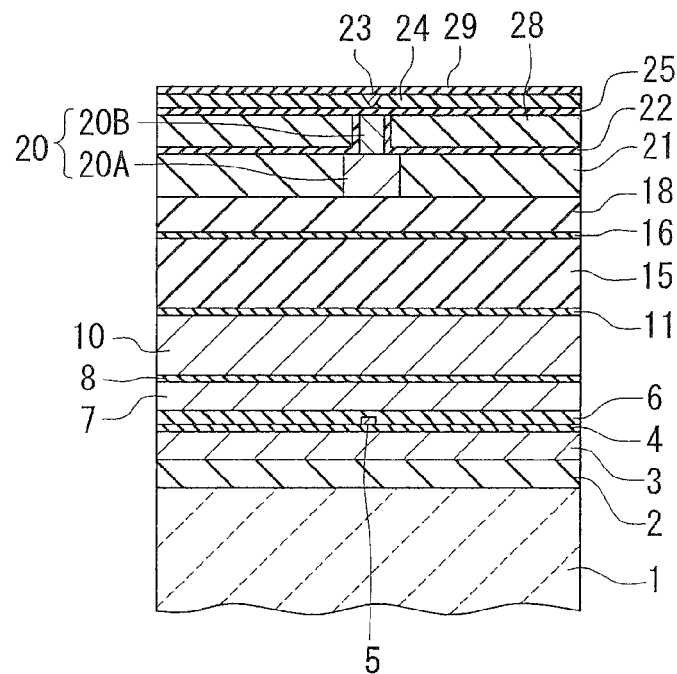

Next, as shown in FIG. 16A and FIG. 16B, the insulating layer 29 is formed over the entire top surface of the stack. Wiring, the terminals 210 and so on are then formed on the top surface of the insulating layer 29.

Next, the substrate is cut into sliders, and working including polishing of the medium facing surface 201a and the rear surface 201b, formation of flying rails in the medium facing surface 201a, etc. is performed. Next, as shown in FIG. 5, the insulating layer 205 and the conductor layer 206 are formed in this order on the rear surface 201b.

Next, the laser assembly 204 is fixed to the slider 201 by bonding the p-electrode 214 of the laser diode 202 to the conductor layer 206 such that the mounting surface 202a of the laser diode 202 faces the rear surface 201b of the slider 201 and the emitting end face 202c faces toward the Z direction. Alignment of the laser assembly 204 with respect to the slider 201 may be performed using a flip chip bonder, for example. Bonding of the p-electrode 214 of the laser diode 202 to the conductor layer 206 may be performed using a conductive bonding material such as solder or a conductive adhesive, or by ultrasonic bonding.

Next, as shown in FIG. 1, the conductor layer 206 is electrically connected to one of the terminals 210 with the bonding wire 207, and the n-electrode 213 of the laser diode 202 is electrically connected to another one of the terminals 210 with the bonding wire 208. The heat-assisted magnetic recording head 200 is completed through the foregoing series of steps.

A manufacturing method for the laser assembly 204 according to the present embodiment will now be described. The manufacturing method for the laser assembly 204 according to the present embodiment includes the step of fabricating the external mirror 203 and the step of fixing the external mirror 203 to the laser diode 202.

The step of fabricating the external mirror 203, i.e., the manufacturing method for the external mirror 203 according to the present embodiment, will now be described. The manufacturing method for the external mirror 203 includes the steps of: forming the main body 231 to have a polished surface to underlie the metal film 232, by polishing an end portion of a main body material shaped like a bent plate to form the polished surface; and depositing the metal film 232 onto the polished surface of the main body 231.

Figure 17:
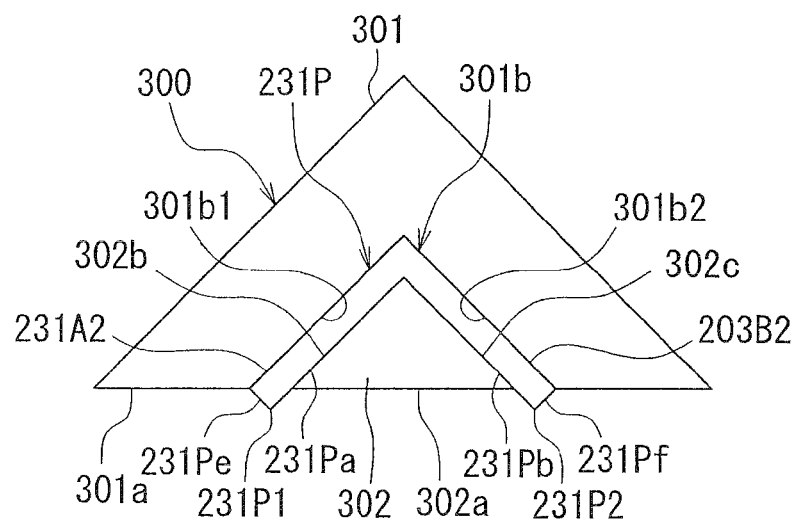
FIG. 17 is an explanatory diagram showing a step of a manufacturing method for the external mirror according to the first embodiment of the invention.
Figure 18:
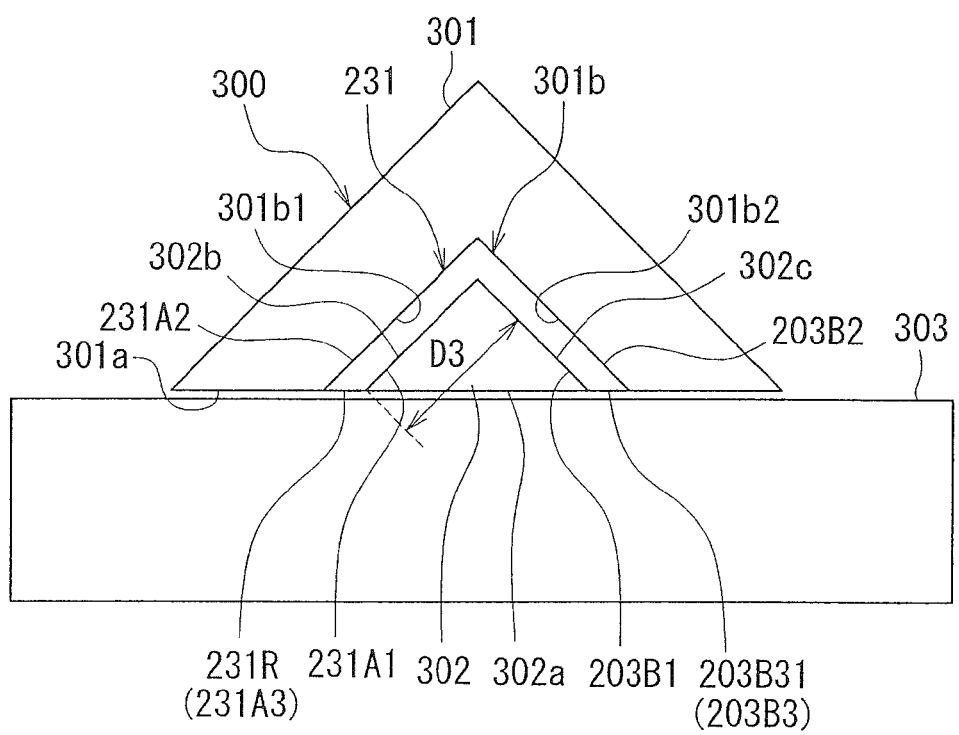
FIG. 18 is an explanatory diagram showing a step that follows the step of FIG. 17.

Here, a detailed description will be given of the step of forming the main body 231 with reference to FIG. 17 and FIG. 18. FIG. 17 is an explanatory diagram showing a step of the manufacturing method for the external mirror 203. FIG. 18 is an explanatory diagram showing a step that follows the step of FIG. 17. In the step of forming the main body 231, first formed is the main body material 231P that is shaped like a bent plate, as shown in FIG. 17. The main body material 231P is the same as the main body 231 except that the material 231P has surfaces 231Pa and 231Pb instead of the surfaces 231A1 and 203B1 of the main body 231, and has end faces 231Pe and 231Pf instead of the end faces 231A3 and 231B3 of the main body 231. The end face 231Pe is orthogonal to each of the surfaces 231Pa and 231A2, and connects the surfaces 231Pa and 231A2 to each other. The end face 231Pf is orthogonal to each of the surface 231Pb and the second surface 203B2, and connects the surface 231Pb and the second surface 203B2 to each other. A corner 231P1 is formed between the end face 231Pe and the surface 231Pa. A corner 231P2 is formed between the end face 231Pf and the surface 231Pb. The main body material 231P is formed by, for example, molding a material to be used for the main body 231.

Next, the main body material 231P is fixed to a jig 300 shown in FIG. 17. The jig 300 includes a first portion 301 and a second portion 302 that are separated from each other. The first portion 301 and the second portion 302 are each made of a material harder than the main body material 231P. The first portion 301 has a bottom surface 301a and a groove 301b. The groove 301b opens in the bottom surface 301a and is intended to accommodate the main body material 231P and the second portion 302. The groove 301b has a first groove sidewall 301b1 and a second groove sidewall 301b2 that decrease in distance from each other with increasing distance from the bottom surface 301a. The first groove sidewall 301b1 and the second groove sidewall 301b2 are orthogonal to each other. Each of the first groove sidewall 301b1 and the second groove sidewall 301b2 forms an angle of 45° with respect to the bottom surface 301a.

The second portion 302 is shaped like a triangular prism and has a bottom surface 302a, and first and second side surfaces 302b and 302c connected to the bottom surface 302a. The first side surface 302b and the second side surface 302c are orthogonal to each other. Each of the first side surface 302b and the second side surface 302c forms an angle of 45° with respect to the bottom surface 302a.

As shown in FIG. 17, the main body material 231P is sandwiched between the groove sidewalls 301b1, 302b2 of the first portion 301 and the side surfaces 302b, 302c of the second portion 302, and fixed to the jig 300. Here, the surface 231Pa comes in contact with the side surface 302b, the surface 231Pb comes in contact with the surface 302c, the surface 231A2 comes in contact with the groove sidewall 301b1, and the surface 203B2 comes in contact with the groove sidewall 301*b*2. The bottom surface 301*a* of the first portion 301 and the bottom surface 302*a* of the second portion 302 are in one imaginary plane. The end faces 231Pe and 231Pf protrude below the bottom surfaces 301*a* and 302*a*. The main body material 231P may be fixed to the first portion 301 and the second portion 302 with an adhesive, for example, so as not to be separated therefrom. The second portion 302 is not essential where the main body material 231P is fixed to the first portion 301. The end face 231Pf need not necessarily protrude below the bottom surfaces 301*a* and 302*a*.

Next, as shown in FIG. 18, the main body material 231P is polished at a portion thereof including the corner 231P1 and a portion thereof including the corner 231P2 with a polishing grindstone 303, for example. The polishing starts from the corners 231P1 and 231P2 to gradually polish the respective portions of the surfaces 231Pa and 231Pb, and the end faces 231P3 and 231Pf, thereby causing the main body material 231P to have two polished surfaces. The two polished surfaces make the oblique surfaces 231R and 203B31 (the end faces 231A3 and 203B3). The oblique surfaces 231R and 203B31 and the bottom surfaces 301*a* and 302*a* are in one imaginary plane. The surfaces 231Pa and 231Pb are polished at their respective portions and are thereby made into the surfaces 231A1 and 203B1. The main body 231 having the two polished surfaces, i.e., the oblique surfaces 231R and 203B31, is thus formed. The oblique surface 231R is to underlie the metal film 232 to be formed later. Note that the oblique surface 203B31 will not be formed if the end face 231Pf does not protrude below the bottom surfaces 301*a* and 302*a* in the step shown in FIG. 17.

The distance D3 from the corner between the oblique surface 231R and the surface 231A1 to the border between the surfaces 231A1 and 203B1 is slightly smaller than the distance D2 between the emission part 222*a* and the rear surface 202*b* of the laser diode 202 shown in FIG. 3.

Next, the main body 231 is separated from the jig 300, and the metal film 232 is deposited onto the surface 231A1 and the end face 231A3 (the oblique surface 231R) of the main body 231 by vapor deposition, sputtering, or the like. This completes the external mirror 203 shown in FIG. 3. Note that the metal film 232 need only be deposited onto at least the oblique surface 231R.

As has been described, in the heat-assisted magnetic recording head 200 according to the present embodiment, the edge-emitting laser diode 202 is fixed to the slider 201 such that the mounting surface 202*a* lying at an end in the direction perpendicular to the plane of the active layer 222 faces the slider 201. Specifically, the laser diode 202 is fixed to the slider 201 by bonding the p-electrode 214 to the conductor layer 206 such that the mounting surface 202*a* faces the rear surface 201*b* of the slider 201 and the emitting end face 202*c* faces toward the Z direction. The mounting surface 202*a* is parallel to the plane of the active layer 222, and has an area greater than that of the emitting end face 202*c*. In the present embodiment, it is therefore easy to align the laser diode 202 with respect to the slider 201 with high precision so that the optical axis of the laser light emitted from the emission part 222*a* is parallel to the rear surface 201*b* of the slider 201. The present embodiment thus makes it possible to align the laser diode 202 with respect to the slider 201 so that the optical axis of the laser light emitted from the emission part 222*a* will not tilt with respect to a desired direction.

In the present embodiment, the laser light emitted from the emission part 222*a* of the laser diode 202 is reflected by the external mirror 203 toward the waveguide 26 in the slider 201. The external mirror 203 includes the first to-be-fixed part 203A disposed along the emitting end face 202*c* of the laser diode 202, the second to-be-fixed part 203B disposed along the rear surface 202*b* of the laser diode 202, and the coupling part 203C that couples the first to-be-fixed part 203A and the second to-be-fixed part 203B to each other. The first to-be-fixed part 203A has the first surface 203A1 that faces the emitting end face 202*c*, the second surface 203A2 opposite to the first surface 203A1, and the end face 203A3 that lies at an end opposite to the coupling part 203C and connects the first surface 203A1 and the second surface 203A2 to each other. The end face 203A3 includes the reflecting surface 203R. The reflecting surface 203R is oblique with respect to the first surface 203A1 and continuous with the first surface 203A1. The external mirror 203 having such a configuration is alignable with respect to the laser diode 202 so that the optical axis of the laser light reflected by the reflecting surface 203R will not tilt with respect to a desired direction. Furthermore, the external mirror 203 of the present embodiment makes it possible to reduce both the distance from the emission part 222*a* to the reflecting surface 203R and the distance from the reflecting surface 203R to the slider 201 (the incident end face 26*b* of the waveguide 26).

In the present embodiment, the distance D1 between the emission part 222*a* and the mounting surface 202*a* of the laser diode 202 is smaller than the distance D2 between the emission part 222*a* and the rear surface 202*b* of the laser diode 202. Besides, D1 varies smaller than D2 does. According to the present embodiment, it is therefore possible to make the path of the laser light from the emission part 222*a* to the waveguide 26 shorter and to make variations in length of the path smaller, compared with the case where the laser diode 202 is arranged so that the n-electrode 213 of the laser diode 202 faces the rear surface 201*b* of the slider 201.

The manufacturing method for the external mirror 203 according to the present embodiment includes the steps of: forming the main body 231 to have a polished surface (oblique surface 231R) to underlie the metal film 232, by polishing an end portion of the main body material 231P shaped like a bent plate to form the polished surface; and depositing the metal film 232 onto the polished surface (oblique surface 231R) of the main body 231. Such a method makes it possible to prevent the oblique surface 231R of the main body 231 from being rounded at the portion thereof near the border with the surface 231A1. As a result, it is possible to prevent the reflecting surface 203R from being rounded at the portion thereof near the border with the first surface 203A1 of the first to-be-fixed part 203A. This provides the following effects. The laser light emitted from the emission part 222*a* increases in diameter with increasing distance from the emission part 222*a*. Thus, the longer the path of the laser light from the emission part 222*a* to the reflecting surface 203R, the larger the diameter of the laser light reflected by the reflecting surface. If the reflecting surface 203R is prevented from being rounded at the portion thereof near the border with the first surface 203A1 of the first to-be-fixed part 203A as described above, it is possible to make the laser light emitted from the emission part 222*a* to be reflected at a point in the reflecting surface 203R closer to the border with the first surface 203A1. This allows shortening of the path of the laser light from the emission part 222*a* to the reflecting surface, so that it is possible to prevent the laser light reflected by the reflecting surface from being too large in diameter.

In consequence, the present embodiment makes it possible that, while using the edge-emitting laser diode 202 of high optical output as the light source for emitting light to be used for generating near-field light, alignment of the laser light with the waveguide 26 is easy and the path of the laser light from the emission part 222a of the laser diode 202 to the waveguide 26 is shortened.

In the present embodiment, the laser diode 202 is fixed to the slider 201 such that the mounting surface 202a faces the rear surface 201b of the slider 201. The rear surface 201b of the slider 201 is the surface that has the largest area among the five surfaces of the slider 201 excluding the medium facing surface 201a. According to the present embodiment, it is therefore possible to use a laser diode 202 of large size and high optical output.

In the heat-assisted magnetic recording head 200 according to the present embodiment, the opposed portion 26g of the outer surface of the waveguide 26 is opposed to a part of the coupling portion of the outer surface of the near-field light generating element 23 with the interposition layer 25 interposed therebetween. In the present embodiment, evanescent light occurs from the interposition layer 25 based on the light propagating through the waveguide 26. Based on this evanescent light, surface plasmons are excited on the near-field light generating element 23. The surface plasmons then propagate to the near-field light generating part 23g, and the near-field light generating part 23g generates near-field light based on the surface plasmons. According to the present embodiment, it is possible to increase the efficiency of conversion of the light propagating through the waveguide 26 into near-field light, as compared with the case where a plasmon antenna is directly irradiated with laser light to produce near-field light.

According to the present embodiment, it is possible suppress a temperature rise of the near-field light generating element 23 because the near-field light generating element 23 is not directly irradiated with the laser light propagating through the waveguide 26. In the present embodiment, the length $H_{P4}$ of the near-field light generating element 23 in the direction perpendicular to the medium facing surface 201a is greater than the length $T_{P4}$ of the first end face 23a in the direction perpendicular to the top surface 1a of the substrate 1. Thus, the near-field light generating element 23 according to the present embodiment is greater in volume than a conventional plasmon antenna in which the length in the direction perpendicular to the medium facing surface 201a is smaller than the length in the direction perpendicular to the top surface 1a of the substrate 1. This also contributes to suppression of a temperature rise of the near-field light generating element 23. Consequently, according to the present embodiment, it is possible to prevent the near-field light generating element 23 from protruding from the medium facing surface 201a.

[Modification Examples]

Figure 19:
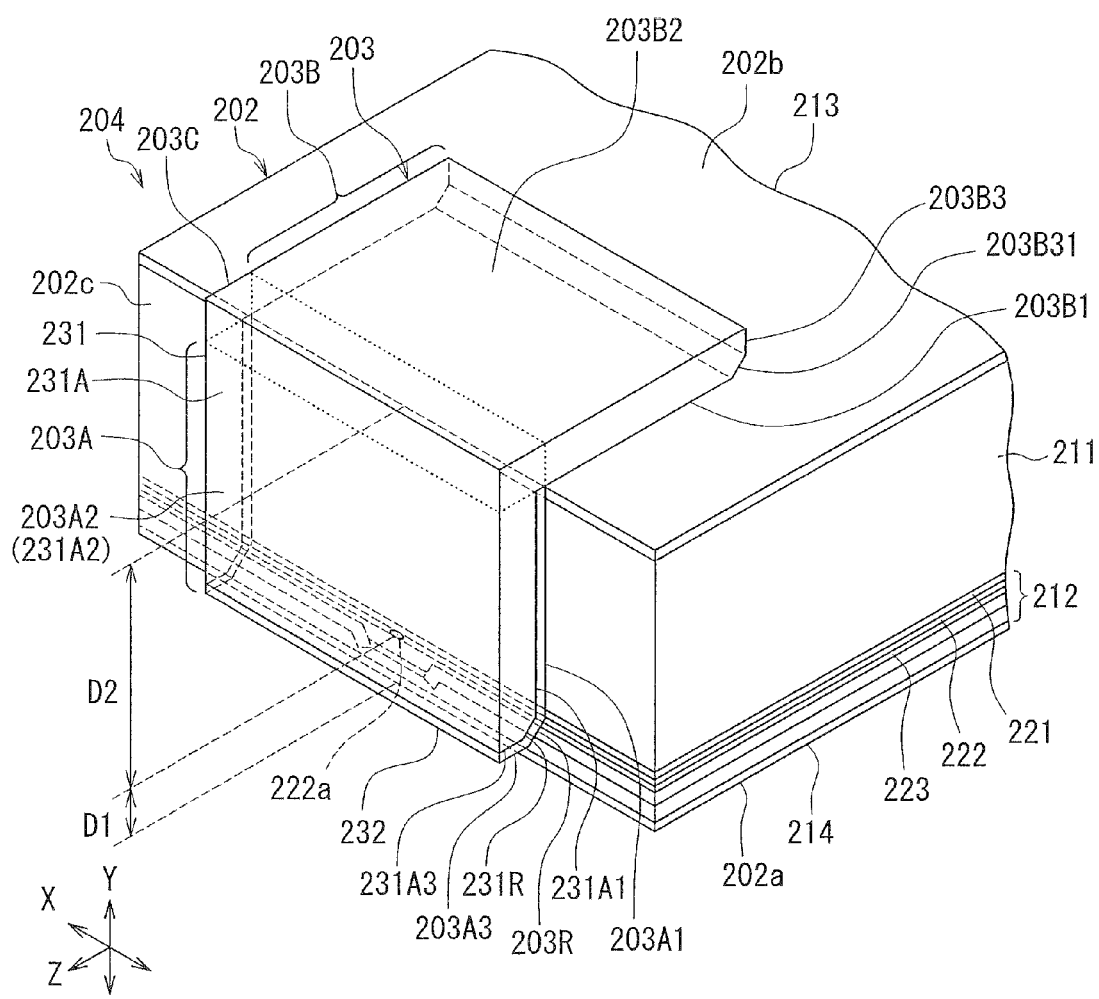
FIG. 19 is a perspective view showing a laser diode and an external mirror of a first modification example of the first embodiment of the invention.

A description will now be given of a first and a second modification example of the present embodiment. The first modification example will be described first. FIG. 19 is a perspective view showing the laser diode 202 and the external mirror 203 of the first modification example. In the external mirror 203 of the first modification example shown in FIG. 19, only a part of the end face 203A3 of the first to-be-fixed part 203A forms the reflecting surface 203R. The reflecting surface 203R is oblique with respect to the first surface 203A1 and continuous with the first surface 203A1. The reflecting surface 203R forms an angle of 45° with respect to the first surface 203A1. The end face 203A3 excluding the reflecting surface 203R is orthogonal to the second surface 203A2 and connects the reflecting surface 203R and the second surface 203A2 to each other. Furthermore, in the external mirror 203 of the first modification example, only a part of the end face 203B3 of the second to-be-fixed part 203B forms the oblique surface 203B31. The oblique surface 203B31 forms an angle of 45° with respect to the first surface 203B1, and is parallel to the reflecting surface 203R. The end face 203B3 excluding the oblique surface 203B31 is orthogonal to the second surface 203B2 and connects the oblique surface 203B31 and the second surface 203B2 to each other.

In the external mirror 203 of the first modification example, only a part of the end face 231A3 of the plate-like part 231A of the main body 231 forms the oblique surface 231R. The oblique surface 231R forms an angle of 45° with respect to the surface 231A1. The end face 231A3 excluding the oblique surface 231R is orthogonal to the surface 231A2 and connects the oblique surface 231R and the surface 231A2 to each other.

Figure 20:
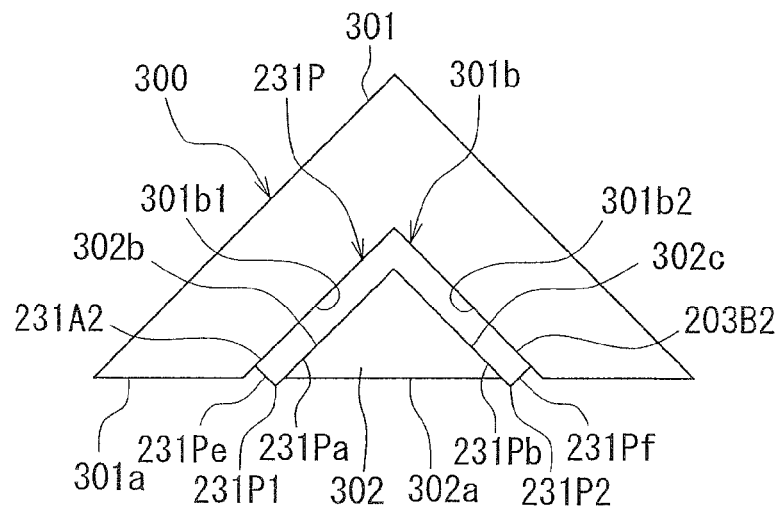
FIG. 20 is an explanatory diagram showing a step of a manufacturing method for the external mirror of the first modification example of the first embodiment of the invention.
Figure 21:
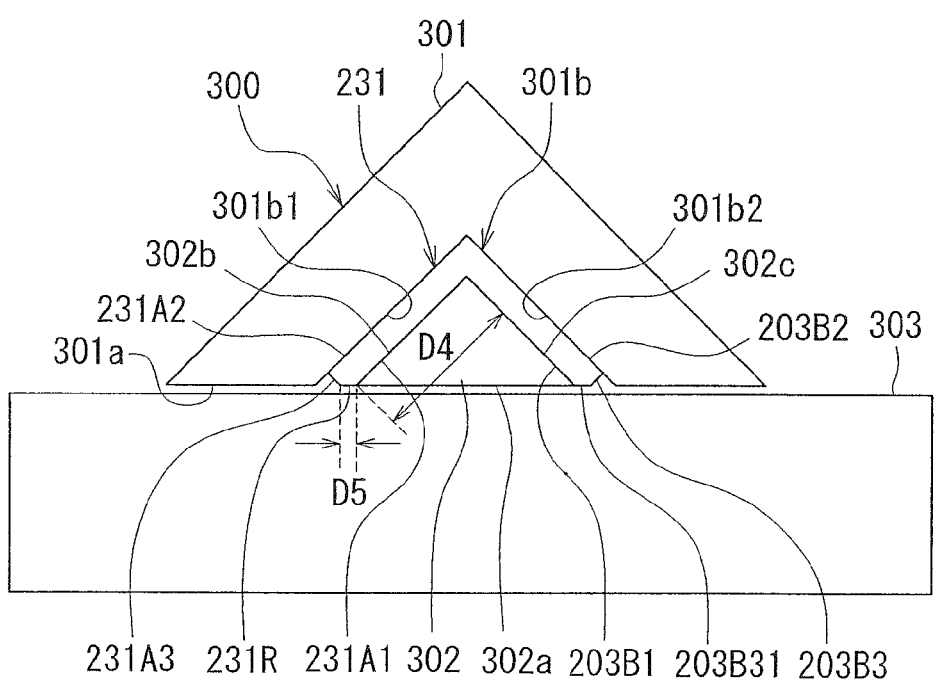
FIG. 21 is an explanatory diagram showing a step that follows the step of FIG. 20.

A manufacturing method for the external mirror 203 of the first modification example will now be described with reference to FIG. 20 and FIG. 21. FIG. 20 is an explanatory diagram showing a step of the manufacturing method for the external mirror 203 of the first modification example. FIG. 21 is an explanatory diagram showing a step that follows the step of FIG. 20. In the step shown in FIG. 20, the main body material 231P shaped like a plate is fixed to the jig 300 as in the step of FIG. 17. Here, however, only a part of each of the end faces 231Pe and 231Pf is made to protrude below the bottom surfaces 301a and 302a. Note that the end face 231Pf need not necessarily protrude below the bottom surfaces 301a and 302a. Subsequently, in the step shown in FIG. 21, the main body material 231P is polished at a portion thereof including the corner 231P1 and a portion thereof including the corner 231P2 with a polishing grindstone 303, for example, as in the step of FIG. 18. This causes the main body material 231P to have two polished surfaces. The two polished surfaces make the oblique surfaces 231R and 203B31, respectively. A part of the end face 231Pe is not polished and makes a part of the end face 231A3 other than the oblique surface 231R. Similarly, a part of the end face 231Pf is not polished and makes a part of the end face 203B3 other than the oblique surface 203B31. Note that the oblique surface 203B31 will not be formed if the end face 231Pf does not protrude below the bottom surfaces 301a and 302a in the step shown in FIG. 20.

The distance D4 from the corner between the oblique surface 231R and the surface 231A1 to the border between the surfaces 231A1 and 203B31 is slightly smaller than the distance D2 between the emission part 222a and the rear surface 202b of the laser diode 202 shown in FIG. 3. The distance D5 from the corner between the oblique surface 231R and the surface 231A1 to the corner between the oblique surface 231R and the part of the end face 231A3 other than the oblique surface 231R is 3 to 6 µm or so, for example.

Next, the main body 231 is separated from the jig 300, and the metal film 232 is deposited onto the surface 231A1 and the end face 231A3 of the main body 231 by vapor deposition, sputtering, or the like. This completes the external mirror 203 shown in FIG. 19. Note that the metal film 232 need only be deposited onto at least the oblique surface 231R.

Figure 22:
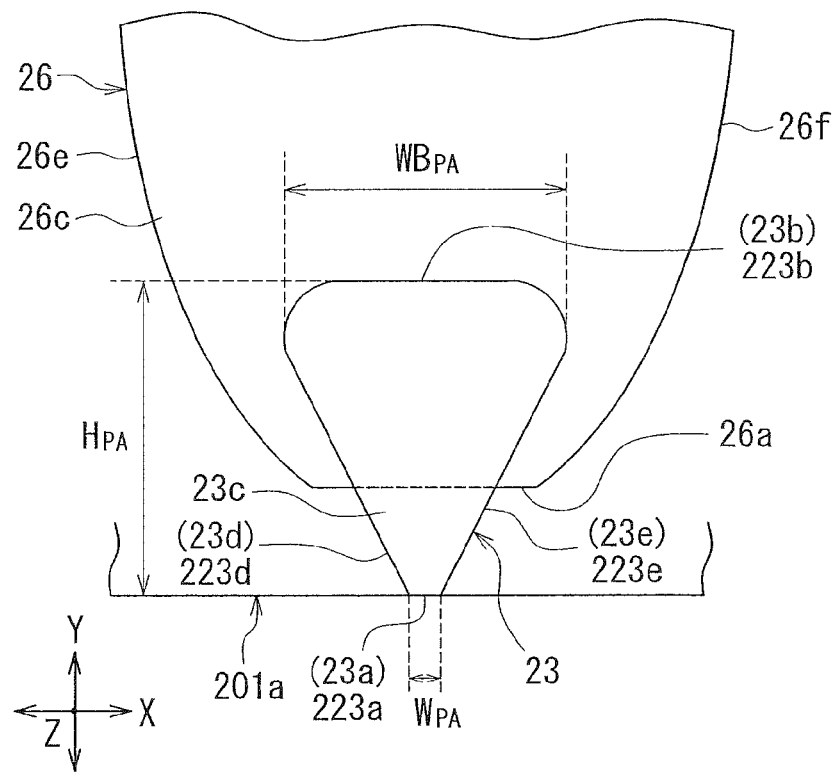
FIG. 22 is a plan view showing a part of a waveguide and a near-field light generating element of a second modification example of the first embodiment of the invention.
Figure 23:
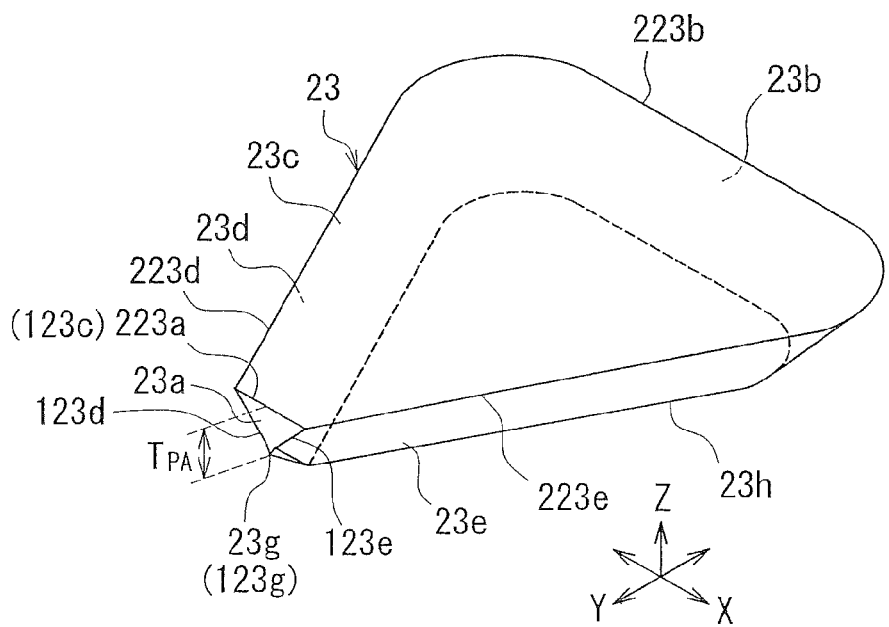
FIG. 23 is a perspective view of the near-field light generating element shown in FIG. 22.

A description will now be given of the second modification example of the present embodiment. FIG. 22 is a plan view showing a part of the waveguide 26 and the near-field light generating element 23 of the second modification example. FIG. 23 is a perspective view of the near-field light generating element 23 shown in FIG. 22. In the near-field light generating element 23 of the second modification example, the side surfaces 23d and 23e have their respective portions that decrease in distance from each other in the track width direction with decreasing distance to the medium facing surface 201a. The corner between the side surface 23d and the second end face 23b and the corner between the side surface 23e and the second end face 23b are both rounded. In the second modification example, in particular, the side surfaces 23d and 23e excluding the above-mentioned two corners decrease in distance from each other in the track width direction with decreasing distance to the medium facing surface 201a.

The top surface 23c has a first edge 223a that is located at the top end of the first end face 23a, a second edge 223b that is located at the top end of the second end face 23b, a third edge 223d that is located at the top end of the side surface 23d, and a fourth edge 223e that is located at the top end of the side surface 23e. The third edge 223d and the fourth edge 223e have their respective portions that decrease in distance from each other in a direction parallel to the first edge 223a with decreasing distance to the first edge 223a. The corner between the second edge 223b and the third edge 223d and the corner between the second edge 223b and the fourth edge 223e are both rounded. In the second modification example, in particular, the third edge 223d and the fourth edge 223e excluding the above-mentioned two corners decrease in distance from each other in the direction parallel to the first edge 223a with decreasing distance to the first edge 223a.

The near-field light generating element 23 of the second modification example has a bottom surface 23h that is closer to the top surface 1a of the substrate 1. A part of the top surface 26c of the waveguide 26 is opposed to a part of the bottom surface 23h of the near-field light generating element 23 with the interposition layer 25 interposed therebetween. FIG. 22 shows an example in which the front end face 26a of the waveguide 26 is located away from the medium facing surface 201a. However, the front end face 26a may be located in the medium facing surface 201a.

As shown in FIG. 23, the near-field light generating element 23 of the second modification example is configured so that an area near the first end face 23a (hereinafter, referred to as front end vicinity area) has a bottom end that gets farther from the top surface 1a of the substrate 1 with decreasing distance to the first end face 23a. Only in the front end vicinity area of the near-field light generating element 23, each of the side surfaces 23d and 23e includes an upper part and a lower part that are continuous with each other, and the angle formed between the lower part of the side surface 23d and the lower part of the side surface 23e is smaller than that formed between the upper part of the side surface 23d and the upper part of the side surface 23e. In the area other than the front end vicinity area of the near-field light generating element 23, the side surfaces 23d and 23e are each planar or almost planar in shape.

The first end face 23a includes: a first side 123d that is located at an end of the first side surface 23d; a second side 123e that is located at an end of the second side surface 23e; a third side 123c that is located at an end of the top surface 23c; and a pointed tip 123g that is formed by contact of the first side 123d and the second side 123e with each other and constitutes the near-field light generating part 23g. Specifically, the near-field light generating part 23g refers to the pointed tip 123g and its vicinity in the end face 23a.

The first side 123d includes an upper part and a lower part that are continuous with each other. The second side 123e includes an upper part and a lower part that are continuous with each other. The angle formed between the lower part of the first side 123d and the lower part of the second side 123e is smaller than the angle formed between the upper part of the first side 123d and the upper part of the second side 123e.

As shown in FIG. 22, the length of the near-field light generating element 23 in the direction perpendicular to the medium facing surface 201a will be denoted by the symbol $H_{P4}$; the width of the first end face 23a at its top edge will be denoted by the symbol $W_{P4}$; and the maximum width of the near-field light generating element 23 in the track width direction (the X direction) will be denoted by the symbol $WB_{P4}$. As shown in FIG. 23, the length of the first end face 23a in the direction perpendicular to the top surface 1a of the substrate 1 will be denoted by the symbol $T_{P4}$. The length $H_{P4}$ of the near-field light generating element 23 in the direction perpendicular to the medium facing surface 201a is greater than the length $T_{P4}$ of the first end face 23a in the direction perpendicular to the top surface 1a of the substrate 1. $W_{P4}$ falls within the range of 50 to 350 nm, for example. $T_{P4}$ falls within the range of 60 to 350 nm, for example. $H_{P4}$ falls within the range of 0.25 to 2.5 μm, for example. $WB_{P4}$ falls within the range of 0.25 to 2.5 μm, for example.

The second modification example allows an increase in area of the opposed portion of the waveguide 26 opposed to a part of the coupling portion (a part of the bottom surface 23h) of the outer surface of the near-field light generating element 23. Consequently, it is possible to excite more surface plasmons on the coupling portion (the bottom surface 23h) of the near-field light generating element 23. According to the second modification example, in the near-field light generating element 23, the corner between the side surface 23d and the second end face 23b and the corner between the side surface 23e and the second end face 23b are both rounded. This can prevent near-field light from occurring from these corners. In the second modification example, the side surfaces 23d and 23e of the near-field light generating element 23, excluding the foregoing two corners, decrease in distance from each other in the track width direction with decreasing distance to the medium facing surface 201a. This configuration can concentrate surface plasmons excited on the bottom surface 23h while the surface plasmons propagate to the near-field light generating part 23g. According to the second modification example, it is therefore possible to concentrate more surface plasmons at the near-field light generating part 23g of pointed shape.

Second Embodiment

Figure 24:
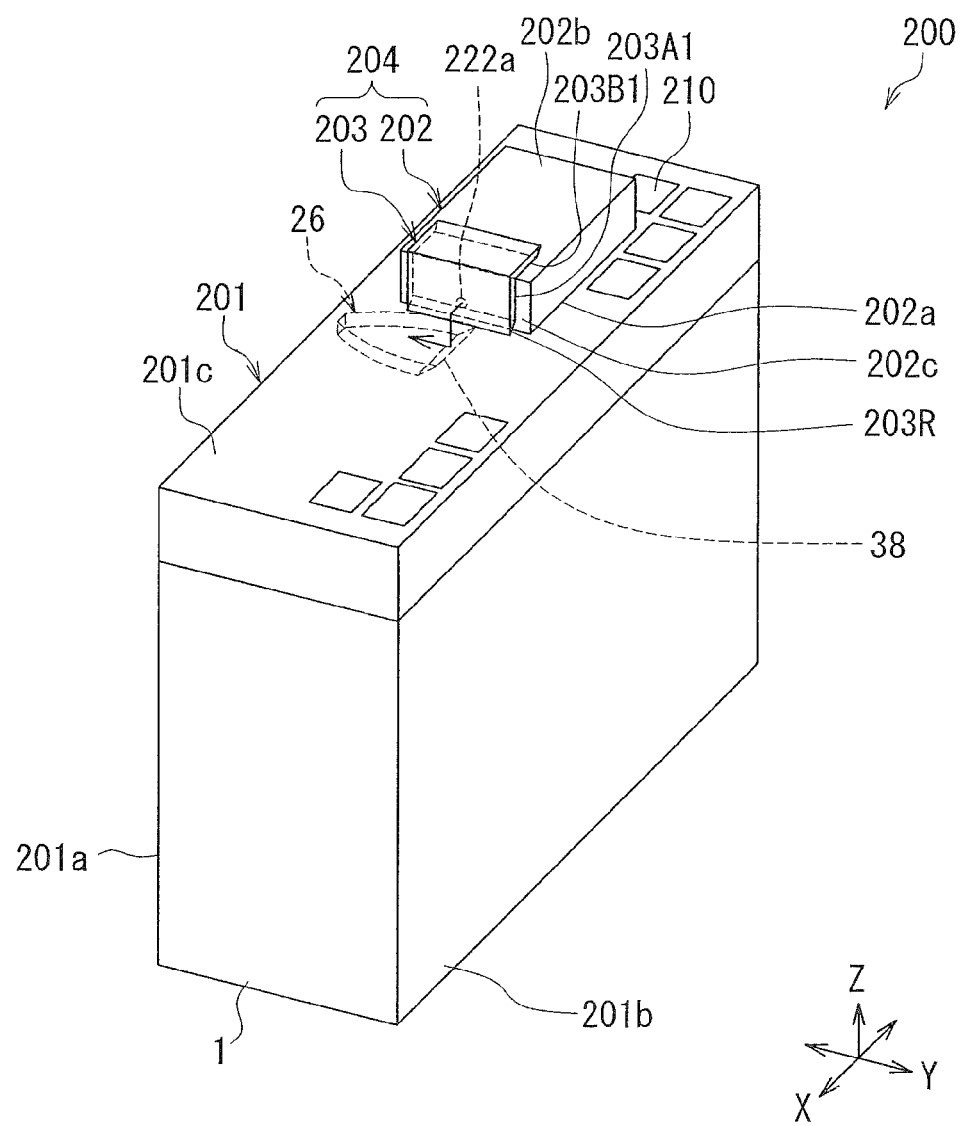
FIG. 24 is a perspective view of a heat-assisted magnetic recording head according to a second embodiment of the invention.
Figure 25:
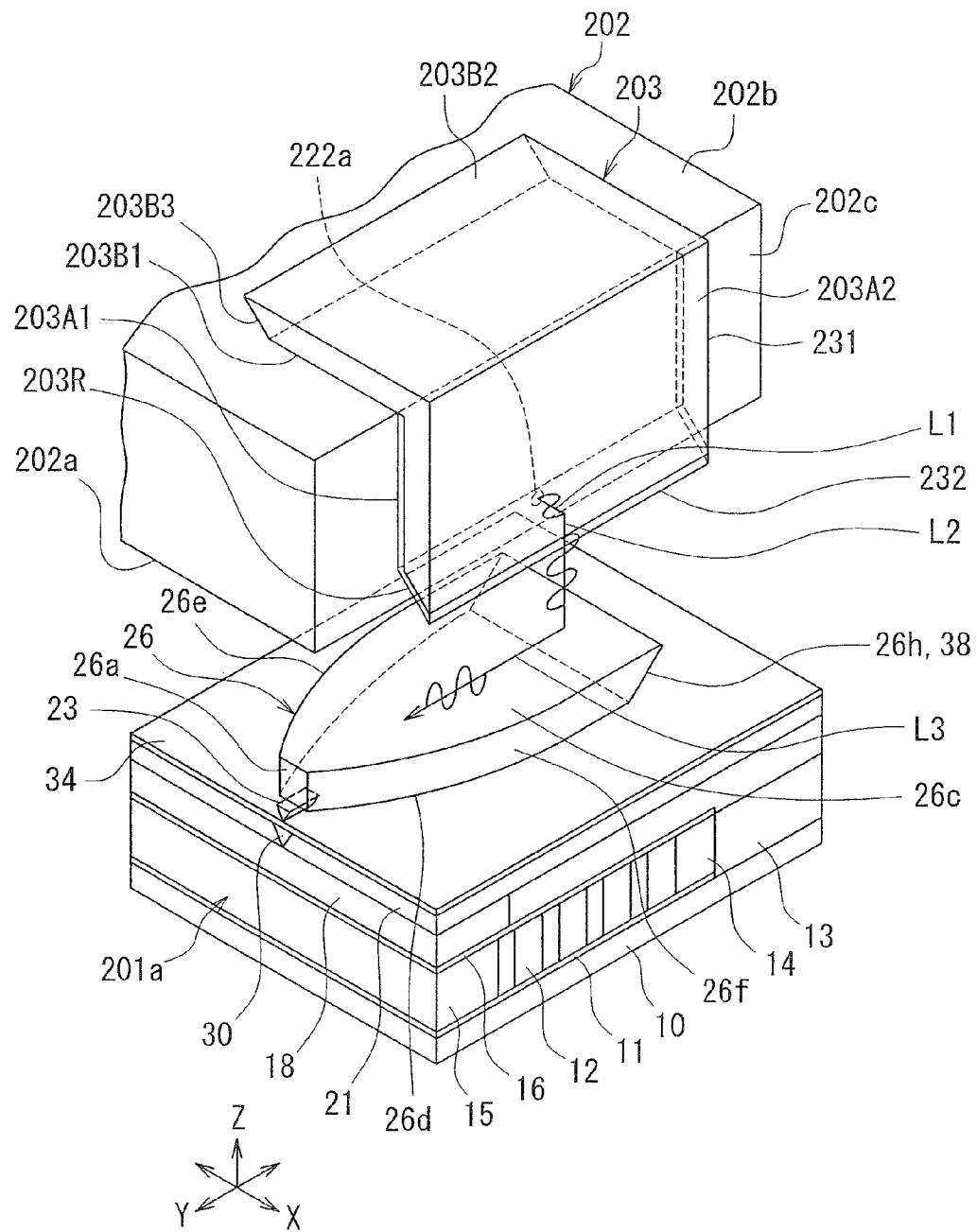
FIG. 25 is a perspective view showing the main part of the heat-assisted magnetic recording head shown in FIG. 24.
Figure 26:
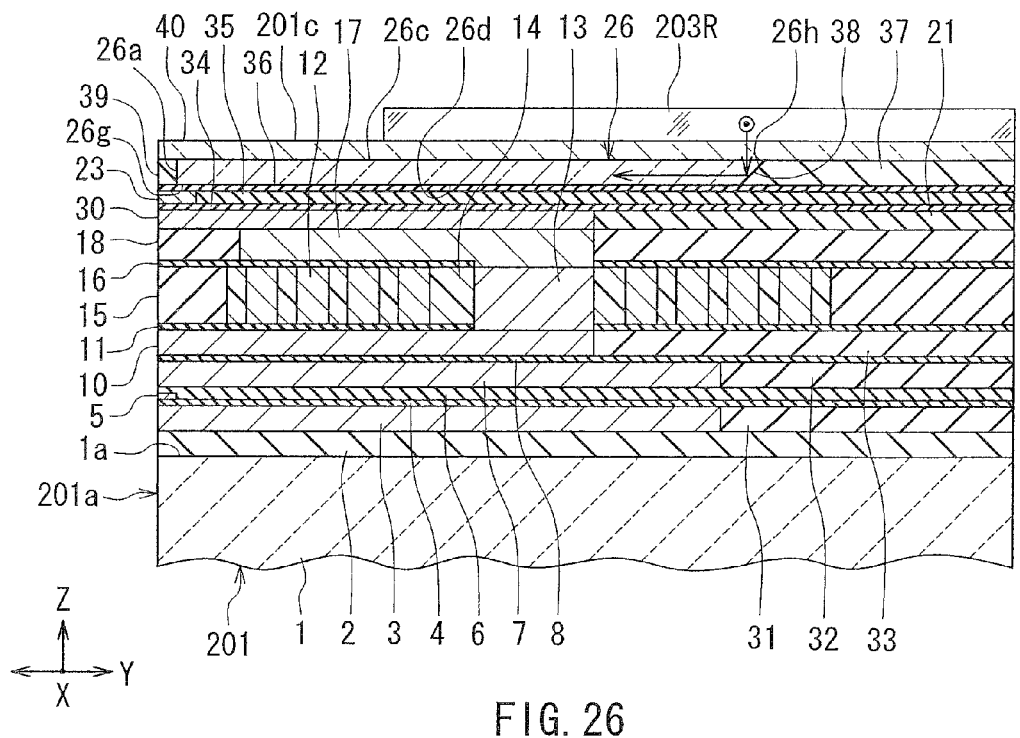
FIG. 26 is a cross-sectional view showing the configuration of a slider of the second embodiment of the invention.
Figure 27:
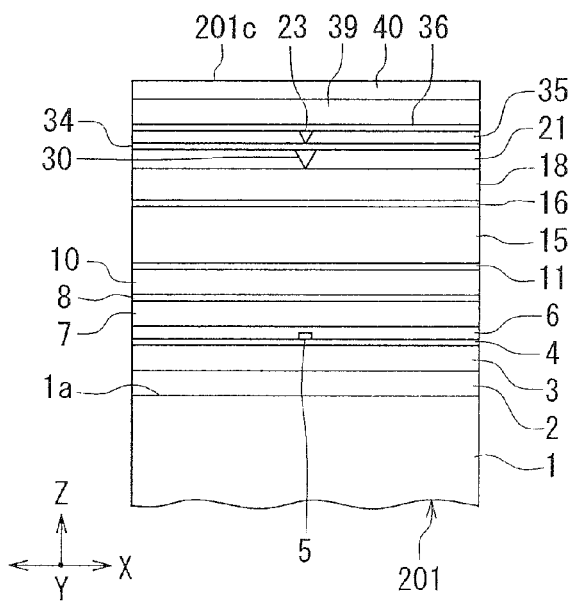
FIG. 27 is a front view showing the medium facing surface of the slider of the second embodiment of the invention.
Figure 28:
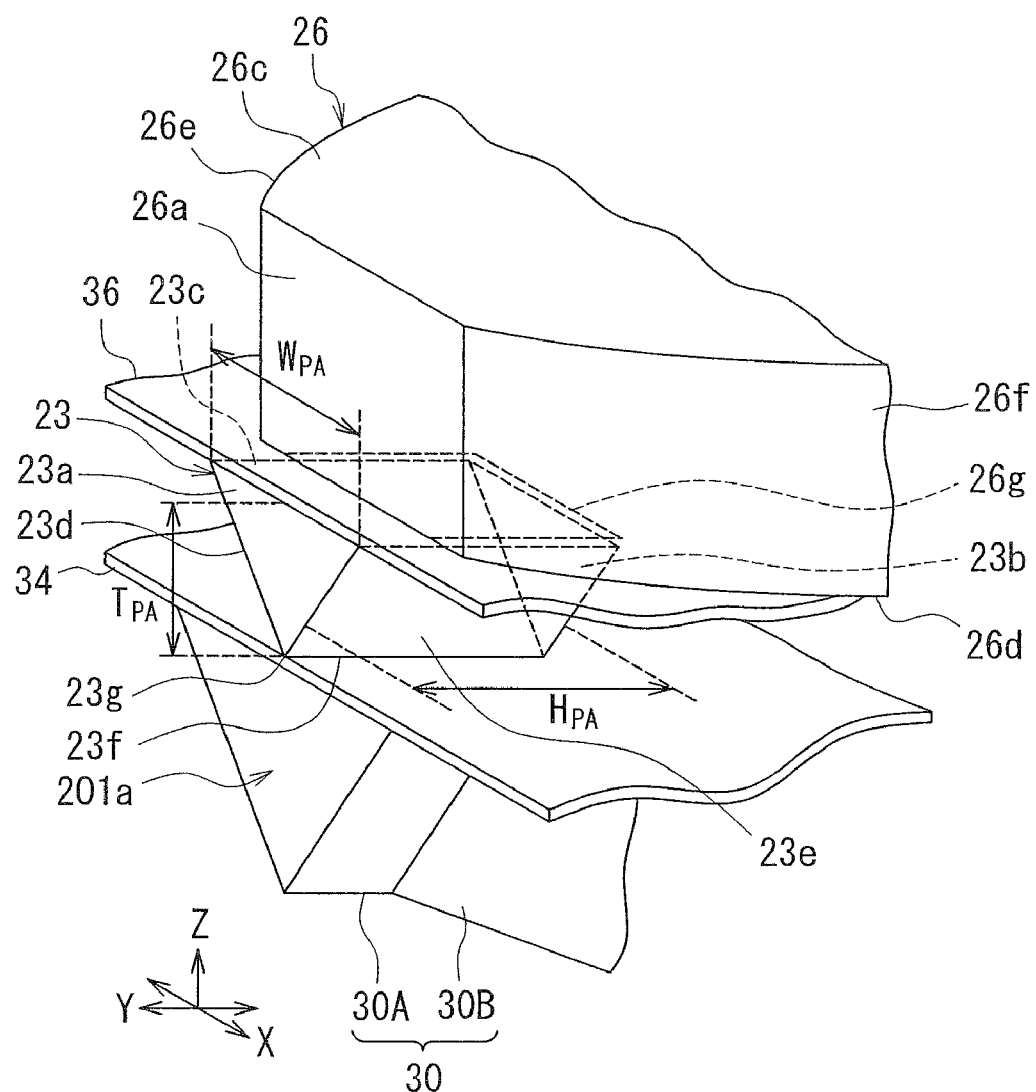
FIG. 28 is a perspective view showing a near-field light generating element and its vicinity in the heat-assisted magnetic recording head according to the second embodiment of the invention.

A heat-assisted magnetic recording head according to a second embodiment of the invention will now be described with reference to FIG. 24 to FIG. 28. FIG. 24 is a perspective view of the heat-assisted magnetic recording head according to the present embodiment. FIG. 25 is a perspective view of the main part of the heat-assisted magnetic recording head shown in FIG. 24. FIG. 26 is a cross-sectional view showing the configuration of the slider of the present embodiment. FIG. 27 is a front view showing the medium facing surface of the slider of the present embodiment. FIG. 28 is a perspective view showing the near-field light generating element and its vicinity in the heat-assisted magnetic recording head according to the present embodiment.

In the present embodiment, the laser diode 202 is fixed to the slider 201 by bonding the p-electrode 214 (see FIG. 3) to the top surface 201c of the slider 201 such that the mounting surface 202a faces the top surface 201c and the emitting end face 202c faces toward the X direction, as shown in FIG. 24. The laser diode 202 of the present embodiment emits linearly polarized light whose electric field oscillates in a direction parallel to the plane of the active layer 222, i.e., laser light of TE mode, from the emission part 222a. The p-electrode 214 of the laser diode 202 is electrically connected to one of the terminals 210 of the slider 201. The n-electrode 213 (see FIG. 3) of the laser diode 202 is electrically connected to another one of the terminals 210 of the slider 201. The external mirror 203 is fixed to the laser diode 202 in the same way as the first embodiment.

The configuration of the slider 201 of the present embodiment will now be described in detail with reference to FIG. 26 to FIG. 28. The slider 201 of the present embodiment has the same configuration as that of the slider 201 of the first embodiment, as far as the parts from the substrate 1 to the bottom yoke layer 17 and the nonmagnetic layer 18 are concerned. Hereinafter, a description will be given of differences of the slider 201 of the present embodiment from the slider 201 of the first embodiment.

The slider 201 of the present embodiment includes: a magnetic pole 30 disposed over the bottom yoke layer 17 and the nonmagnetic layer 18; and a nonmagnetic layer 21 made of a nonmagnetic material and disposed around the magnetic pole 30 on the nonmagnetic layer 18. The magnetic pole 30 has an end face located in the medium facing surface 201a. The magnetic pole 30 allows a magnetic flux corresponding to the magnetic field produced by the coil 12 to pass, and produces a recording magnetic field for recording data on the recording medium by means of the perpendicular magnetic recording system. The magnetic pole 30 is made of a magnetic metal material. The material of the magnetic pole 30 may be NiFe, CoNiFe or CoFe, for example. The nonmagnetic layer 21 is made of alumina, for example. The magnetic pole 30 and the nonmagnetic layer 21 are flattened at the top.

As shown in FIG. 28, the magnetic pole 30 includes a track width defining portion 30A and a wide portion 3013. The track width defining portion 30A has an end face located in the medium facing surface 201a and an end opposite thereto. The wide portion 30B is connected to the end of the track width defining portion 30A and has a width greater than that of the track width defining portion 30A. The width of the track width defining portion 30A does not change with the distance from the medium facing surface 201a. For example, the wide portion 30B is equal in width to the track width defining portion 30A at the border with the track width defining portion 30A, and gradually increases in width with increasing distance from the medium facing surface 201a and then maintains a specific width to the end of the wide portion 30B. In the example shown in FIG. 27 and FIG. 28, the end face of the track width defining portion 30A located in the medium facing surface 201a is shaped like an isosceles triangle with its vertex downward. However, the end face of the track width defining portion 30A located in the medium facing surface 201a may have a rectangular or trapezoidal shape.

The slider 201 further includes an insulating layer 34 disposed over the top surfaces of the magnetic pole 30 and the nonmagnetic layer 21. The insulating layer 34 is made of alumina, for example. The insulating layer 34 has a thickness within the range of 30 to 70 nm, for example.

The slider 201 further includes: a near-field light generating element 23 disposed on the insulating layer 34; and an insulating layer 35 made of an insulating material and disposed around the near-field light generating element 23 on the insulating layer 34. The near-field light generating element 23 and the insulating layer 35 are flattened at the top. The insulating layer 35 is made of alumina, for example. The material and shape of the near-field light generating element 23 are the same as those in the first embodiment.

The slider 201 further includes: an interposition layer 36 disposed over the top surfaces of the near-field light generating element 23 and the insulating layer 35; and a waveguide 26 and clad layers 37 and 39 disposed on the interposition layer 36. The waveguide 26 is made of a dielectric material that transmits the laser light. The interposition layer 36 is made of a dielectric material that has a refractive index lower than that of the waveguide 26 and transmits the laser light. The clad layers 37 and 39 are made of a dielectric material that has a refractive index lower than that of the waveguide 26. For example, the waveguide 26 may be made of $Ta_2O_5$ which has a refractive index of approximately 2.1, and the interposition layer 36 and the clad layers 37 and 39 may be made of alumina which has a refractive index of approximately 1.8. The interposition layer 36 has a thickness within the range of 30 to 70 nm, for example.

As shown in FIG. 24 and FIG. 25, the waveguide 26 extends in the direction perpendicular to the medium facing surface 201a (the Y direction). The waveguide 26 has an outer surface. The outer surface includes: a front end face 26a that is closer to the medium facing surface 201a; a rear end face 26h that is farther from the medium facing surface 201a; a top surface 26c that is farther from the top surface 1a of the substrate 1; a bottom surface 26d that is closer to the top surface 1a of the substrate 1; and two side surfaces 26e and 26f that are opposite to each other in the track width direction. FIG. 25 shows an example in which the front end face 26a is located away from the medium facing surface 201a. The front end face 26a may be located in the medium facing surface 201a, however. The clad layer 37 is located farther from the medium facing surface 201a than is the rear end face 26h. The clad layer 39 is disposed around the waveguide 26 and the clad layer 37. The waveguide 26 and the clad layers 37 and 39 are flattened at the top.

The outer surface of the waveguide 26 includes an opposed portion 26g that is opposed to a part of the coupling portion of the outer surface of the near-field light generating element 23. In the present embodiment, as shown in FIG. 28, the waveguide 26 is disposed farther from the top surface 1a of the substrate 1 than is the near-field light generating element 23, and a part of the bottom surface 26d of the waveguide 26 is opposed to a part of the top surface 23c of the near-field light generating element 23 with the interposition layer 36 interposed therebetween. This part of the bottom surface 26d of the waveguide 26 opposed to the part of the top surface 23c is the opposed portion 26g. The length $H_{PA}$ of the near-field light generating element 23 in the direction perpendicular to the medium facing surface 201a is greater than the length $T_{PA}$ of the first end face 23a in the direction perpendicular to the top surface 1a of the substrate 1. This configuration is necessary in order that the opposed portion 26g, which is a part of the bottom surface 26d of the waveguide 26, is opposed to a part of the top surface 23c of the near-field light generating element 23 with the interposition layer 36 interposed therebetween.

As shown in FIG. 26, the rear end face 26h is an oblique surface forming an angle of 45° with respect to the direction perpendicular to the top surface 1a of the substrate 1. The distance between the medium facing surface 201a and an arbitrary point on the rear end face 26h increases with increasing distance between the arbitrary point and the top surface 1a of the substrate 1.

The slider 201 further includes an internal mirror 38 that is disposed between the waveguide 26 and the clad layer 37 so as to be in contact with the rear end face 26h of the waveguide 26. The internal mirror 38 is made of a film of a metal such as Cu or Au having a thickness of 50 to 200 nm or so. The internal mirror 38 is configured to reflect laser light emitted from the laser diode 202 disposed above the waveguide 26, so as to let the laser light travel through the waveguide 26 toward the medium facing surface 201a. More specifically, the internal mirror 38 is configured to reflect the laser light that enters the waveguide 26 from the top surface 26c of the waveguide 26 and reaches the rear end face 26h, so as to let the laser light travel toward the front end face 26a.

The slider 201 further includes a clad layer 40 disposed over the top surfaces of the waveguide 26 and the clad layers 37 and 39. The clad layer 40 is made of a dielectric material that has a refractive index lower than that of the waveguide 26 and transmits the laser light. For example, if the waveguide 26 is made of $Ta_2O_5$ which has a refractive index of approximately 2.1, the clad layer 40 may be made of alumina which has a refractive index of approximately 1.8. The clad layer 40 has a thickness in the range of 0.1 to 0.5 μm, for example. The top surface of the clad layer 40 constitutes the top surface 201c of the slider 201.

The laser diode 202 and the external mirror 203 constitute a laser assembly 204 according to the present embodiment. The laser assembly 204, in combination with the slider 201, constitutes the heat-assisted magnetic recording head 200. The laser assembly 204 and the parts of the slider 201 from the return magnetic pole layer 10 to the clad layer 40 constitute the recording head.

Reference is now made to FIG. 25 to describe the path of the laser light emitted from the emission part 222a of the laser diode 202. The laser light emitted from the emission part 222a of the laser diode 202 is reflected by the reflecting surface 203R of the external mirror 203, passes through the clad layer 40, and enters the waveguide 26 from the top surface 26c to reach the rear end face 26h. The laser light is then reflected by the internal mirror 38 so as to travel through the waveguide 26 toward the medium facing surface 201a (the front end face 26a).

Here, the laser light emitted from the emission part 222a will be designated by the reference symbol L1; the laser light reflected by the external mirror 203 will be designated by the reference symbol L2; and the laser light reflected by the internal mirror 38 will be designated by the reference symbol L3. In the present embodiment, the laser diode 202, the external mirror 203, the internal mirror 38 and the waveguide 26 are arranged so that the direction of travel of the laser light L1 emitted from the emission part 222a and the direction of travel of the laser light L3 reflected by the internal mirror 38 are orthogonal to each other as viewed from above the top surface 201c of the slider 201.

FIG. 25 shows an example of the shape of the waveguide 26. In this example, the two side surfaces 26e and 26f of the waveguide 26 are formed as a reflecting surface of parabolic shape in the vicinity of the front end face 26a as viewed from above. This reflecting surface has the function of collecting the light propagating through the waveguide 26 to the vicinity of the front end face 26a.

With reference to FIG. 25, a description will be given of the direction of polarization of the laser light of the present embodiment. In the present embodiment, the laser diode 202 emits laser light of TE mode from the emission part 222a. The direction of oscillation of the electric field of the laser light emitted from the emission part 222a is parallel to the XY plane. The laser light emitted from the emission part 222a is reflected by the reflecting surface 203R of the external mirror 203 and travels toward the waveguide 26. Here, the direction of oscillation of the electric field of the laser light is parallel to the YZ plane. The laser light passes through the clad layer 40, enters the waveguide 26 from the top surface 26c, and is reflected by the internal mirror 38. The direction of oscillation of the electric field of the laser light reflected by the internal mirror 38 is parallel to the YZ plane. The laser light reflected by the internal mirror 38 propagates through the waveguide 26 to reach the opposed portion 26g. The direction of oscillation of the electric field of this laser light is perpendicular to the opposed portion 26g. This makes it possible to produce surface plasmons of high intensity on the near-field light generating element 23.

Reference is now made to FIG. 29A to FIG. 35A and FIG. 29B to FIG. 35B to describe a manufacturing method for the heat-assisted magnetic recording head 200 according to the present embodiment. FIG. 29A to FIG. 35A each show a cross section of a stack of layers formed in the process of manufacturing the heat-assisted magnetic recording head 200, the cross section being perpendicular to the medium facing surface and the substrate. In FIG. 29A to FIG. 35A, the symbol "ABS" indicates the position where the medium facing surface 201a is to be formed. FIG. 29B to FIG. 35B show cross sections at the position ABS of FIG. 29A to FIG. 35A, respectively.

The manufacturing method for the heat-assisted magnetic recording head 200 according to the present embodiment is the same as that of the first embodiment up to the step of flattening the bottom yoke layer 17 and the nonmagnetic layer 18 at the top as shown in FIG. 10A and FIG. 10B.

Figure 29A:
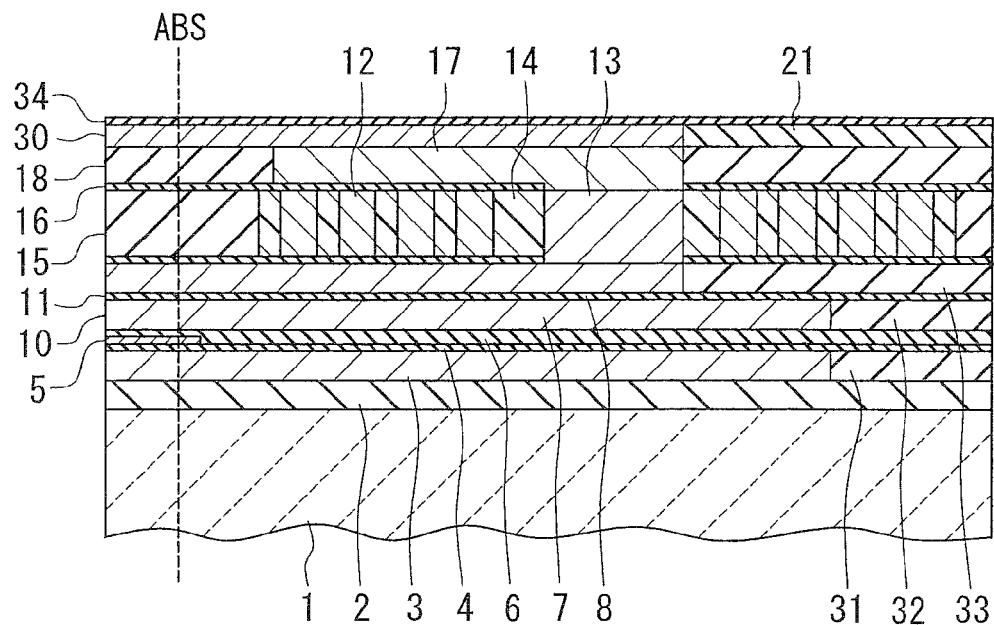
FIG. 29A and FIG. 29B are explanatory diagrams showing a step of a manufacturing method for the heat-assisted magnetic recording head according to the second embodiment of the invention.
Figure 29B:
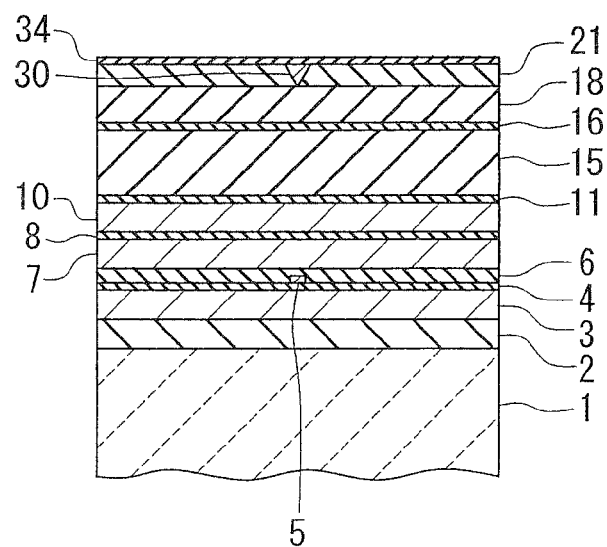

FIG. 29A and FIG. 29B show the next step. In this step, first, the nonmagnetic layer 21 is formed over the bottom yoke layer 17 and the nonmagnetic layer 18. Next, the nonmagnetic layer 21 is selectively etched to form therein a groove for accommodating the magnetic pole 30. The magnetic pole 30 is then formed by, for example, frame plating, so as to be accommodated in the groove of the nonmagnetic layer 21. Next, the magnetic pole 30 and the nonmagnetic layer 21 are flattened at the top by polishing the magnetic pole 30 and the nonmagnetic layer 21 by CMP, for example. Next, the insulating layer 34 is formed over the magnetic pole 30 and the nonmagnetic layer 21.

Figure 30A:
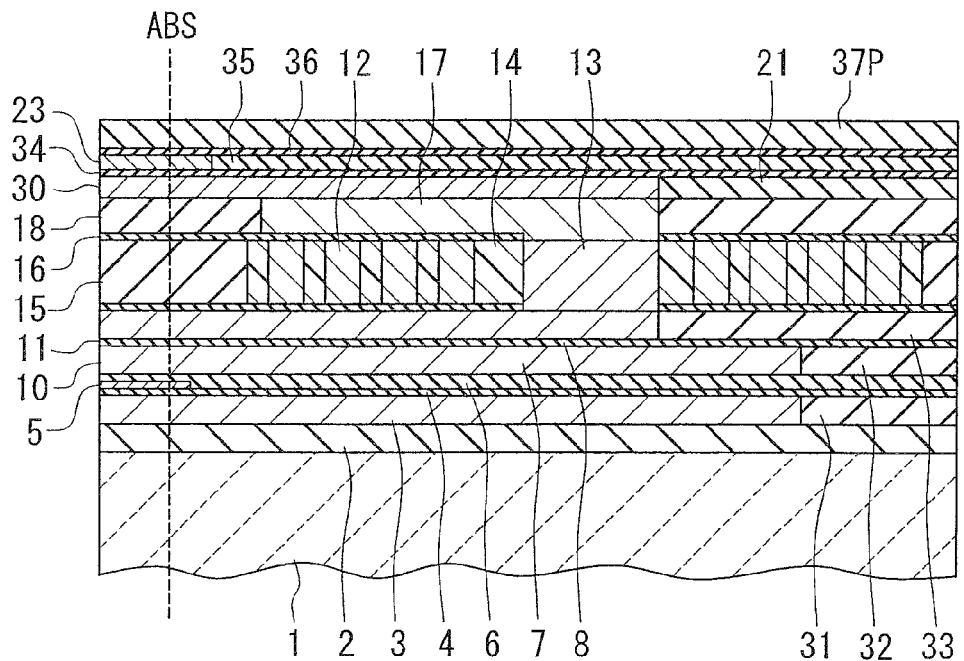
FIG. 30A and FIG. 30B are explanatory diagrams showing a step that follows the step of FIG. 29A and FIG. 29B.
Figure 30B:
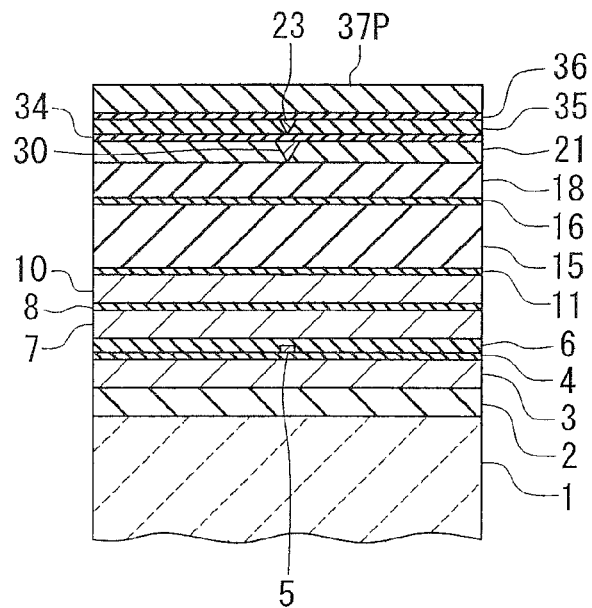

FIG. 30A and FIG. 30B show the next step. In this step, first, the insulating layer 35 is formed on the insulating layer 34. The insulating layer 35 is then selectively etched to form therein a groove for accommodating the near-field light generating element 23. The near-field light generating element 23 is then formed to be accommodated in the groove of the insulating layer 35. Next, the interposition layer 36 is formed over the near-field light generating element 23 and the insulating layer 35. Next, a dielectric layer 37P is formed on the interposition layer 36. The dielectric layer 37P is to be made into the clad layer 37 later.

Figure 31A:
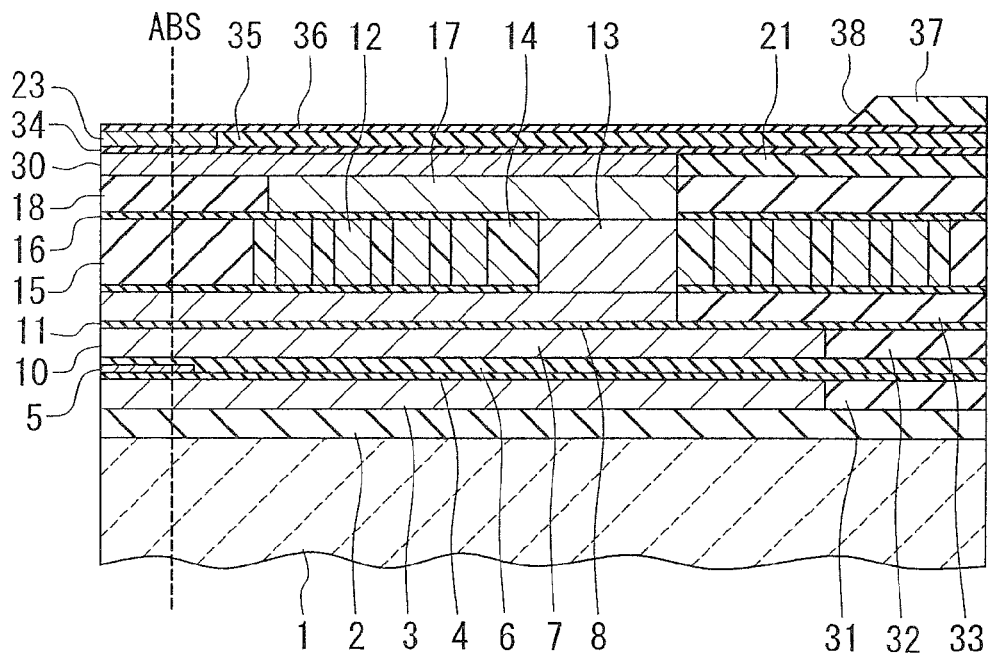
FIG. 31A and FIG. 31B are explanatory diagrams showing a step that follows the step of FIG. 30A and FIG. 30B.
Figure 31B:
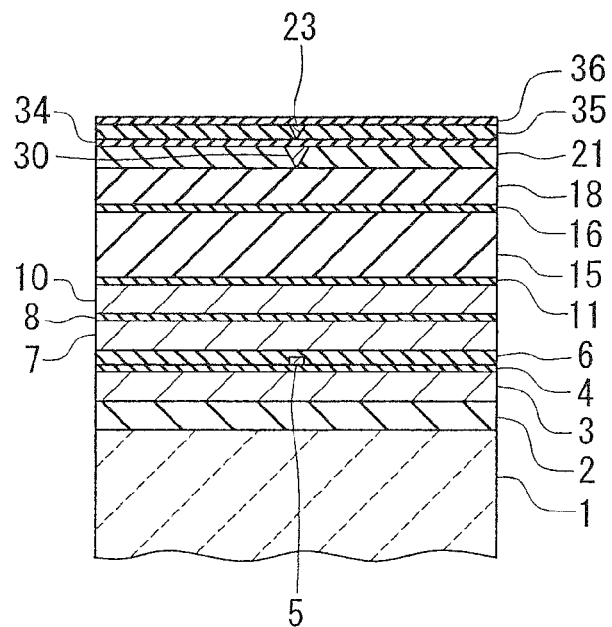

FIG. 31A and FIG. 31B show the next step. In this step, first, a not-shown metal mask having a plane shape corresponding to that of the clad layer 37 is formed on the dielectric layer 37P. Next, the clad layer 37 is formed by selectively etching the dielectric layer 37P by reactive ion etching (hereinafter referred to as RIE), for example. Here, the dielectric layer 37P is taper-etched so as to provide the clad layer 37 with an oblique surface for the internal mirror 38 to be formed thereon. Then, the internal mirror 38 is formed on the oblique surface of the clad layer 37.

Figure 32A:
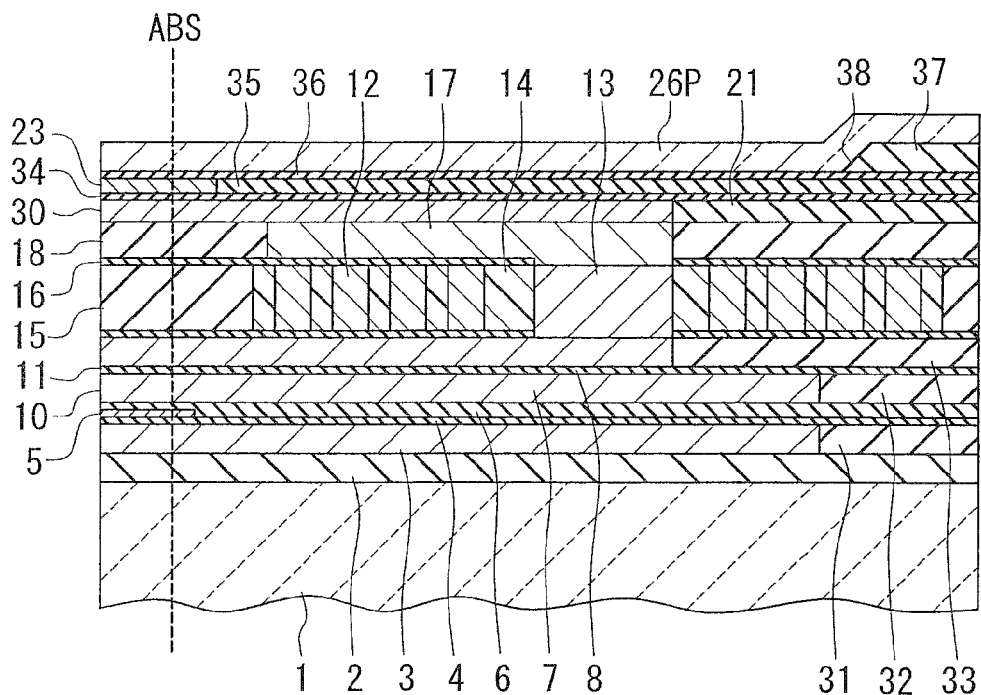
FIG. 32A and FIG. 32B are explanatory diagrams showing a step that follows the step of FIG. 31A and FIG. 31B.
Figure 32B:
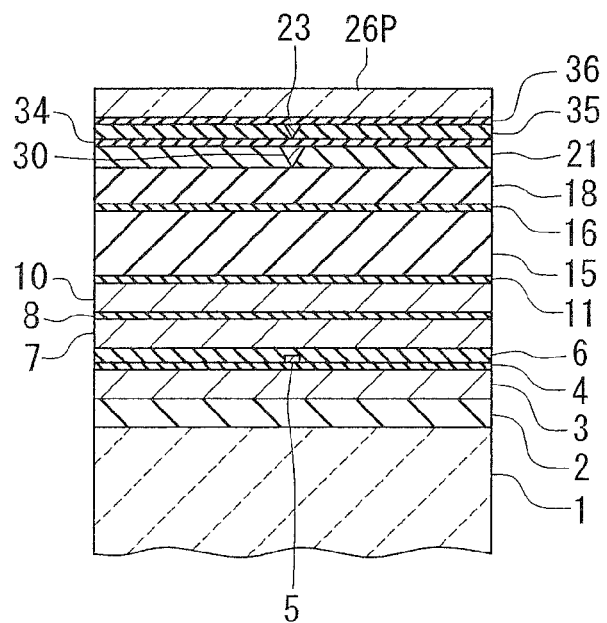

Next, as shown in FIG. 32A and FIG. 32B, a dielectric layer 26P is formed over the entire top surface of the stack. The dielectric layer 26P is to be made into the waveguide 26 later.

Figure 33A:
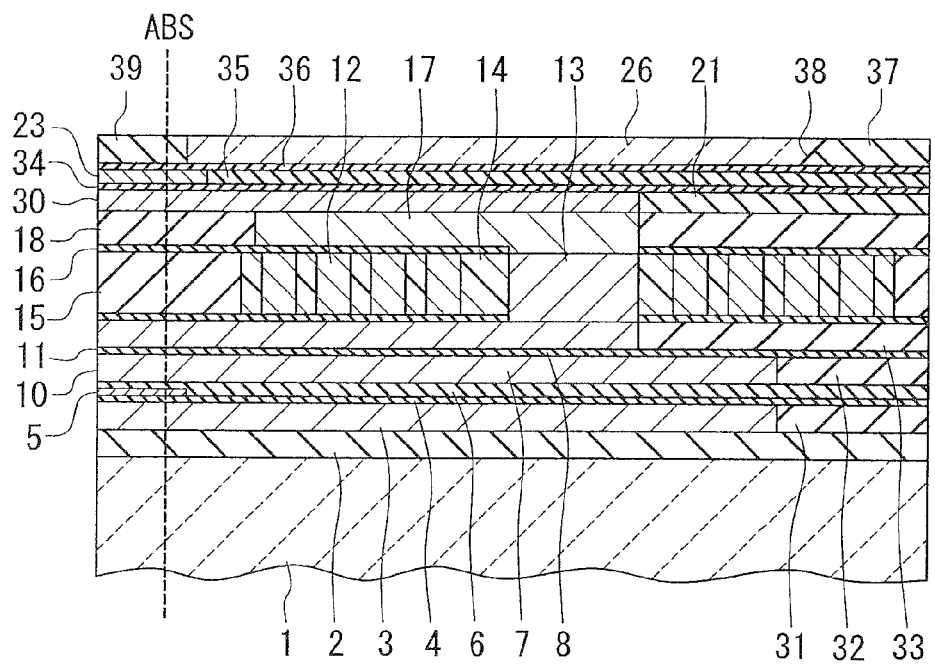
FIG. 33A and FIG. 33B are explanatory diagrams showing a step that follows the step of FIG. 32A and FIG. 32B.
Figure 33B:
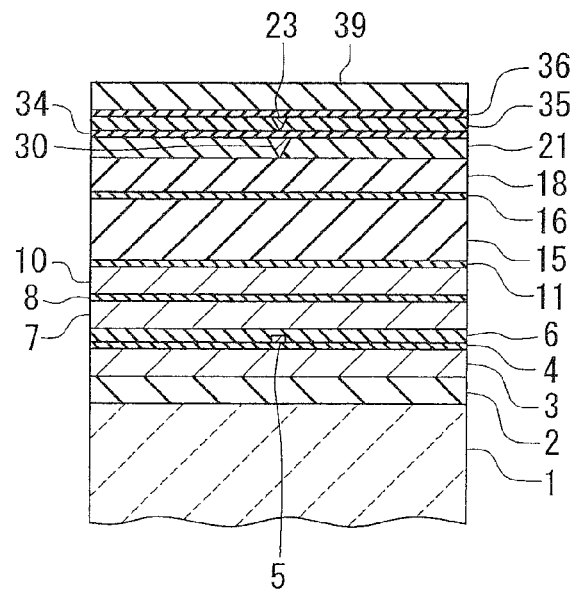

FIG. 33A and FIG. 33B show the next step. In this step, first, the waveguide 26 is formed by selectively etching the dielectric layer 26P by RIE, for example. Next, a dielectric layer to be made into the clad layer 39 later is formed over the entire top surface of the stack. The dielectric layer is then polished by, for example, CMP, until the waveguide 26 is exposed. The dielectric layer remaining after the polishing makes the clad layer 39. This polishing also flattens the waveguide 26 and the clad layers 37 and 39 at the top.

Figure 34A:
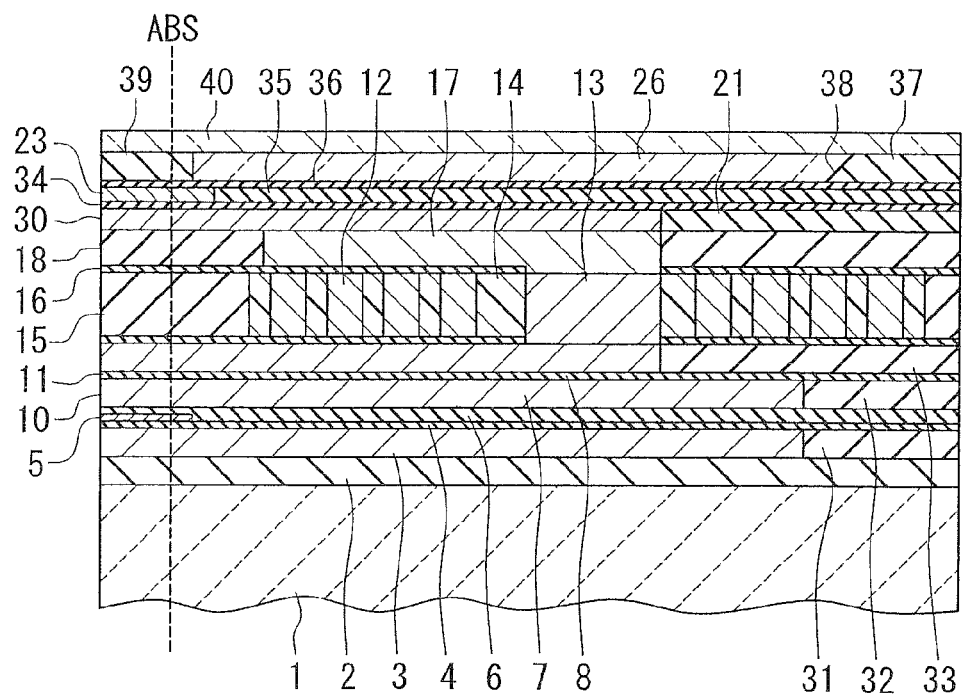
FIG. 34A and FIG. 34B are explanatory diagrams showing a step that follows the step of FIG. 33A and FIG. 33B.
Figure 34B:
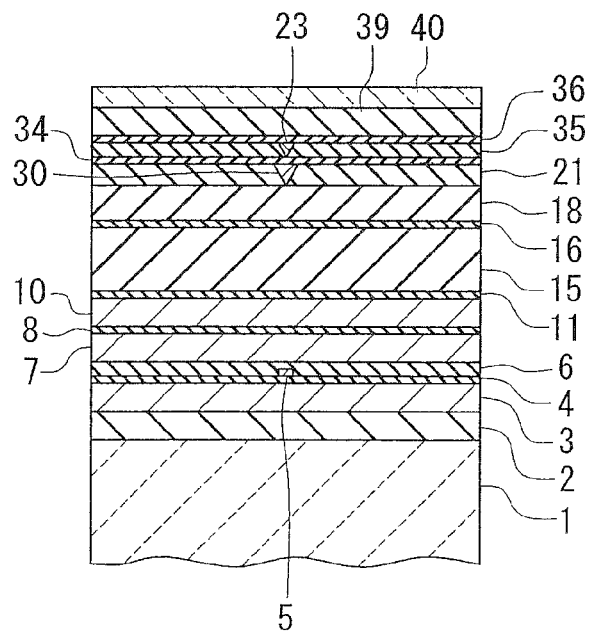

Next, as shown in FIG. 34A and FIG. 34B, the clad layer 40 is formed over the entire top surface of the stack. Wiring, the terminals 210 and so on are then formed on the top surface of the clad layer 40.

Figure 35A:
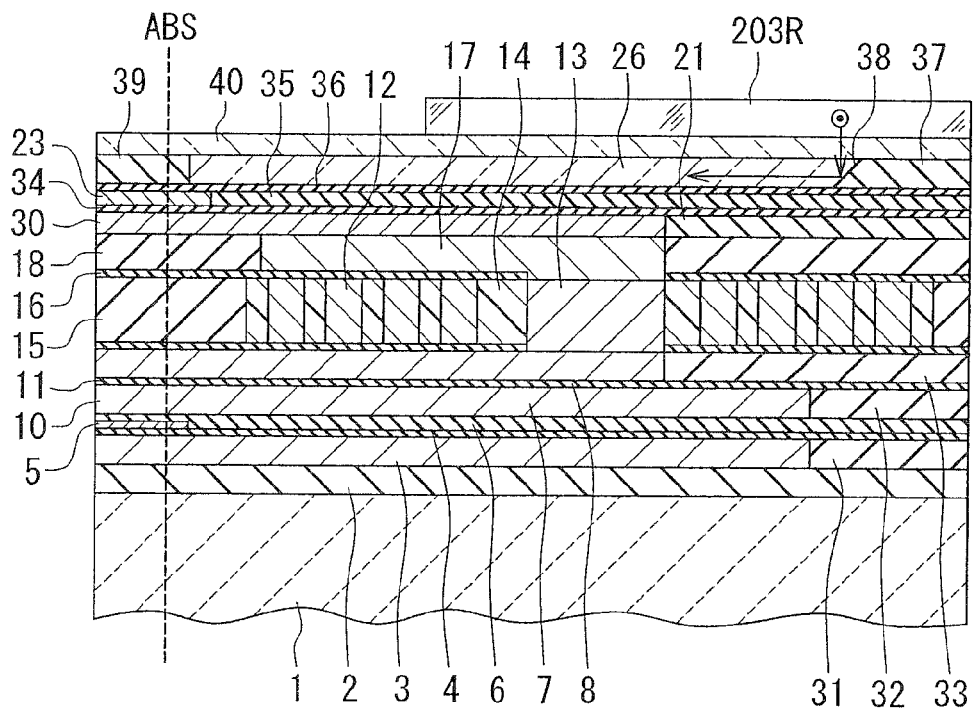
FIG. 35A and FIG. 35B are explanatory diagrams showing a step that follows the step of FIG. 34A and FIG. 34B.
Figure 35B:
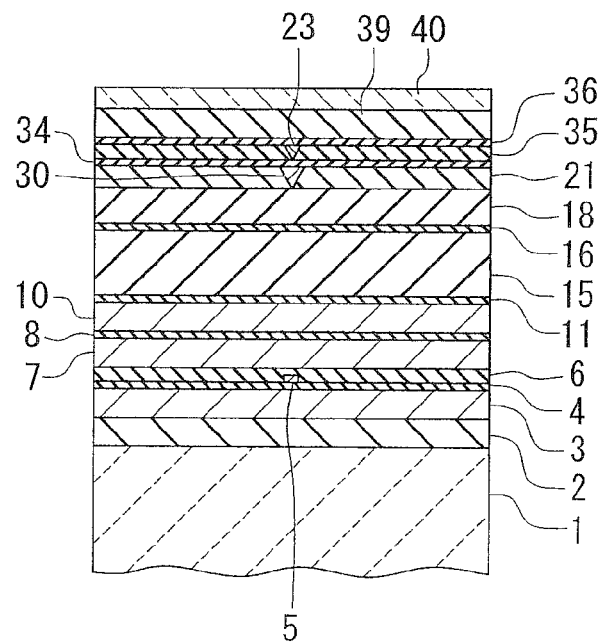

FIG. 35A and FIG. 35B show the next step. In this step, the laser assembly 204 is fixed to the top surface of the clad layer 40, i.e., the top surface 201c of the slider 201, such that the mounting surface 202a of the laser diode 202 faces the top surface 201c of the slider 201 and the emitting end face 202c faces toward the X direction. Of the laser assembly 204, only the reflecting surface 203R of the external mirror 203 is shown in FIG. 35A. Alignment of the laser assembly 204 with respect to the slider 201 is performed using a flip chip bonder, for example. Fixation of the laser assembly 204 to the slider 201 is performed using an adhesive, for example.

The slider 201 may include a conductor layer that is arranged to be exposed in the top surface 201c and electrically connects the p-electrode 214 of the laser diode 202 to one of the terminals 210. In this case, the p-electrode 214 of the laser diode 202 may be bonded to the conductor layer. For example, a conductive bonding material such as solder or a conductive adhesive, or ultrasonic bonding may be employed to bond the p-electrode 214 to the conductor layer. The n-electrode 213 of the laser diode 202 is electrically connected to another one of the terminals 210 with a not-shown bonding wire, for example.

Next, the substrate is cut into sliders, and polishing of the medium facing surface 201a, fabrication of flying rails, etc. are performed to thereby complete the heat-assisted magnetic recording head 200.

As has been described, in the present embodiment, the laser diode 202 is fixed to the slider 201 such that the mounting surface 202a faces the top surface 201c of the slider 201. The laser light emitted form the emission part 222a of the laser diode 202 is reflected by the external mirror 203 toward the waveguide 26. The mounting surface 202a of the laser diode 202 is parallel to the plane of the active layer 222 and has an area greater than that of the emitting end face 202c. In the present embodiment, it is therefore easy to align the laser diode 202 with respect to the slider 201 with high precision so that the optical axis of the laser light emitted from the emission part 222a is parallel to the top surface 201c of the slider 201. Thus, according to the present embodiment, it is possible to align the laser diode 202 with respect to the slider 201 so that the optical axis of the laser light emitted from the emission part 222a will not tilt with respect to a desired direction.

In the present embodiment, as shown in FIG. 25, the laser diode 202, the external mirror 203, the internal mirror 38 and the waveguide 26 are arranged so that the direction of travel of the laser light L1 emitted from the emission part 222a and the direction of travel of the laser light L3 reflected by the internal mirror 38 are orthogonal to each other as viewed from above the top surface 201c of the slider 201. According to the present embodiment, such arrangement allows the direction of polarization (the direction of oscillation of the electric field) of the laser light L3 reflected by the internal mirror 38 to be orthogonal to the direction of polarization of the laser light L1 emitted from the emission part 222a. Consequently, the present embodiment makes it possible that the direction of polarization of the laser light propagating through the waveguide 26 is set to such a direction that surface plasmons of high intensity can be generated on the near-field light generating element 23, i.e., the direction perpendicular to the opposed portion 26g, while using a typical laser diode that emits laser light of TE mode as the laser diode 202.

In the heat-assisted magnetic recording head 200 according to the present embodiment, the near-field light generating element 23 and the waveguide 26 are disposed farther from the top surface 1a of the substrate 1 than is the magnetic pole 30, and the light emitted from the laser diode 202 disposed above the waveguide 26 is reflected by the internal mirror 38 so as to travel through the waveguide 26 toward the medium facing surface 201a.

A case will now be considered where a near-field light generating element and a waveguide are disposed closer to the top surface 1a of the surface 1 than is the magnetic pole 30, i.e., in a positional relationship reverse to that of the near-field light generating element 23 and the waveguide 26 with the magnetic pole 30 according to the present embodiment. In this case, the magnetic pole 30 lies above the near-field light generating element and the waveguide. Therefore, if the laser diode is disposed above the waveguide as in the present embodiment, the optical path from the laser diode to the waveguide becomes long and the energy loss of the light increases. In addition, the long optical path from the laser diode to the waveguide makes it harder to precisely align the laser diode and the waveguide with respect to each other, thus often resulting in energy loss of the light due to misalignment between the laser diode and the waveguide.

In contrast, according to the present embodiment, it is possible to put the laser diode 202 and the waveguide 26 close to each other. This allows guiding the light from the laser diode 202 to the opposed portion 26g of the outer surface of the waveguide 26 through a short path. According to the present embodiment, it is therefore possible to reduce the energy loss of the light. Furthermore, the present embodiment facilitates precise alignment of the laser diode 202 and the waveguide 26 with respect to each other, since it is possible to put the laser diode 202 and the waveguide 26 close to each other. Consequently, according to the present embodiment, it is possible to reduce the energy loss of the light resulting from misalignment between the laser diode 202 and the waveguide 26.

In the present embodiment, the clad layer 40 having a refractive index lower than that of the waveguide 26 is provided on the top surface of the waveguide 26 on which the laser light is to be incident. Light that is incident on the interface between the waveguide 26 and the clad layer 40 from the side of the waveguide 26 at incident angles greater than or equal to the critical angle is thus totally reflected at the interface. The laser light that is emitted from the laser diode 202 and passes through the clad layer 40 to enter the waveguide 26 is thereby prevented from passing through the clad layer 40 again to return to the laser diode 202. Consequently, according to the present embodiment, it is possible to increase the use efficiency of the laser light and to prevent the laser diode 202 from being damaged by laser light that returns to the laser diode 202.

From the foregoing, the present embodiment makes it possible to increase the use efficiency of the light used for generating near-field light in the heat-assisted magnetic recording head 200.

The remainder of configuration, function and effects of the present embodiment are similar to those of the first embodiment.

Third Embodiment

Figure 36:
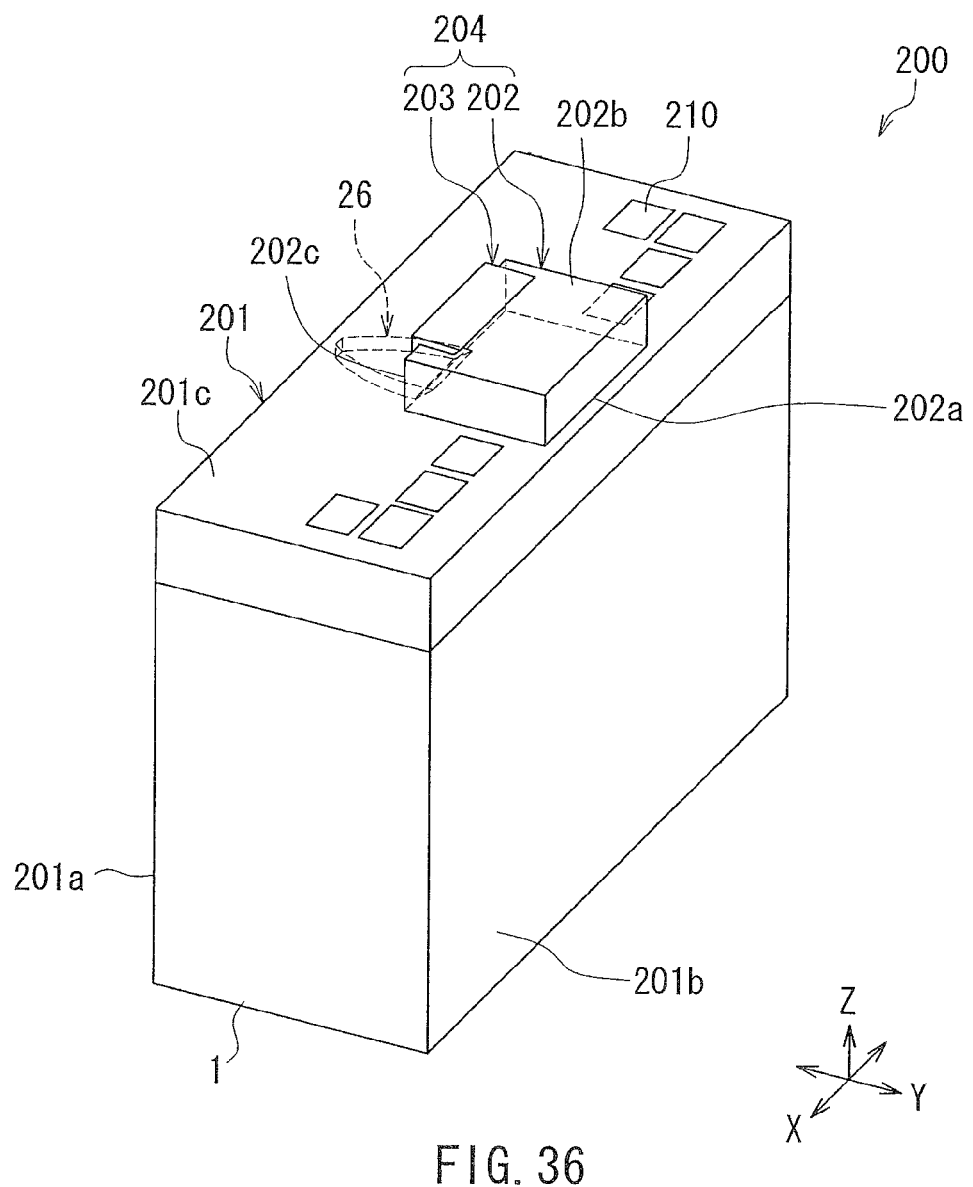
FIG. 36 is a perspective view of a heat-assisted magnetic recording head according to a third embodiment of the invention.
Figure 37:
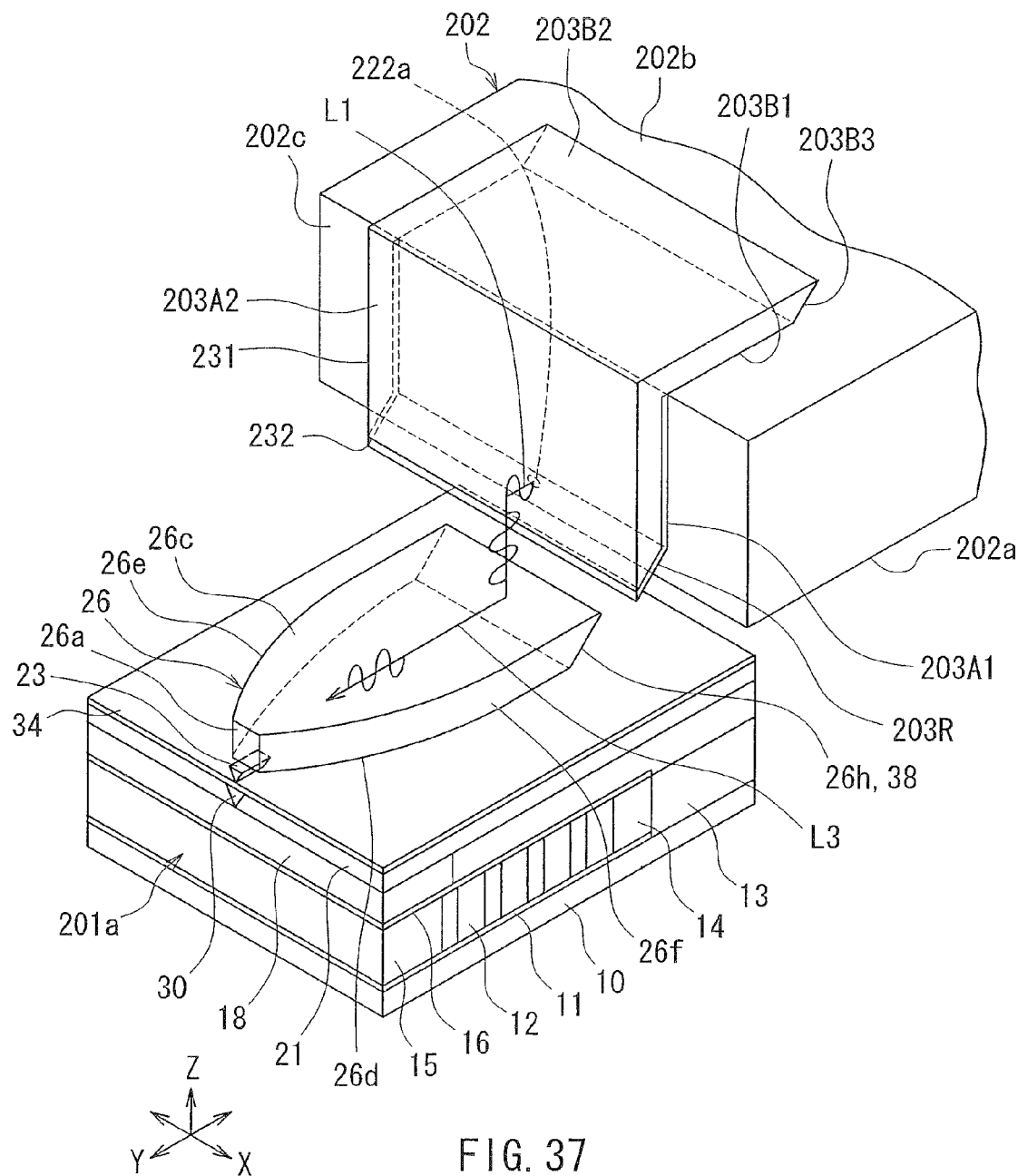
FIG. 37 is a perspective view showing the main part of the heat-assisted magnetic recording head shown in FIG. 36.

A heat-assisted magnetic recording head according to a third embodiment of the invention will now be described with reference to FIG. 36 and FIG. 37. FIG. 36 is a perspective view of the heat-assisted magnetic recording head according to the present embodiment. FIG. 37 is a perspective view of the main part of the heat-assisted magnetic recording head shown in FIG. 36.

In the present embodiment, as shown in FIG. 36 and FIG. 37, the laser diode 202, the external mirror 203, the internal mirror 38 and the waveguide 26 are arranged so that the direction of travel of the laser light L1 emitted from the emission part 222a and the direction of travel of the laser light L3 reflected by the internal mirror 38 are parallel to each other.

In the present embodiment, as shown in FIG. 37, the laser diode 202 emits linearly polarized light whose electric field oscillates in the direction perpendicular to the plane of the active layer 222, i.e., laser light of TM mode, from the emission part 222a. The direction of oscillation of the electric field of the laser light emitted from the emission part 222a is parallel to the YZ plane. The laser light emitted from the emission part 222a is reflected by the reflecting surface 203R of the external mirror 203 and travels toward the waveguide 26. Here, the direction of oscillation of the electric field of the laser light is parallel to the YZ plane. The laser light passes through the clad layer 40, enters the waveguide 26 from the top surface 26c, and is reflected by the internal mirror 38. The direction of oscillation of the electric field of the laser light reflected by the internal mirror 38 is parallel to the YZ plane. The laser light reflected by the internal mirror 38 propagates through the waveguide 26 to reach the opposed portion 26g. The direction of oscillation of the electric field of this laser light is perpendicular to the opposed portion 26g. This makes it possible to produce surface plasmons of high intensity on the near-field light generating element 23.

The remainder of configuration, function and effects of the present embodiment are similar to those of the second embodiment.

Fourth Embodiment

Figure 38:
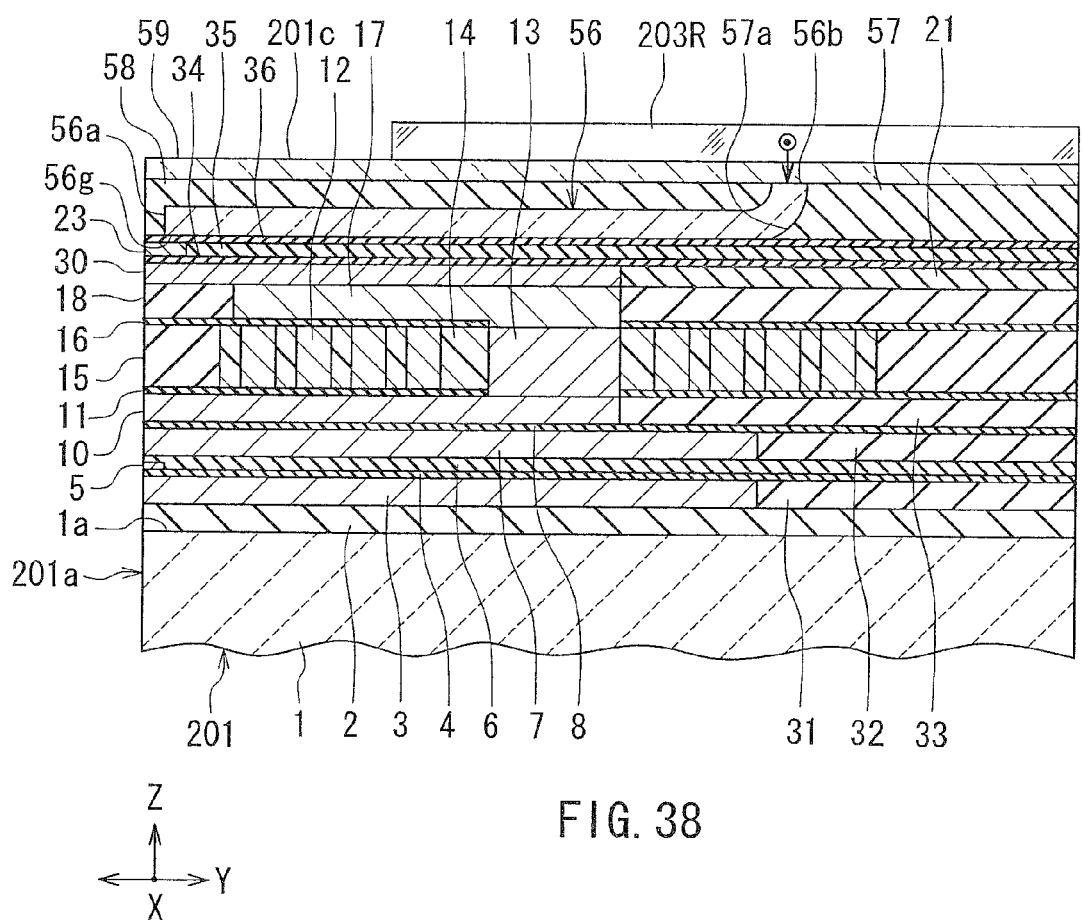
FIG. 38 is a cross-sectional view of a heat-assisted magnetic recording head according to a fourth embodiment of the invention.

A heat-assisted magnetic recording head according to a fourth embodiment of the invention will now be described with reference to FIG. 38. FIG. 38 is a cross-sectional view showing the configuration of the slider of the present embodiment. The slider 201 of the heat-assisted magnetic recording head according to the present embodiment has a waveguide 56 and clad layers 57, 58 and 59, instead of the waveguide 26, the clad layers 37, 39 and 40 and the internal mirror 38 of the second embodiment.

The waveguide 56 is disposed on the interposition layer 36. The waveguide 56, except a portion in the vicinity of the end farther from the medium facing surface 201a, has the same shape as that of the waveguide 26. The portion of the waveguide 56 in the vicinity of the end farther from the medium facing surface 201a is bent to get closer to the top surface 201c of the slider 201 with increasing distance from the medium facing surface 201a. The waveguide 56 has an outer surface. The outer surface includes: a front end face 56a that is closer to the medium facing surface 201a; an incident end face 56b on the opposite side to the front end face 56a; a top surface that is farther from the top surface 1a of the substrate 1; a bottom surface that is closer to the top surface 1a of the substrate 1; and two side surfaces that are opposite to each other in the track width direction. In each of the top surface, the bottom surface and the two side surfaces of the waveguide 56, the portion in the vicinity of the end farther from the medium facing surface 201a is bent to get closer to the top surface 201c of the slider 201 with increasing distance from the medium facing surface 201a. The incident end face 56b is parallel to the top surface 1a of the substrate 1 and faces upward. The laser light reflected by the external mirror 203 is to be incident on this incident end face 56b. FIG. 38 shows an example in which the front end face 56a is located away from the medium facing surface 201a. The front end face 56a may be located in the medium facing surface 201a, however.

The clad layer 57 is disposed farther from the medium facing surface 201a than is the waveguide 56. The clad layer 57 has an end face 57a that is curved and in contact with the waveguide 56. The clad layer 58 is disposed to cover the waveguide 56 excluding its bottom surface and incident end face 56b. The incident end face 56b and the top surfaces of the clad layers 57 and 58 are flattened. The clad layer 59 is disposed over the incident end face 56b and the top surfaces of the clad layers 57 and 58. The top surface of the clad layer 59 constitutes the top surface 201c of the slider 201.

The outer surface of the waveguide 56 includes an opposed portion 56g that is opposed to a part of the coupling portion of the outer surface of the near-field light generating element 23. In the present embodiment, in particular, the waveguide 56 is disposed farther from the top surface 1a of the substrate 1 than is the near-field light generating element 23, and a part of the bottom surface of the waveguide 56 is opposed to a part of the top surface 23c of the near-field light generating element 23 with the interposition layer 36 interposed therebetween. This part of the bottom surface of the waveguide 56 opposed to the part of the top surface 23c is the opposed portion 56g.

The clad layers 57, 58 and 59 each have a refractive index lower than that of the waveguide 56. The material of the waveguide 56 is the same as that of the waveguide 26 of the second embodiment. The materials of the clad layers 57, 58 and 59 are the same as those of the clad layers 37, 39 and 40 of the second embodiment.

A manufacturing method for the heat-assisted magnetic recording head 200 according to the present embodiment will now be described. The manufacturing method for the heat-assisted magnetic recording head 200 according to the present embodiment is the same as that of the second embodiment up to the step of forming the interposition layer 36. In the present embodiment, next, a not-shown dielectric layer is formed on the interposition layer 36. This dielectric layer is to be made into the clad layer 57 later. On the dielectric layer, a not-shown metal mask having a plane shape corresponding to that of the clad layer 57 is formed. Next, the clad layer 57 is formed by selectively etching the dielectric layer by RIE, for example. The end face 57a of the clad layer 57 is formed at this time. Next, a dielectric layer to be made into the waveguide 56 later is formed over the entire top surface of the stack. The dielectric layer is then selectively etched by, for example, RIE, so as to form surfaces of the dielectric layer that respectively correspond to the front end face 56a and the two side surfaces of the waveguide 56. Next, another dielectric layer to be made into the clad layer 58 later is formed over the entire top surface of the stack.

Next, the foregoing two dielectric layers are polished by, for example, CMP, until the clad layer 57 is exposed. The two dielectric layers remaining after the polishing make the waveguide 56 and the clad layer 58, respectively. This polishing also forms the incident end face 56b and flattens the incident end face 56b and the top surfaces of the clad layers 57 and 58.

Next, the clad layer 59 is formed over the entire top surface of the stack. Wiring, the terminals 210 and so on are then formed on the top surface of the clad layer 59. Next, the laser diode 202 and the external mirror 203 are fixed to the top surface of the clad layer 59, i.e., the top surface 201c of the slider 201. The substrate is then cut into sliders, and polishing of the medium facing surface 201a, fabrication of flying rails, etc. are performed to thereby complete the heat-assisted magnetic recording head 200.

In the present embodiment, the laser light emitted from the emission part 222a of the laser diode 202 is reflected by the reflecting surface 203R of the external mirror 203, passes through the clad layer 59, and enters the waveguide 56 from the incident end face 56b. Entering the waveguide 56, the laser light is reflected at the interface between the waveguide 56 and the clad layers 57 and 58 while traveling through the waveguide 56 toward the medium facing surface 201a (the front end face 56a).

The remainder of configuration, function and effects of the present embodiment are similar to those of the second embodiment.

It should be appreciated that the present invention is not limited to the foregoing embodiments, and various modifications may be made thereto. For example, in the second and third embodiments, the internal mirror 38 may be replaced with a diffraction grating that diffracts the laser light entering the waveguide 26 from the top surface 26c, so as to let the laser light travel through the waveguide 26 toward the medium facing surface 201a.

In the fourth embodiment, the laser diode 202 and the external mirror 203 may be arranged so that the laser light emitted from the emission part 222a of the laser diode 202 travels in the Y direction as in the third embodiment.

In the present invention, the near-field light generating element 23 may have a shape other than the shapes shown in FIG. 7 and FIG. 23.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A heat-assisted magnetic recording head comprising a slider, an edge-emitting laser diode fixed to the slider, and an external mirror provided outside the slider and fixed to the laser diode,
    the slider comprising:
        a medium facing surface that faces a recording medium;
        a magnetic pole that has an end face located in the medium facing surface and produces a recording magnetic field for recording data on the recording medium;
        a waveguide that allows light to propagate therethrough;
        a near-field light generating element having a near-field light generating part located in the medium facing surface, a surface plasmon being excited based on the light propagating through the waveguide, the surface plasmon propagating to the near-field light generating part, the near-field light generating part generating near-field light based on the surface plasmon; and
        a substrate on which the magnetic pole, the near-field light generating element and the waveguide are stacked, wherein:
    the laser diode includes: an active layer; an emitting end face that lies at an end in a direction parallel to a plane of the active layer and includes an emission part for emitting laser light; a mounting surface that lies at an end in a direction perpendicular to the plane of the active layer and faces the slider; and a rear surface that is opposite to the mounting surface;
    the external mirror includes: a first to-be-fixed part disposed along the emitting end face; a second to-be-fixed part disposed along the rear surface; and a coupling part that couples the first to-be-fixed part and the second to-be-fixed part to each other;
    the first to-be-fixed part has a first surface that faces the emitting end face, a second surface opposite to the first surface, and an end face that lies at an end opposite to the coupling part and connects the first surface and the second surface to each other;
    the end face includes a reflecting surface that reflects the laser light emitted from the emission part toward the waveguide; and
    the reflecting surface is oblique with respect to the first surface and continuous with the first surface.

2. The heat-assisted magnetic recording head according to claim 1, wherein the reflecting surface forms an angle of 45° with respect to the first surface.

3. The heat-assisted magnetic recording head according to claim 1, wherein:
    the slider has a rear surface that is opposite to the medium facing surface;
    the waveguide has an incident end face for the laser light reflected by the external mirror to be incident on, the incident end face being located in the rear surface of the slider; and
    the laser diode is arranged so that the mounting surface faces the rear surface of the slider.

4. The heat-assisted magnetic recording head according to claim 1, wherein:
    the substrate has a top surface that faces toward the magnetic pole, the near-field light generating element and the waveguide;
    the slider has a top surface that lies at an end above the top surface of the substrate; and
    the laser diode is arranged so that the mounting surface faces the top surface of the slider.

5. The heat-assisted magnetic recording head according to claim 4, wherein the slider further comprises an internal mirror that reflects the laser light reflected by the external mirror so as to let the laser light travel through the waveguide toward the medium facing surface.

6. The heat-assisted magnetic recording head according to claim 5, wherein the laser diode, the external mirror, the internal or, and the waveguide are arranged so that a direction of travel of the laser light emitted from the emission part and a direction of travel of the laser light reflected by the internal mirror are orthogonal to each other as viewed from above the top surface of the slider.

7. The heat-assisted magnetic recording head according to claim 5, wherein the laser diode, the external mirror, the internal mirror, and the waveguide are arranged so that a direction of travel of the laser light emitted from the emission part and a direction of travel of the laser light reflected by the internal mirror are parallel to each other.

8. The heat-assisted magnetic recording head according to claim 4, wherein the waveguide has an incident end face for the laser light reflected by the external mirror to be incident on, the incident end face being located in the top surface of the slider.

9. The heat-assisted magnetic recording head according to claim 1, wherein a distance between the emission part and the mounting surface is smaller than a distance between the emission part and the rear surface of the laser diode.

10. The heat-assisted magnetic recording head according to claim 1, wherein:
    the near-field light generating element has an outer surface that includes: a first end face that is located in the medium facing surface; a second end face that is farther from the medium facing surface; and a coupling portion that couples the first end face and the second end face to each other, the first end face including the near-field light generating part;

a length of the near-field light generating element in a direction perpendicular to the medium facing surface is greater than a length of the first end face in a direction perpendicular to the top surface of the substrate; and the waveguide has an outer surface including an opposed portion that is opposed to a part of the coupling portion.

11. The heat-assisted magnetic recording head according to claim 10, wherein the slider further comprises an interposition layer that has a refractive index lower than that of the waveguide and is interposed between the opposed portion and the near-field light generating element.

12. The heat-assisted magnetic recording head according to claim 1, wherein the external mirror includes a main body, and a metal film that adheres to the main body to form the reflecting surface.

13. A laser assembly usable in combination with a slider to constitute a heat-assisted magnetic recording head, the slider comprising:

a medium facing surface that faces a recording medium;

a magnetic pole that has an end face located in the medium facing surface and produces a recording magnetic field for recording data on the recording medium;

a waveguide that allows light to propagate therethrough;

a near-field light generating element having a near-field light generating part located in the medium facing surface, a surface plasmon being excited based on the light propagating through the waveguide, the surface plasmon propagating to the near-field light generating part, the near-field light generating part generating near-field light based on the surface plasmon; and a substrate on which the magnetic pole, the near-field light generating element and the waveguide are stacked, the laser assembly comprising:

an edge-emitting laser diode to be fixed to the slider; and an external mirror to be provided outside the slider and fixed to the laser diode, wherein:

the laser diode includes: an active layer; an emitting end face that lies at an end in a direction parallel to a plane of the active layer and includes an emission part for emitting laser light; a mounting surface that lies at an end in a direction perpendicular to the plane of the active layer and is to face the slider; and a rear surface that is opposite to the mounting surface;

the external mirror includes: a first to-be-fixed part disposed along the emitting end face; a second to-be-fixed part disposed along the rear surface; and a coupling part that couples the first to-be-fixed part and the second to-be-fixed part to each other; the first to-be-fixed part has a first surface that faces the emitting end face, a second surface opposite to the first surface, and an end face that lies at an end opposite to the coupling part and connects the first surface and the second surface to each other;

the end face includes a reflecting surface that reflects the laser light emitted from the emission part toward the waveguide; and the reflecting surface is oblique with respect to the first surface and continuous with the first surface.

14. The laser assembly according to claim 13, wherein the reflecting surface forms an angle of 45° with respect to the first surface.

15. The laser assembly according to claim 13, wherein a distance between the emission part and the mounting surface is smaller than a distance between the emission part and the rear surface.

16. The laser assembly according to claim 13, wherein the external mirror includes a main body, and a metal film that adheres to the main body to form the reflecting surface.

17. A manufacturing method for the laser assembly according to claim 16, comprising the steps of:

fabricating the external mirror; and fixing the external mirror to the laser diode, wherein:

the step of fabricating the external mirror includes the steps of:

forming the main body to have a polished surface to underlie the metal film, by polishing an end portion of a main body material shaped like a bent plate to form the polished surface; and depositing the metal film onto the polished surface of the main body.

18. The manufacturing method according to claim 17, wherein the reflecting surface forms an angle of 45° with respect to the first surface.

19. The manufacturing method according to claim 17, wherein a distance between the emission part and the mounting surface is smaller than a distance between the emission part and the rear surface.

20. A manufacturing method for the external mirror for use in the laser assembly according to claim 16, comprising the steps of:

forming the main body to have a polished surface to underlie the metal film, by polishing an end portion of a main body material shaped like a bent plate to form the polished surface; and depositing the metal film onto the polished surface of the main body.

21. The manufacturing method according to claim 20, wherein the reflecting surface fowls an angle of 45° with respect to the first surface.

* * * * *